Dec. 19, 1944. D. R. TRINKLE 2,365,365
CONTOURING MACHINE AND METHOD
Filed Aug. 20, 1941 36 Sheets-Sheet 3
FIG_3_
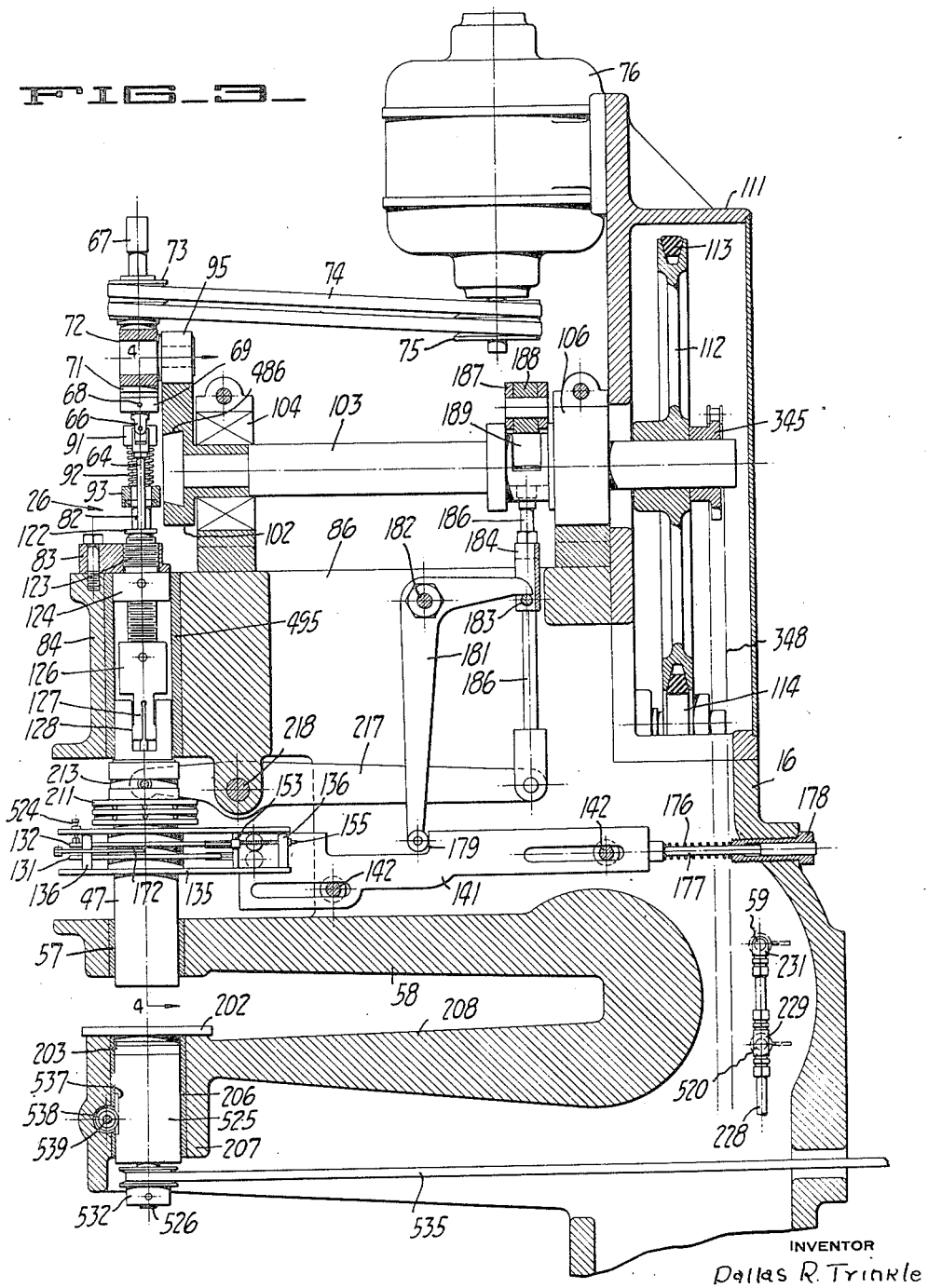
INVENTOR
Dallas R. Trinkle
BY Paul D. Flehr
ATTORNEY

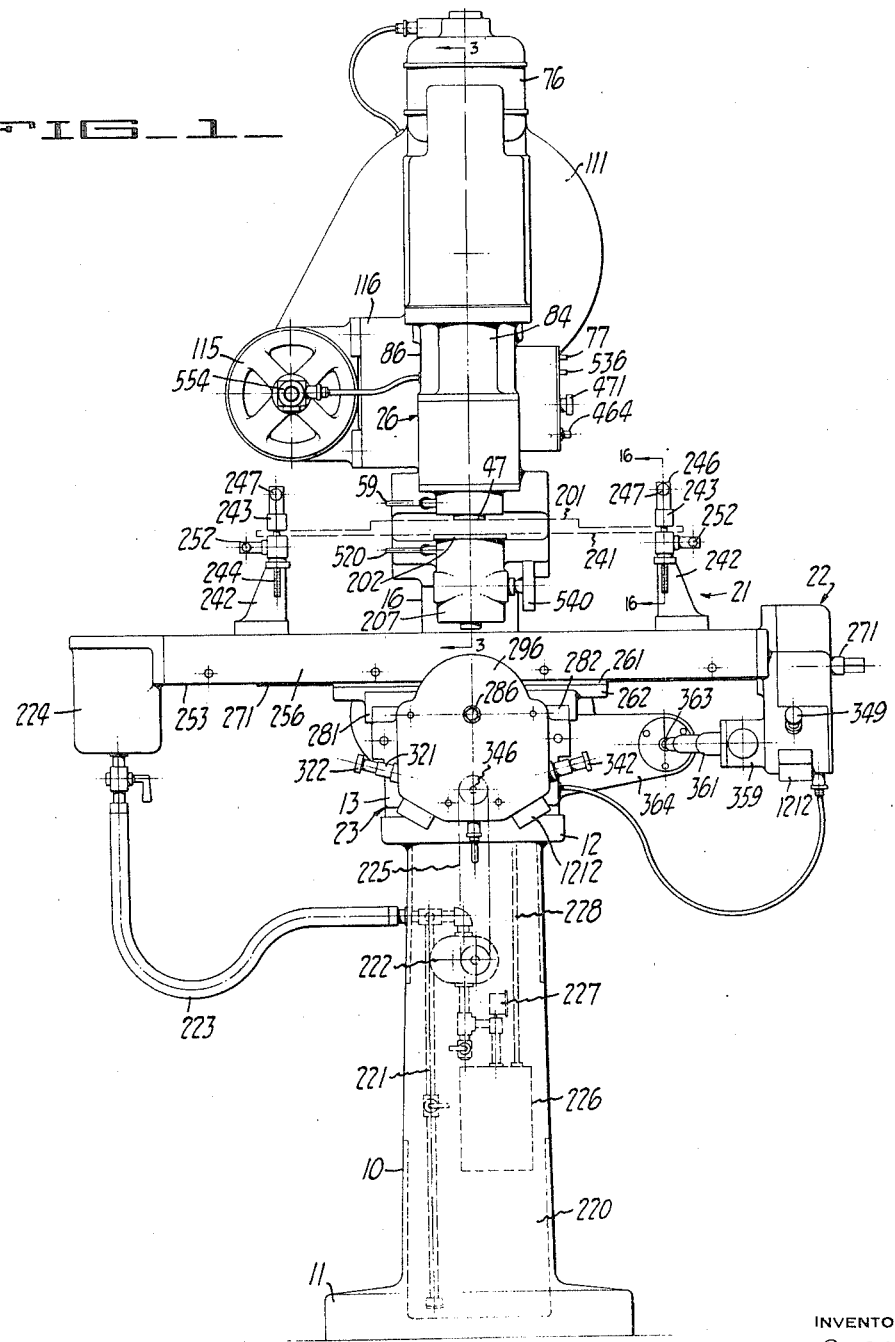

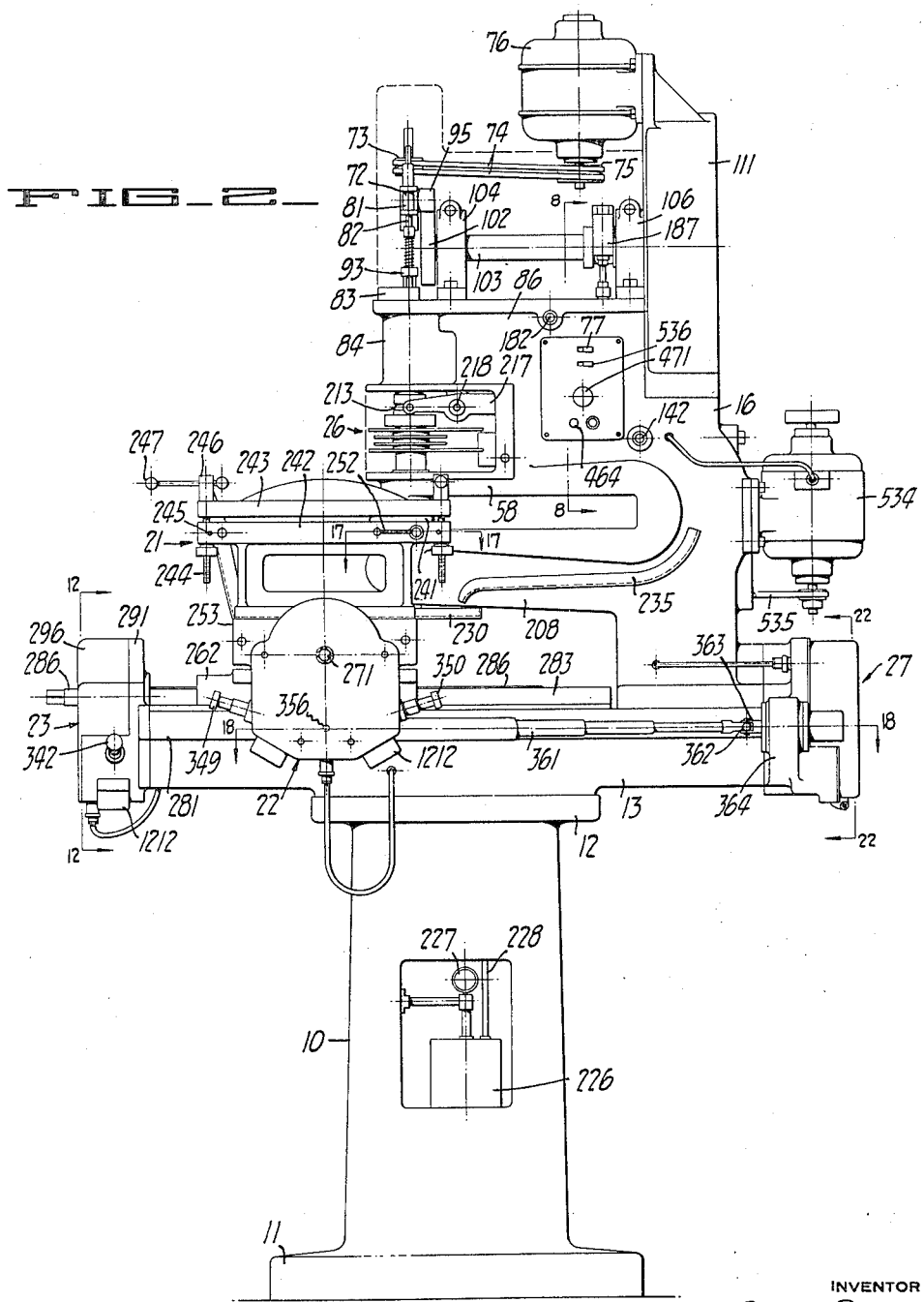

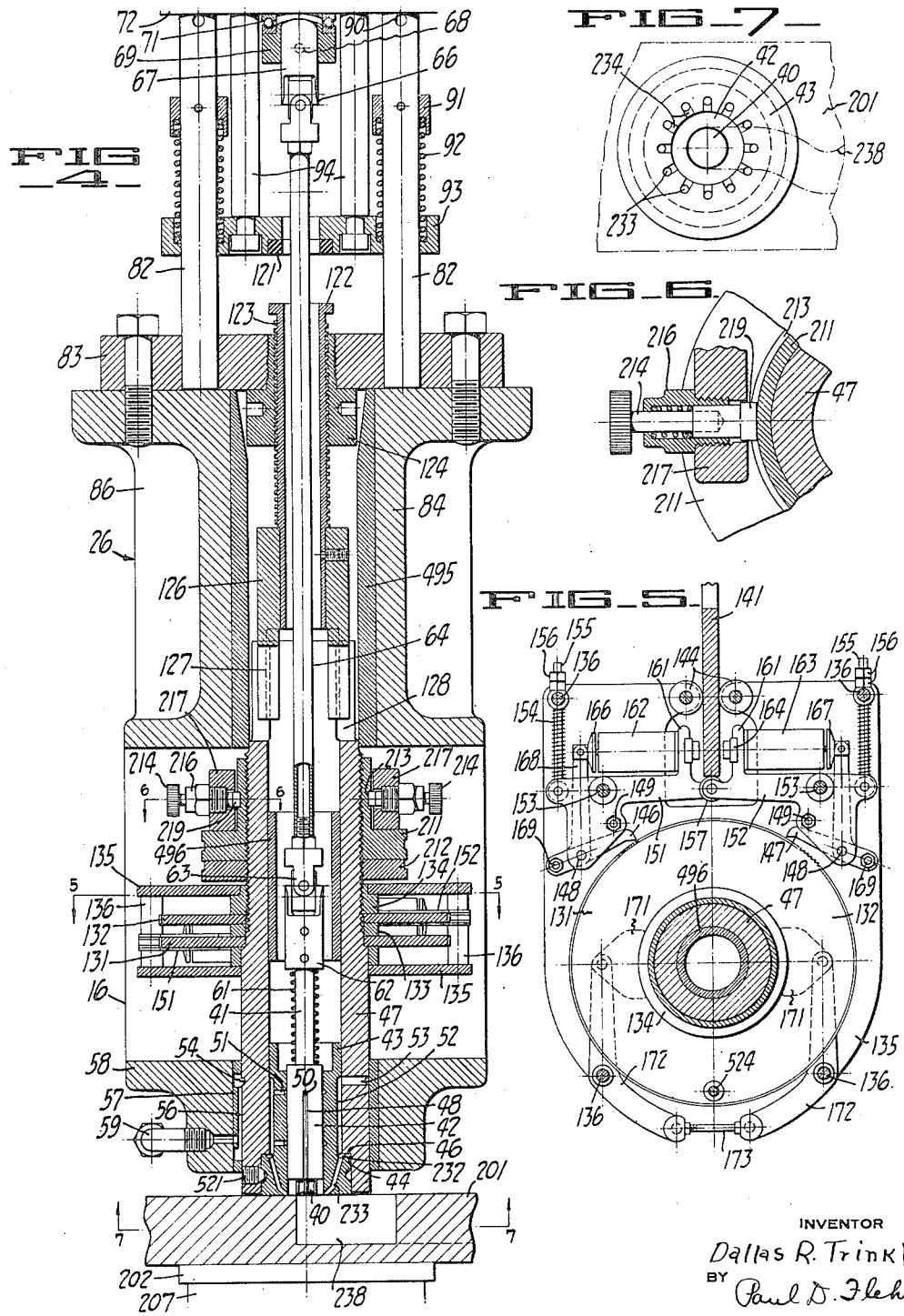

Dec. 19, 1944.       D. R. TRINKLE       2,365,365
CONTOURING MACHINE AND METHOD
Filed Aug. 20, 1941       36 Sheets-Sheet 5
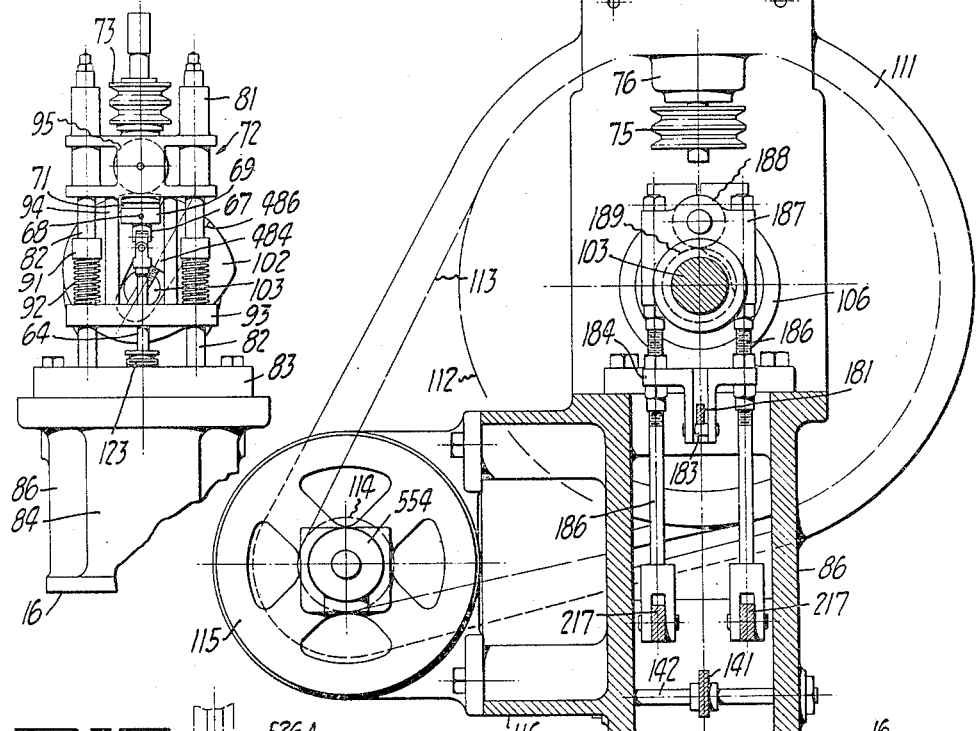
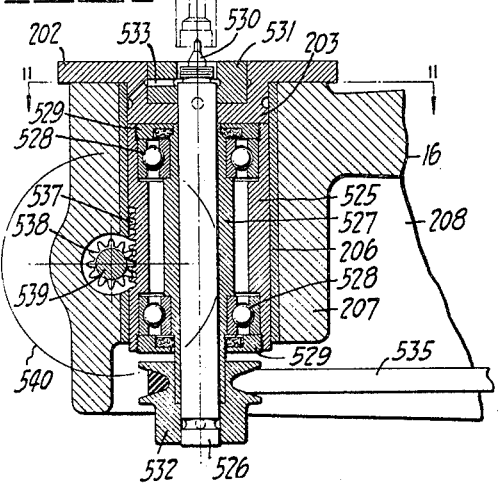
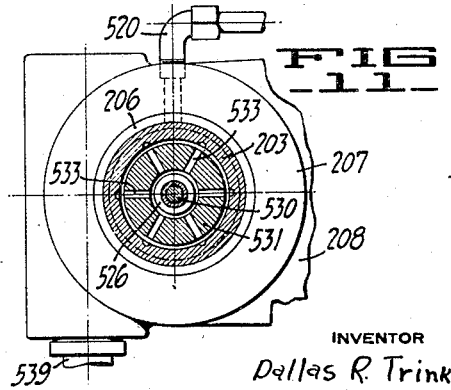
INVENTOR
Dallas R. Trinkle
BY Paul D. Flehr
ATTORNEY

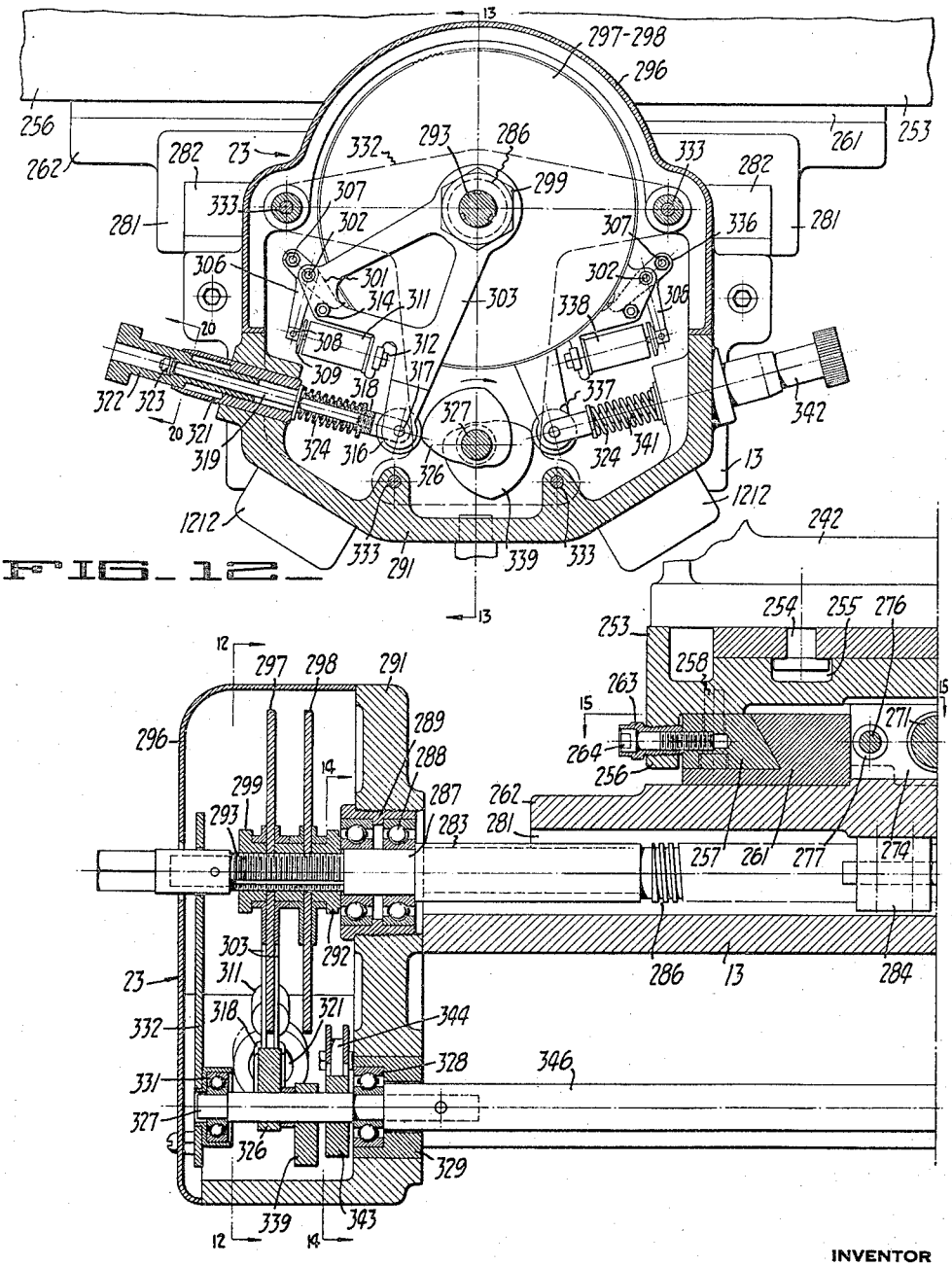

Dec. 19, 1944.　　　D. R. TRINKLE　　　2,365,365
CONTOURING MACHINE AND METHOD
Filed Aug. 20, 1941　　　36 Sheets-Sheet 7
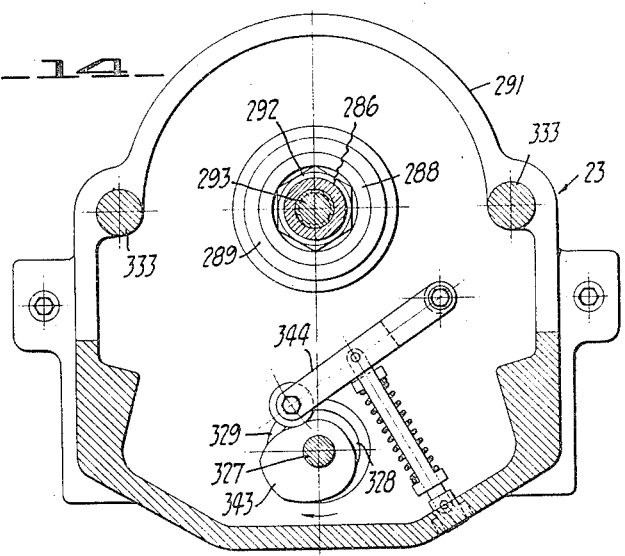
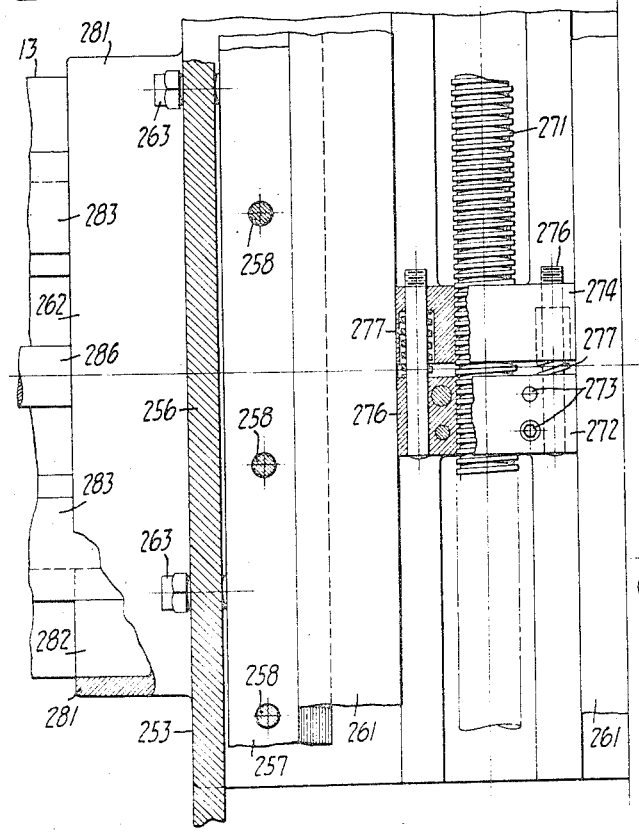
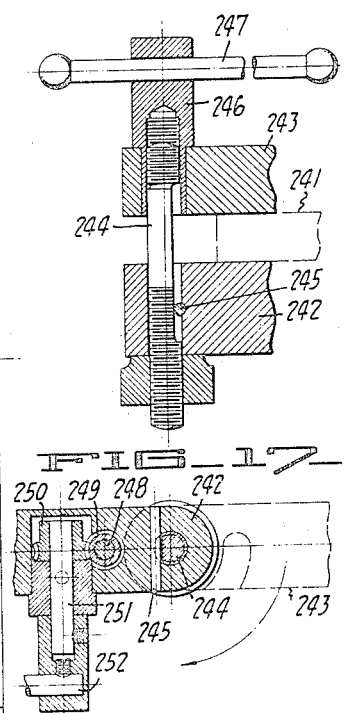
INVENTOR
Dallas R. Trinkle
BY Paul D. Flehr
ATTORNEY Dec. 19, 1944. D. R. TRINKLE 2,365,365
CONTOURING MACHINE AND METHOD
Filed Aug. 20, 1941 36 Sheets-Sheet 8
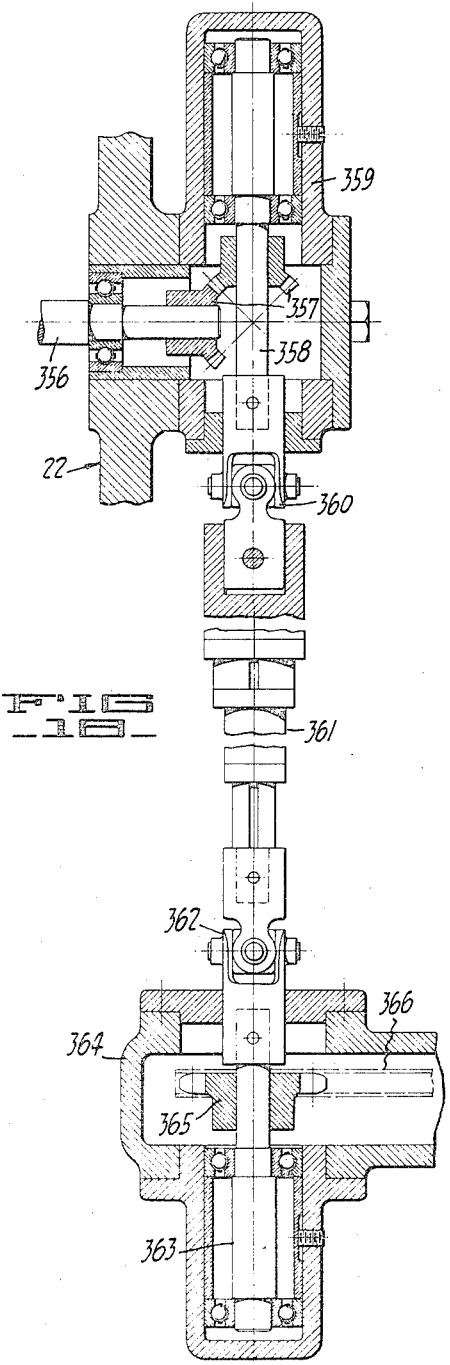
FIG_18_
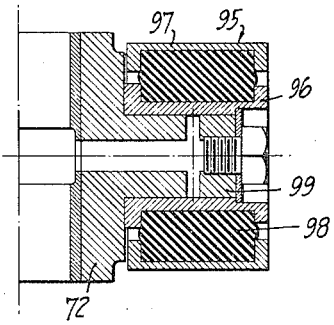
FIG_19_
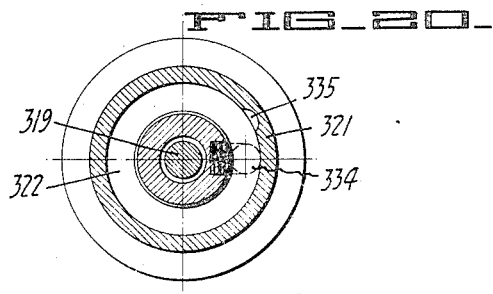
FIG_20_
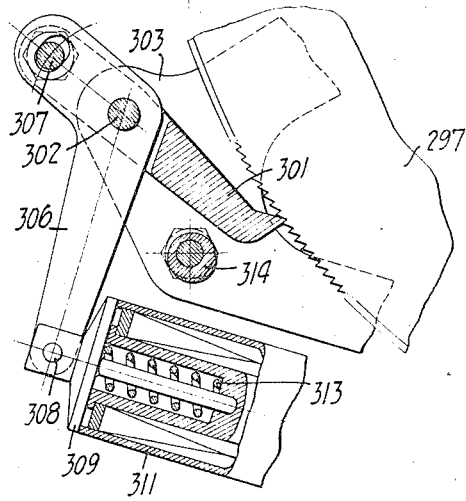
FIG_21_
INVENTOR
Dallas R. Trinkle
BY
Paul D. Flehr
ATTORNEY

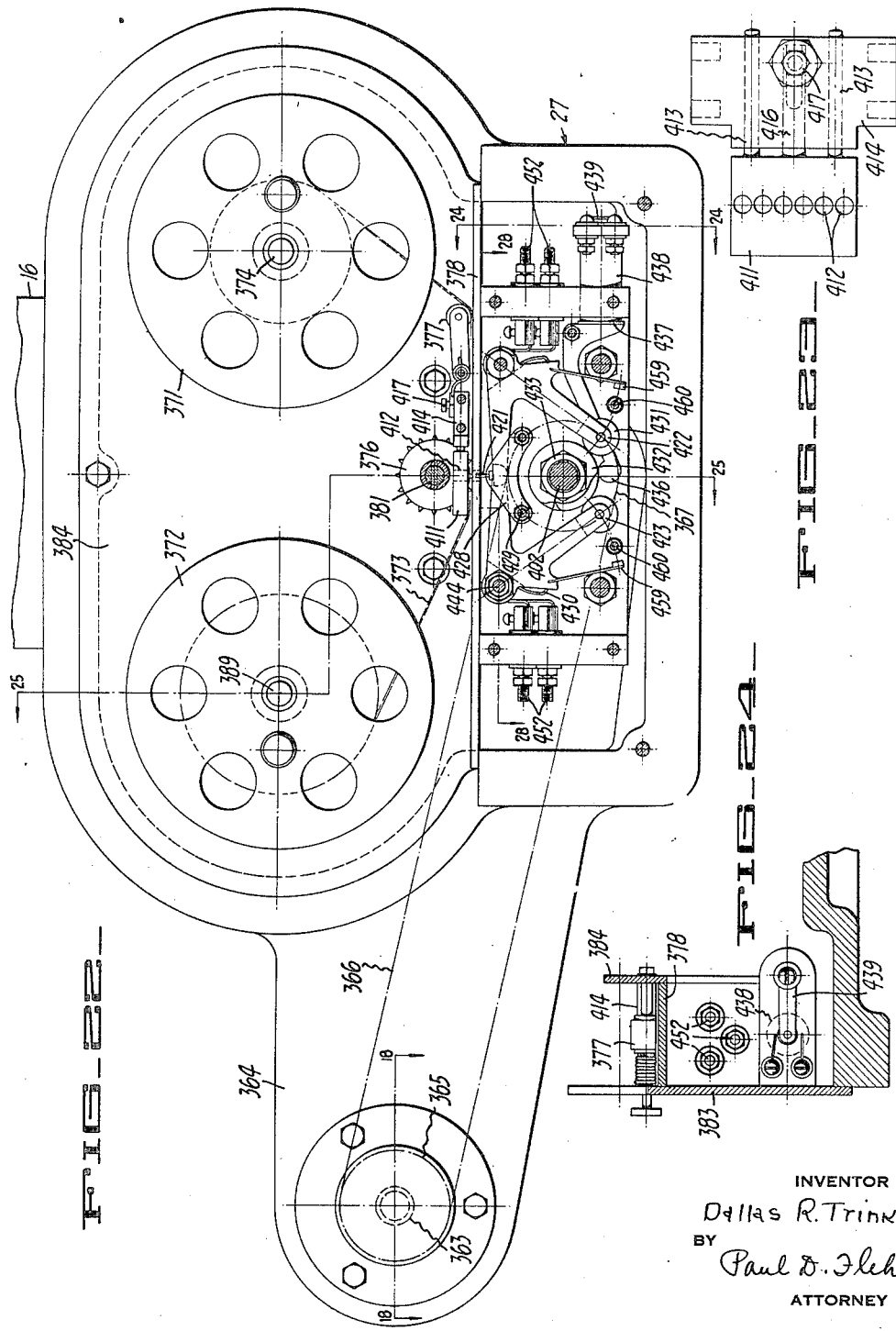

Dec. 19, 1944.  D. R. TRINKLE  2,365,365
CONTOURING MACHINE AND METHOD
Filed Aug. 20, 1941   36 Sheets-Sheet 10
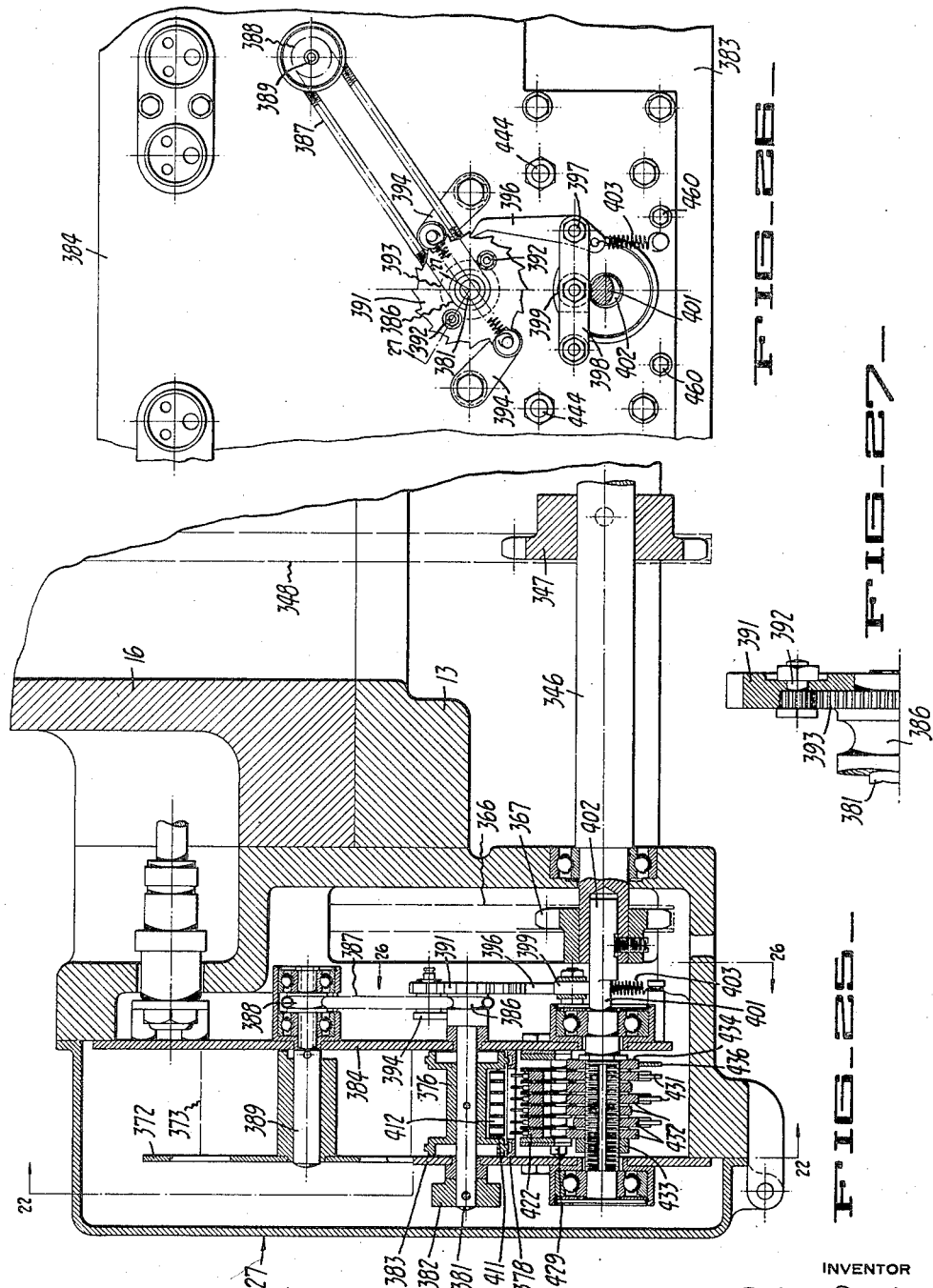
INVENTOR
Dallas R. Trinkle
BY
Paul D. Flehr
ATTORNEY

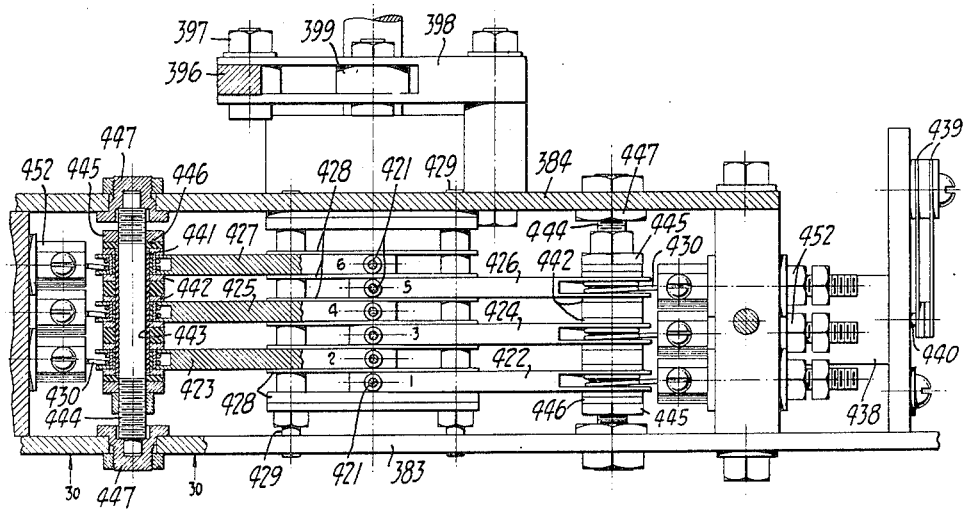
FIG_28_
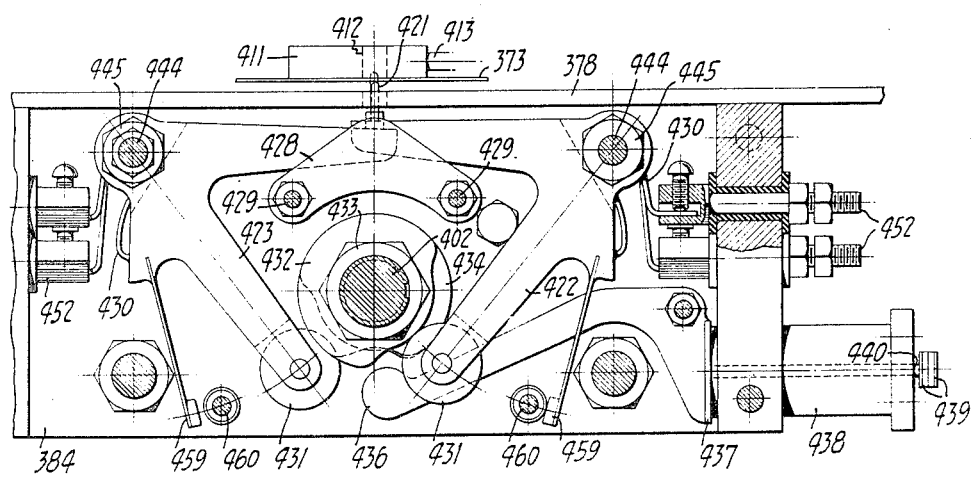
FIG_29_
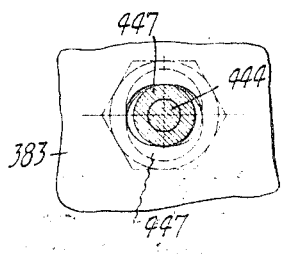
FIG_30_

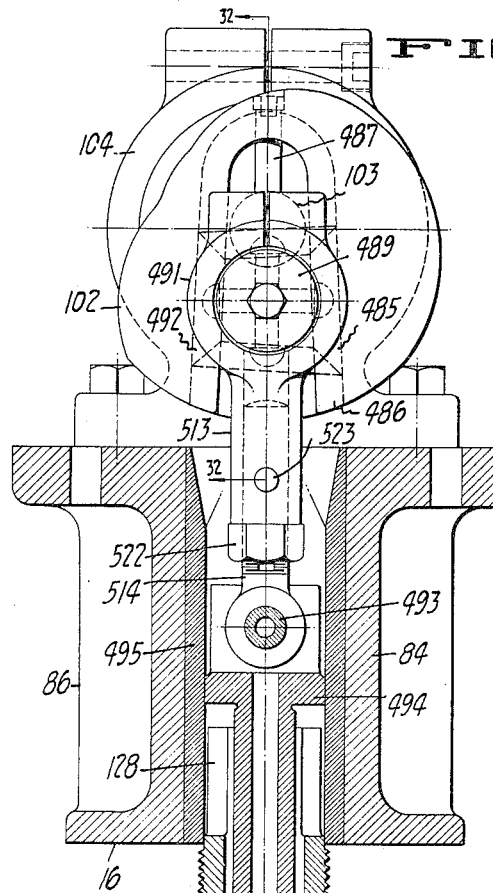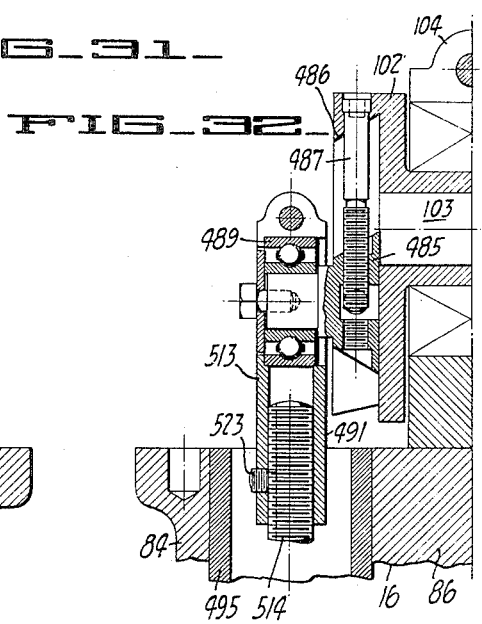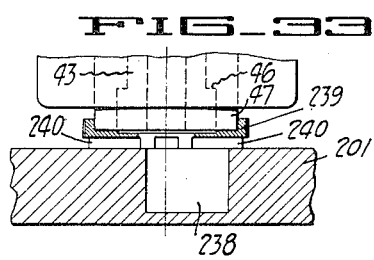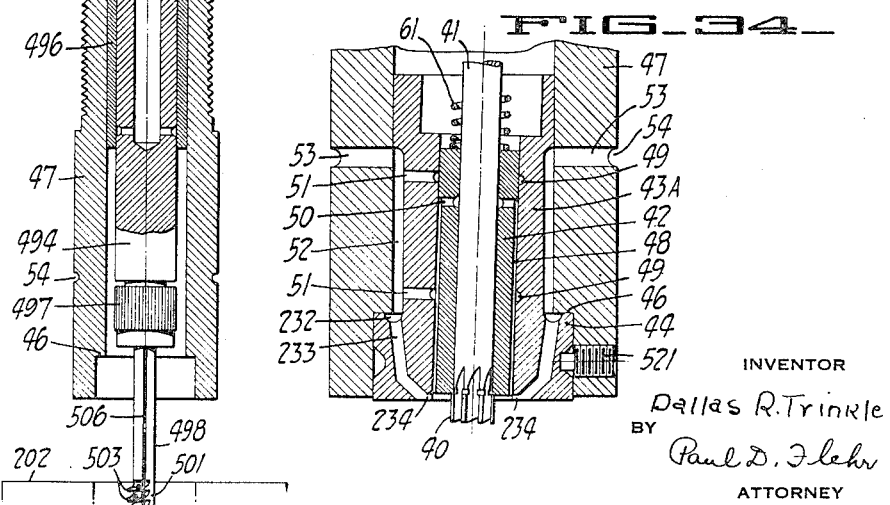

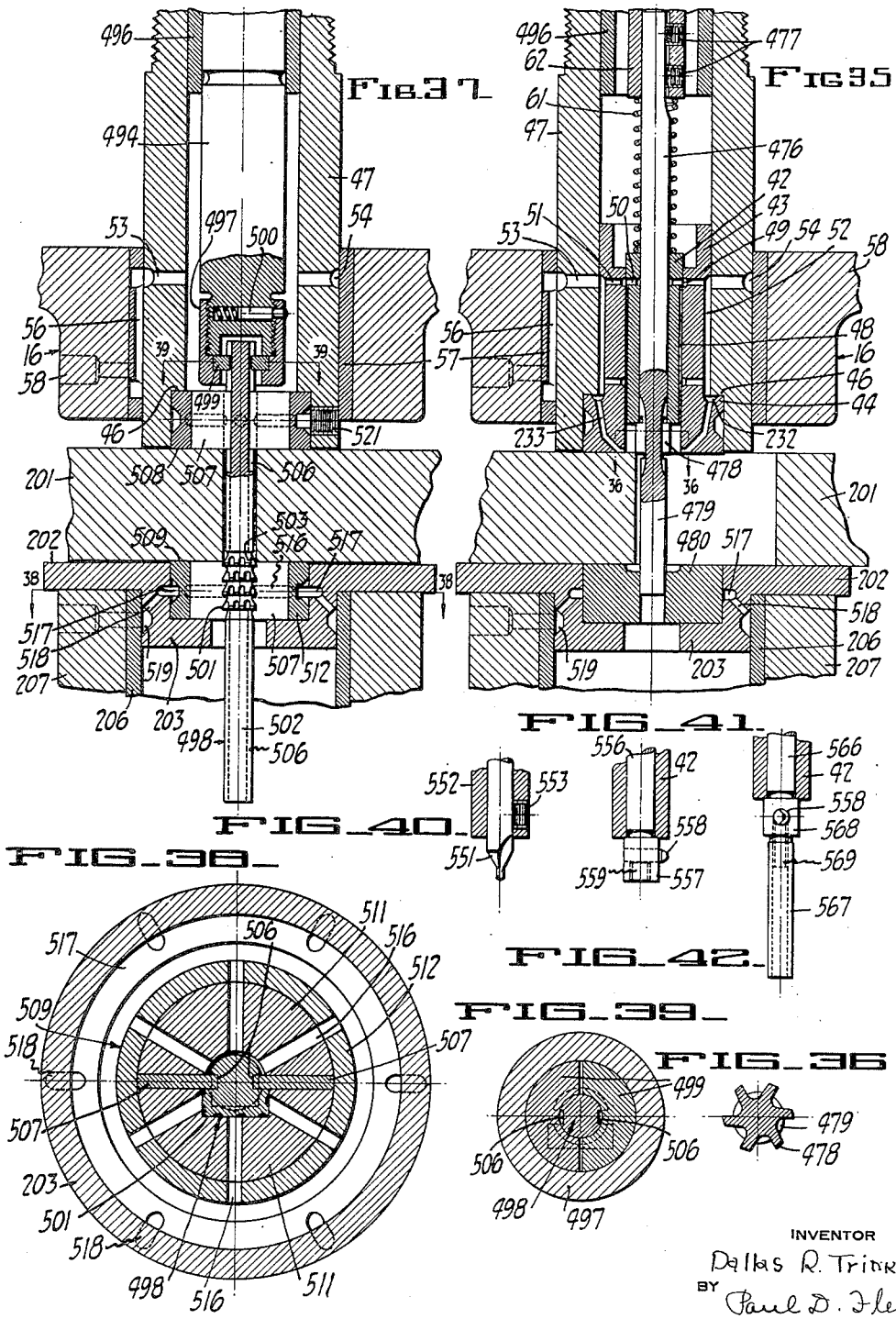

Dec. 19, 1944. D. R. TRINKLE 2,365,365
CONTOURING MACHINE AND METHOD
Filed Aug. 20, 1941 36 Sheets-Sheet 14
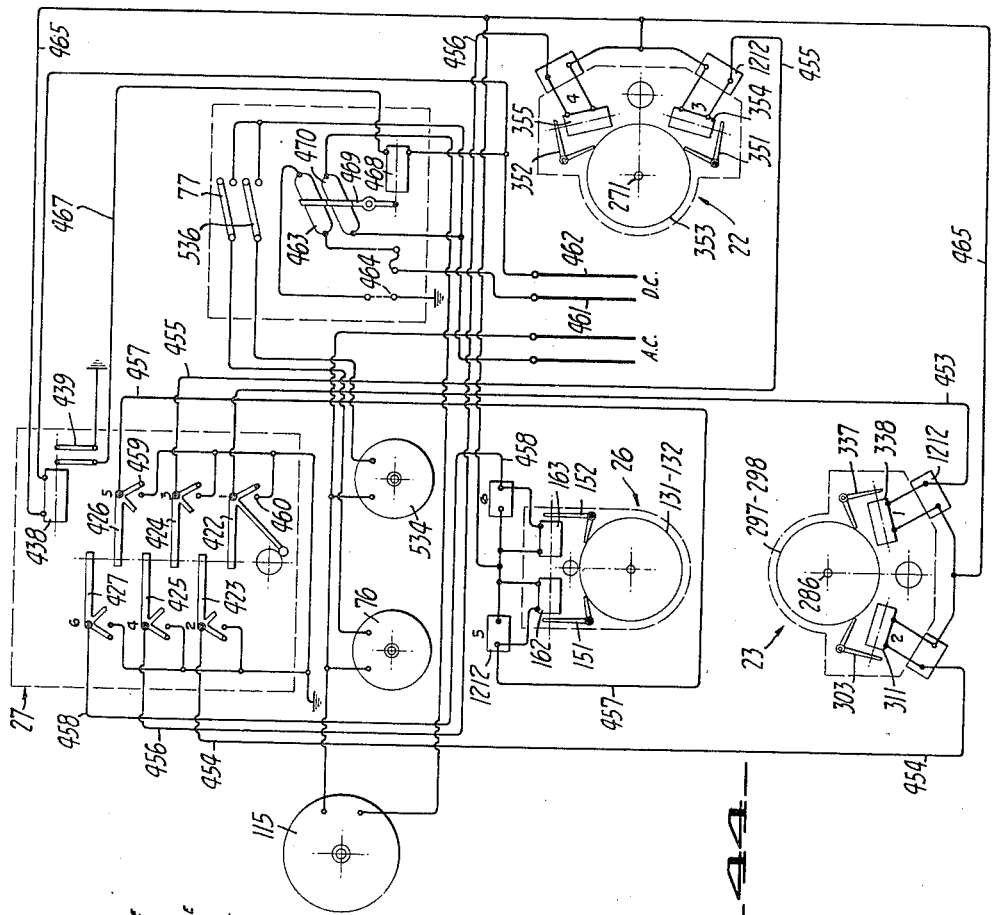
FIG_44_
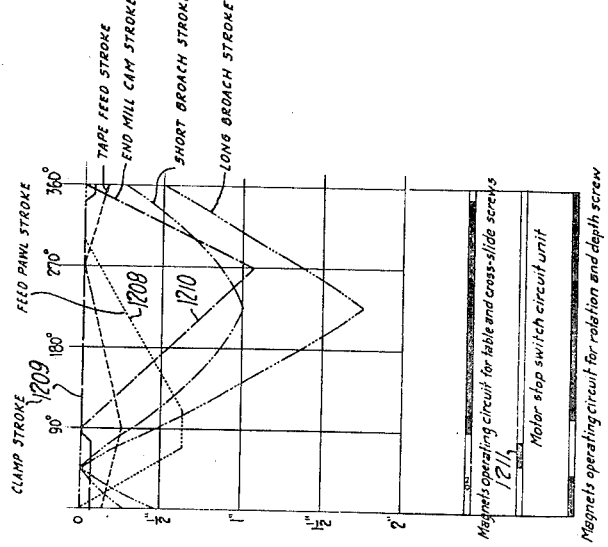
FIG_43_
INVENTOR
Dallas R. Trinkle
BY
Paul D. Flehr
ATTORNEY

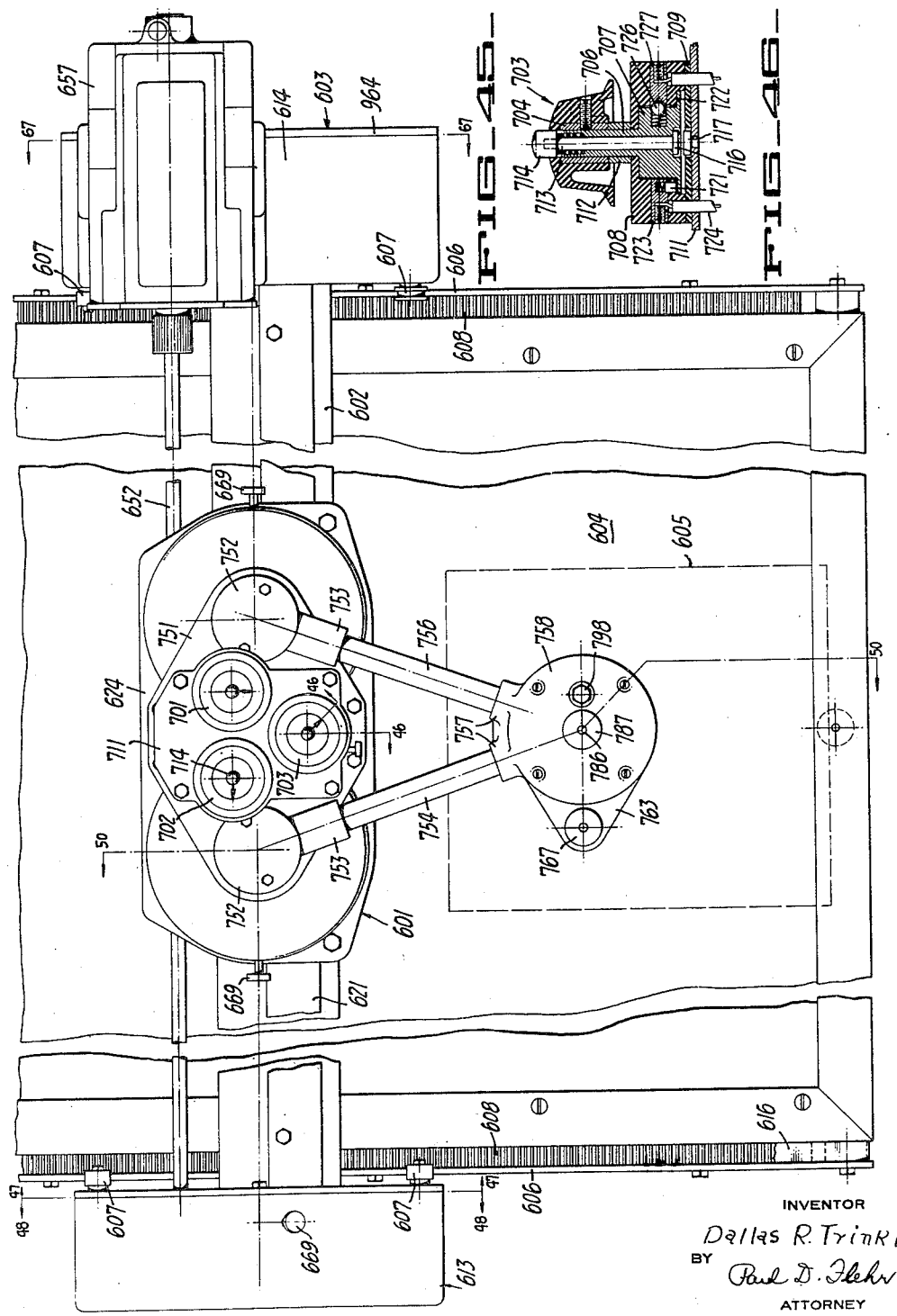

Dec. 19, 1944.   D. R. TRINKLE   2,365,365
CONTOURING MACHINE AND METHOD
Filed Aug. 20, 1941   36 Sheets-Sheet 16
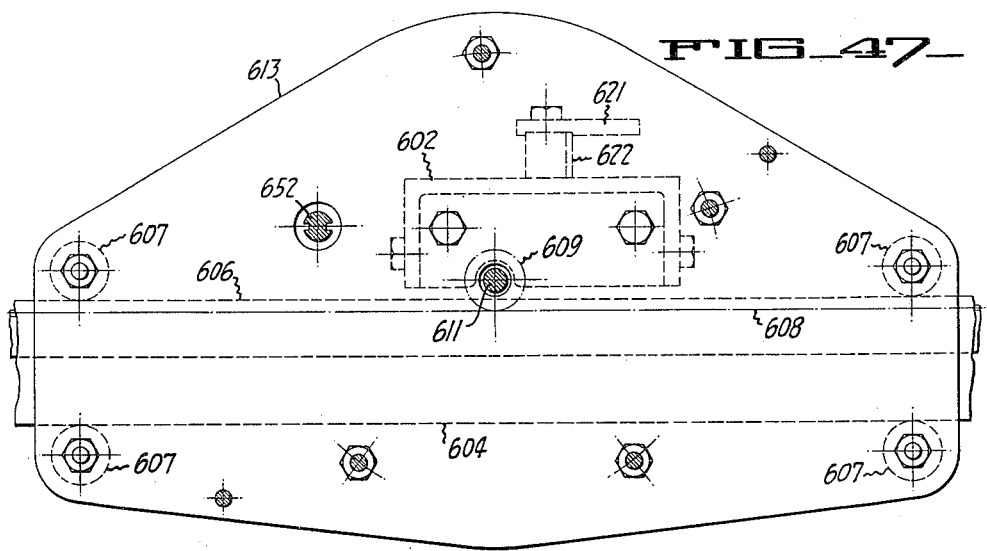
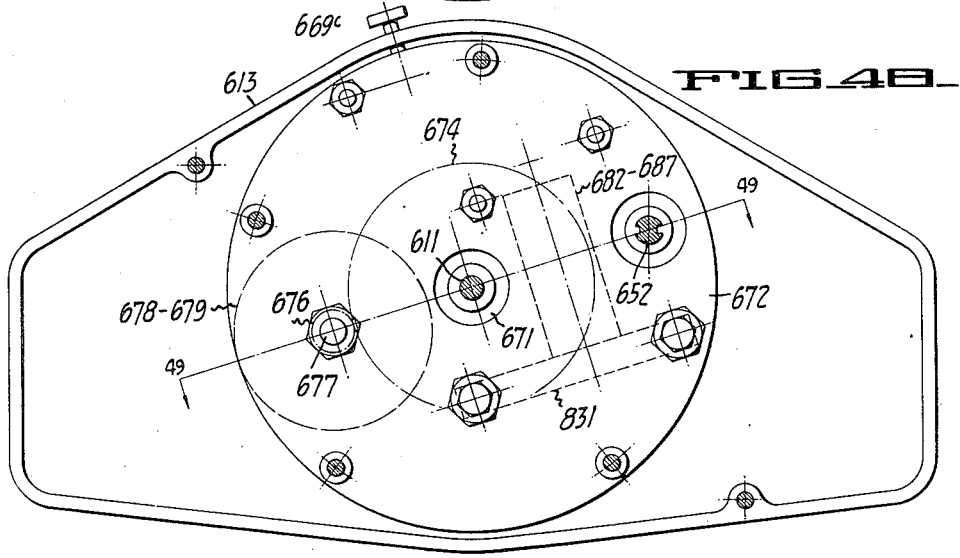
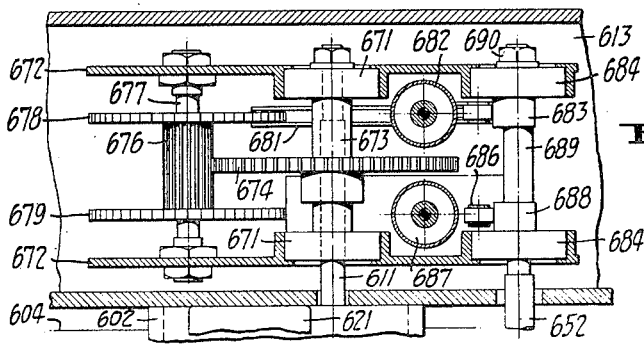
INVENTOR
Dallas R. Trinkle
BY
Paul D. Flehr
ATTORNEY

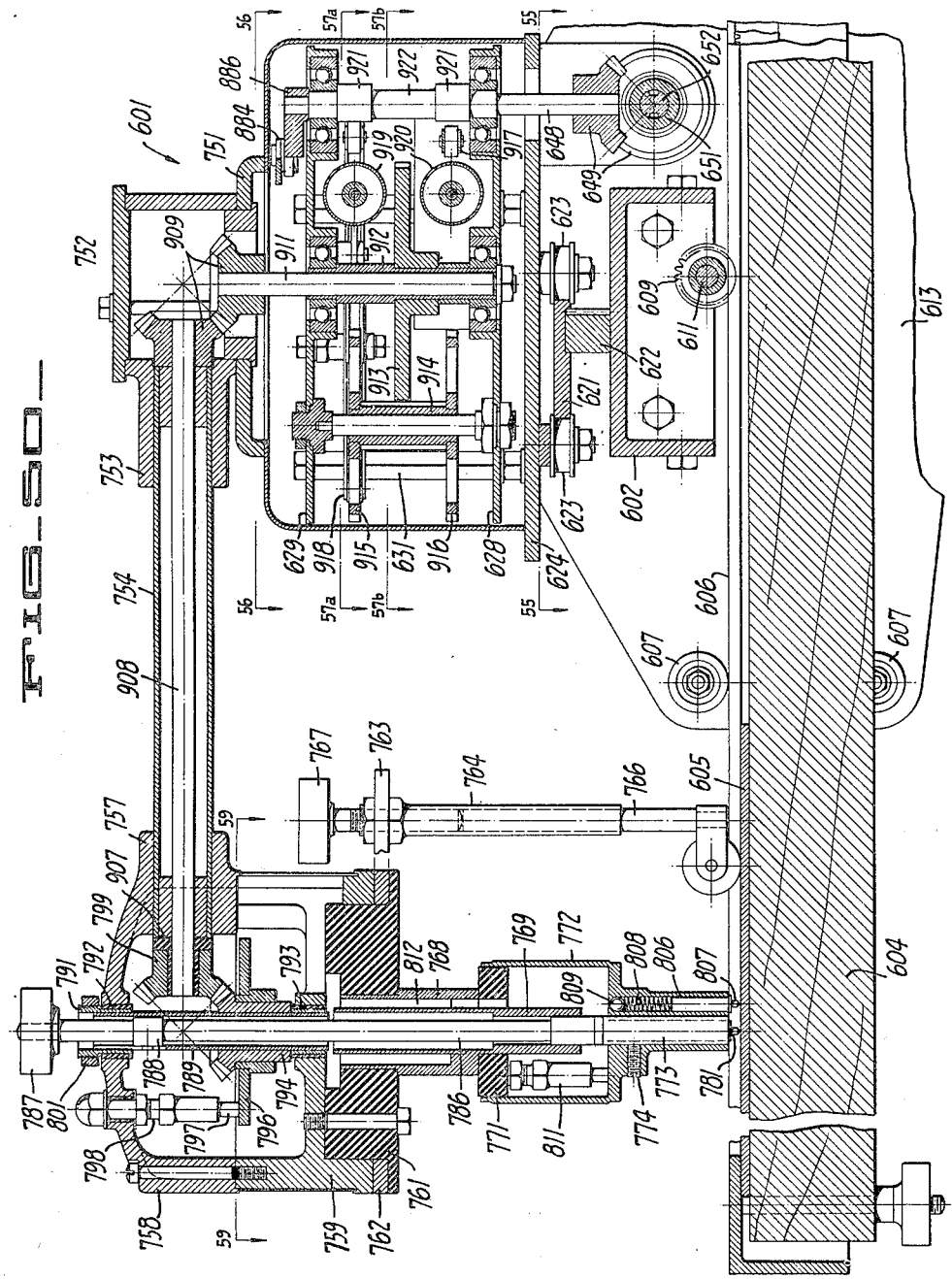

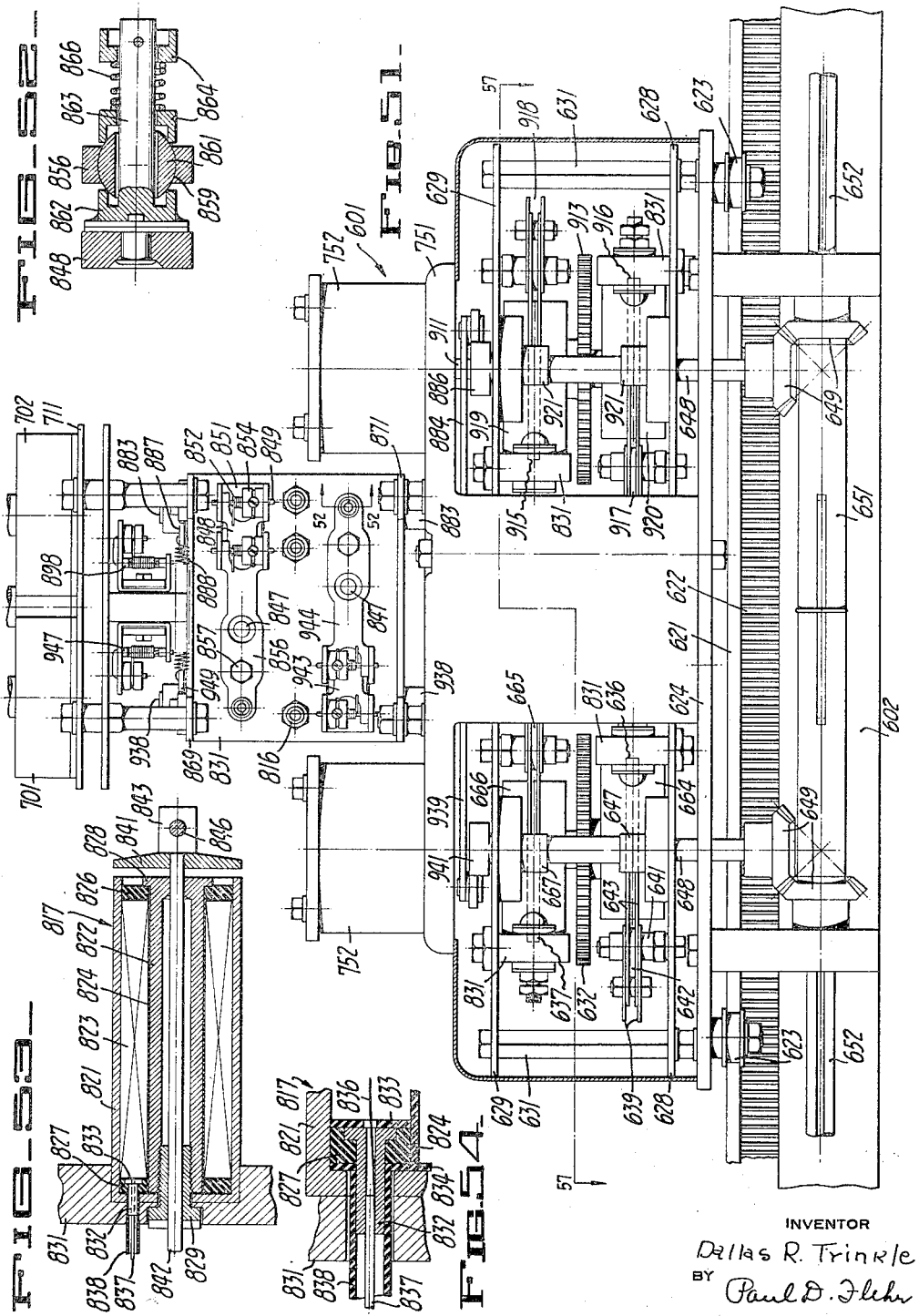

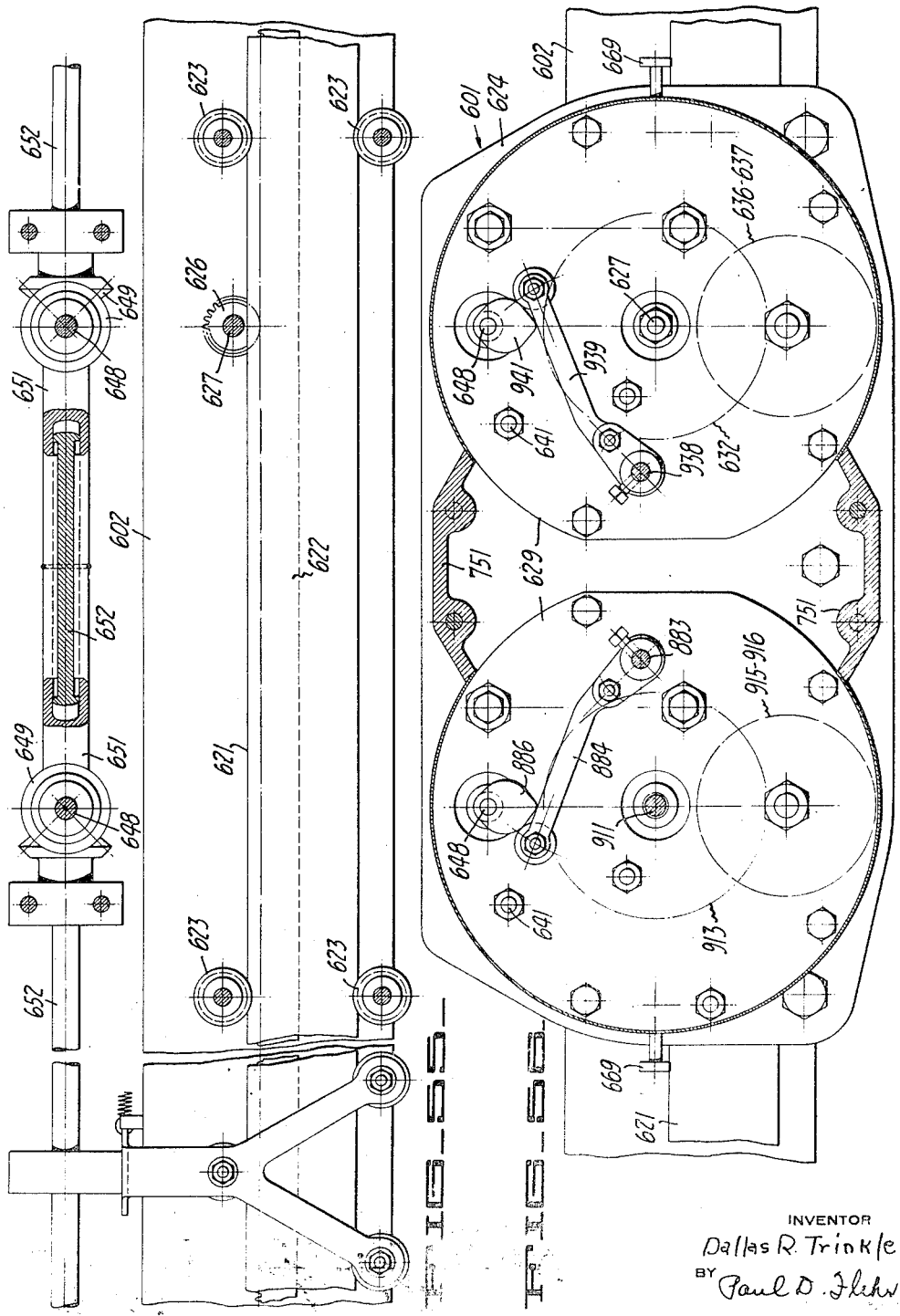

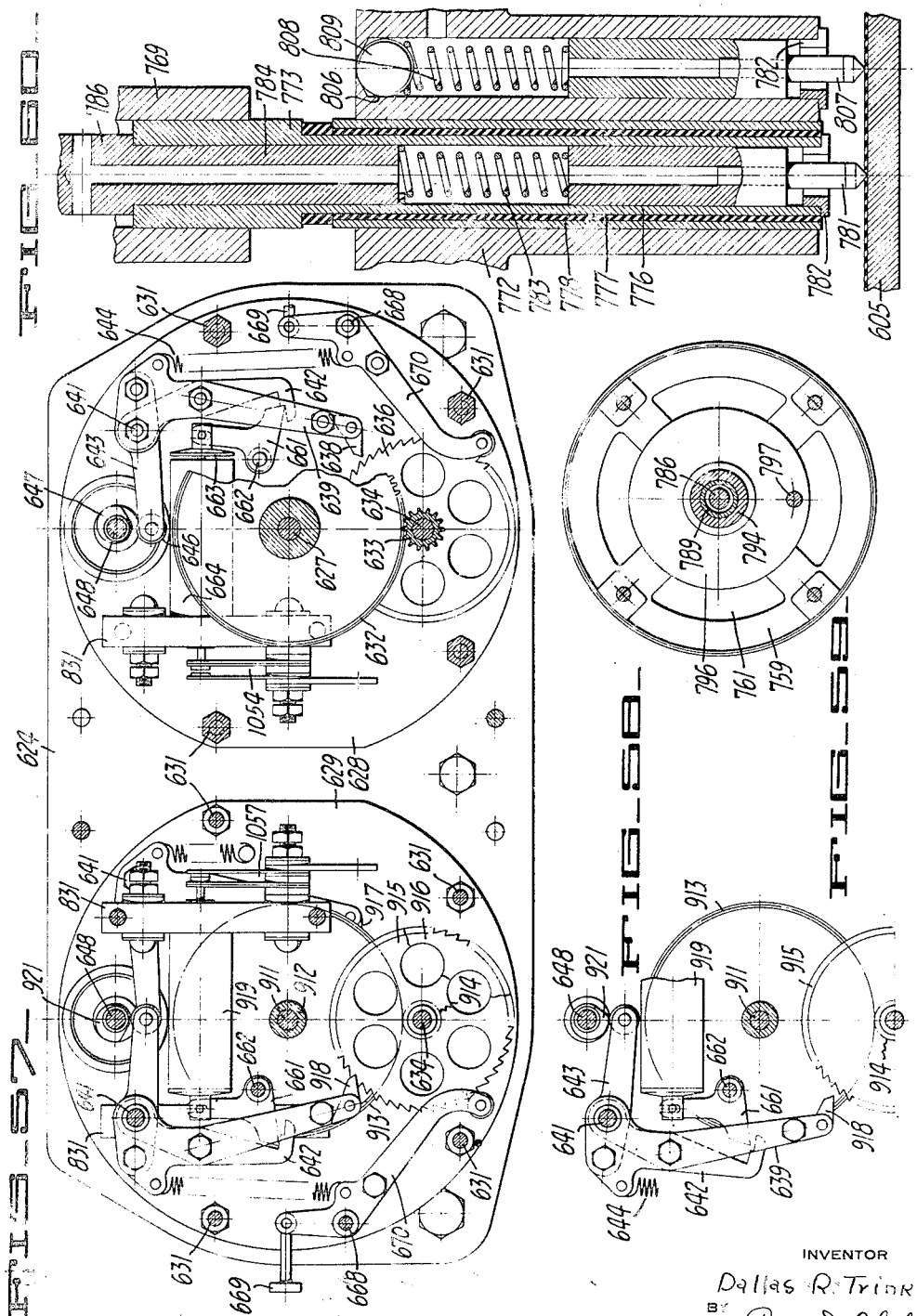

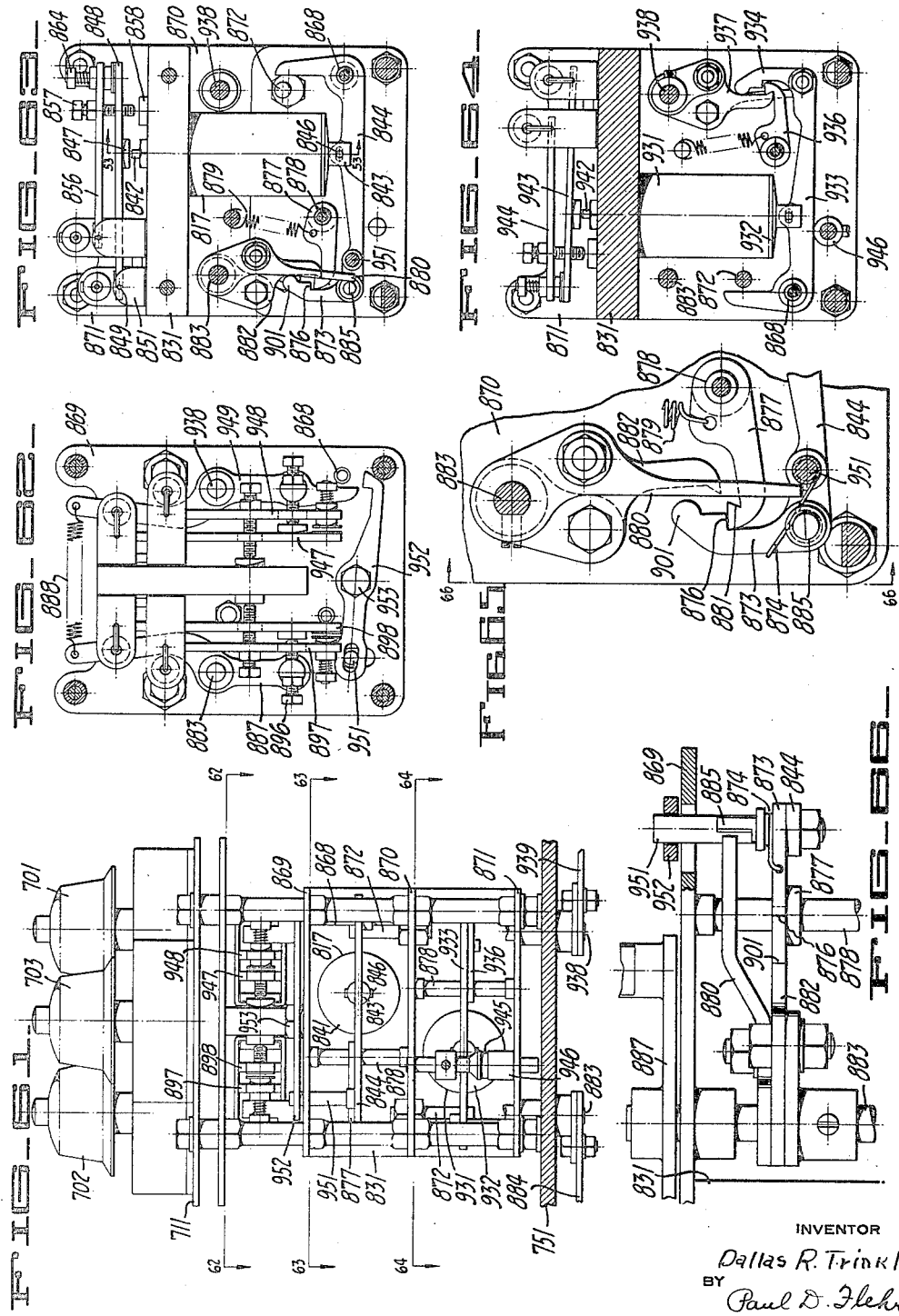

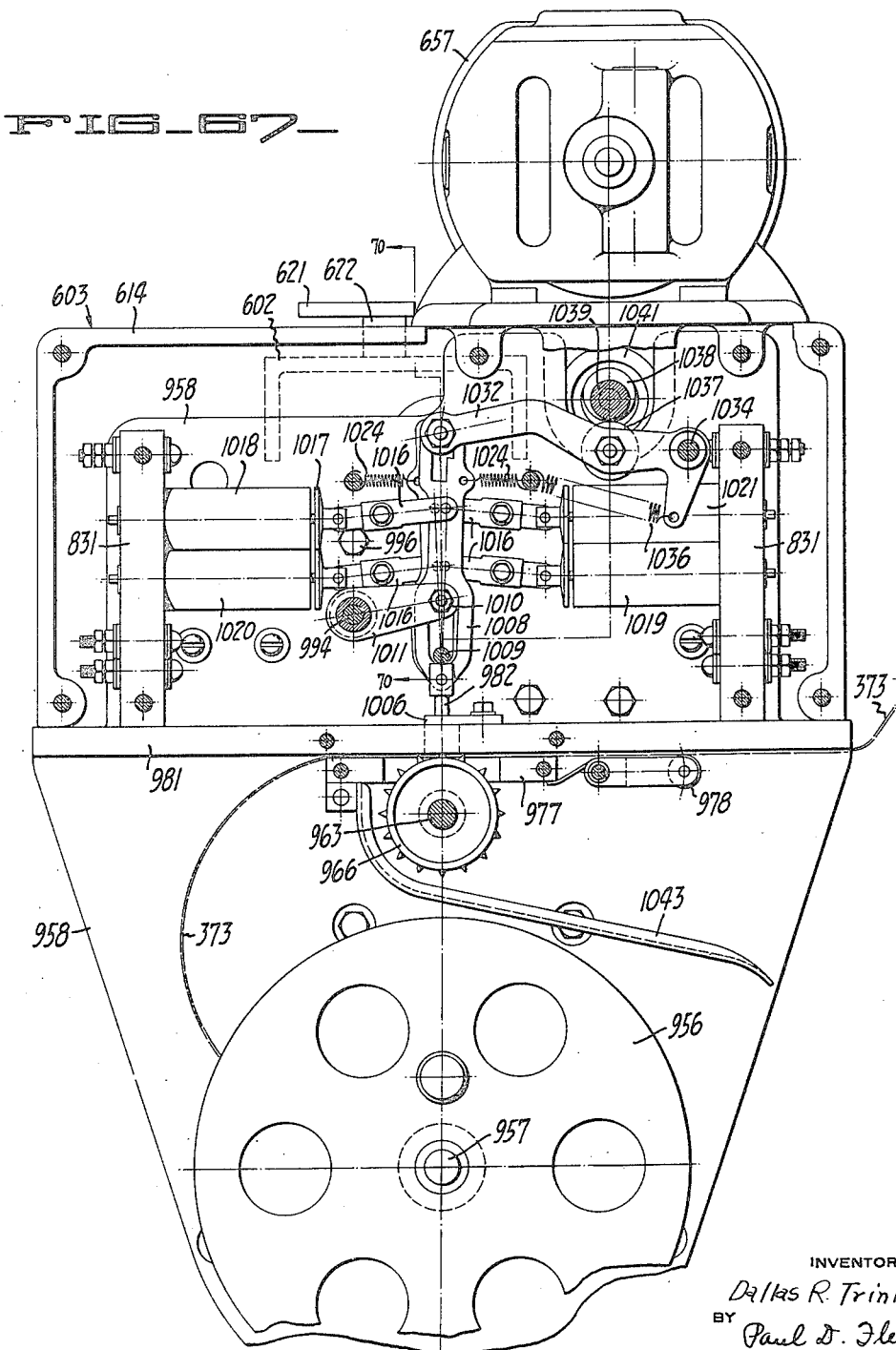

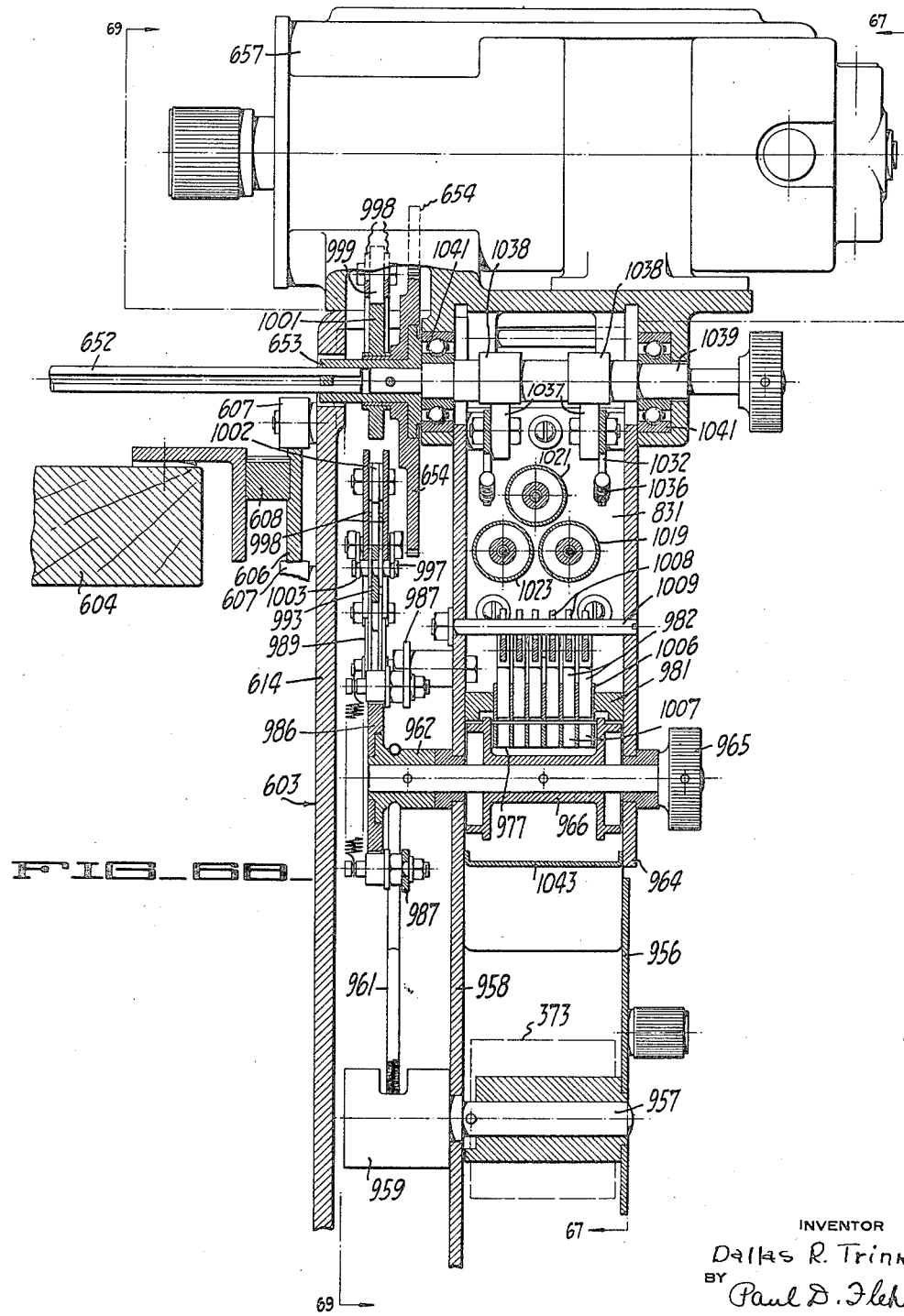

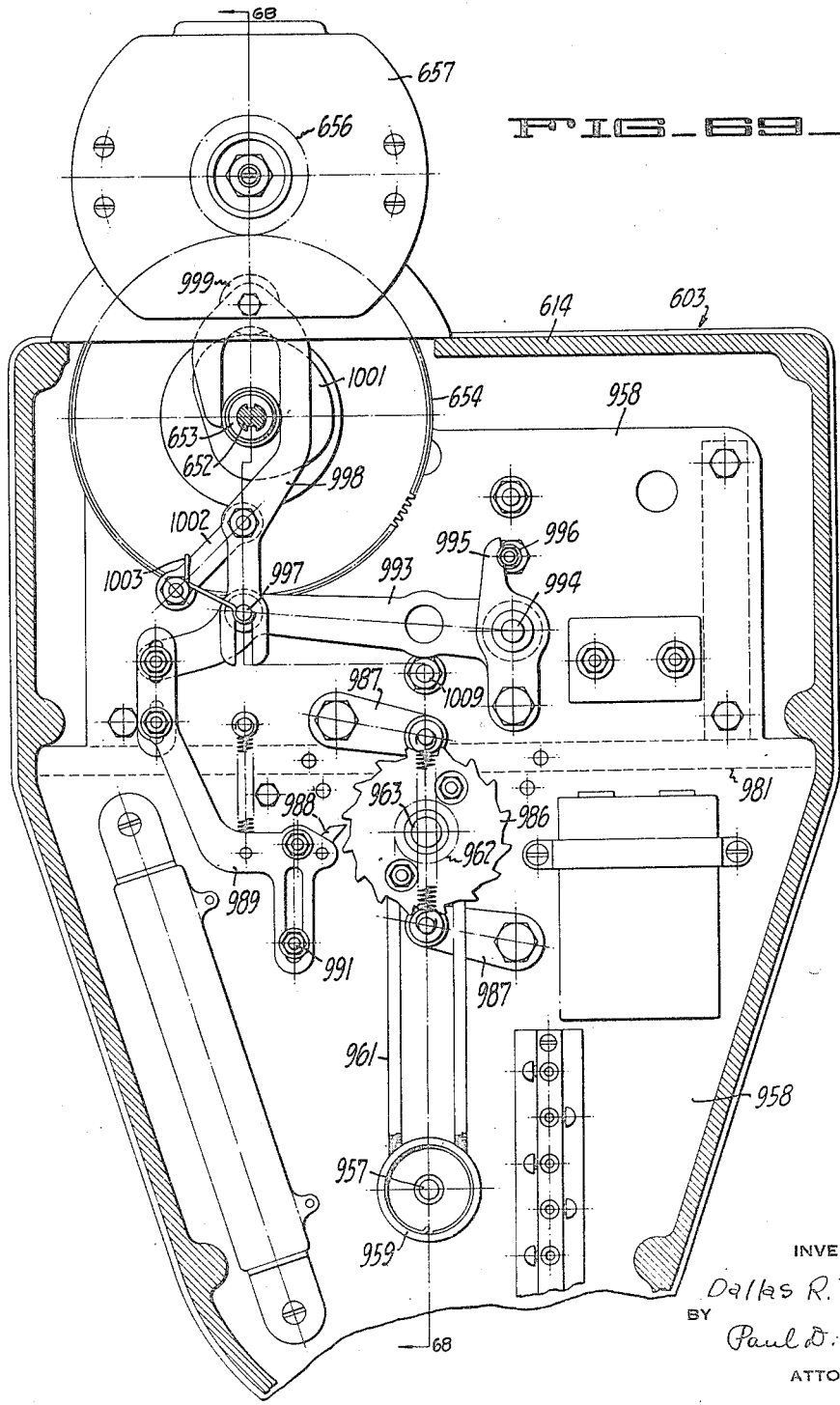

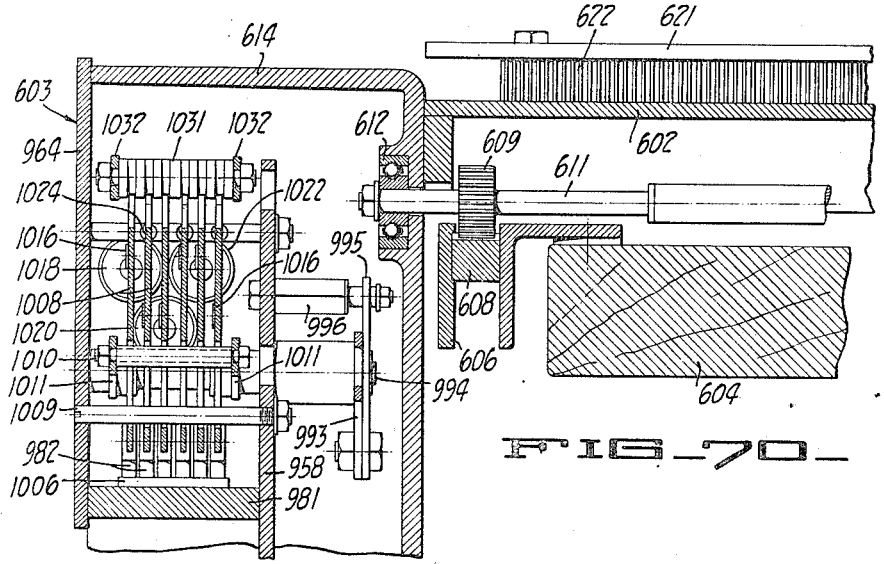
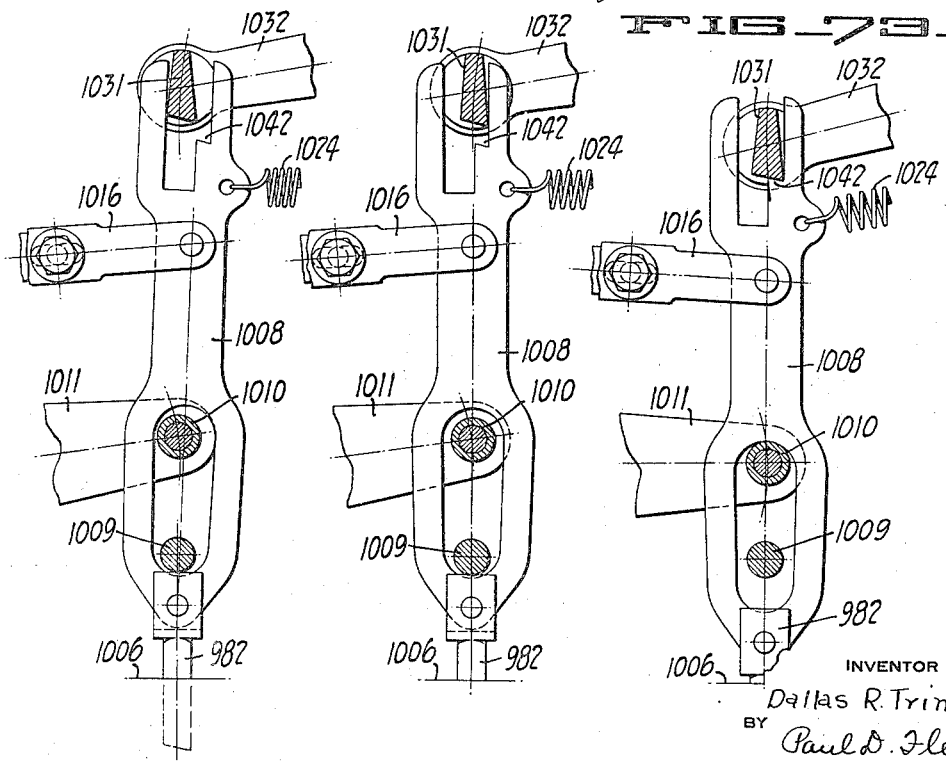

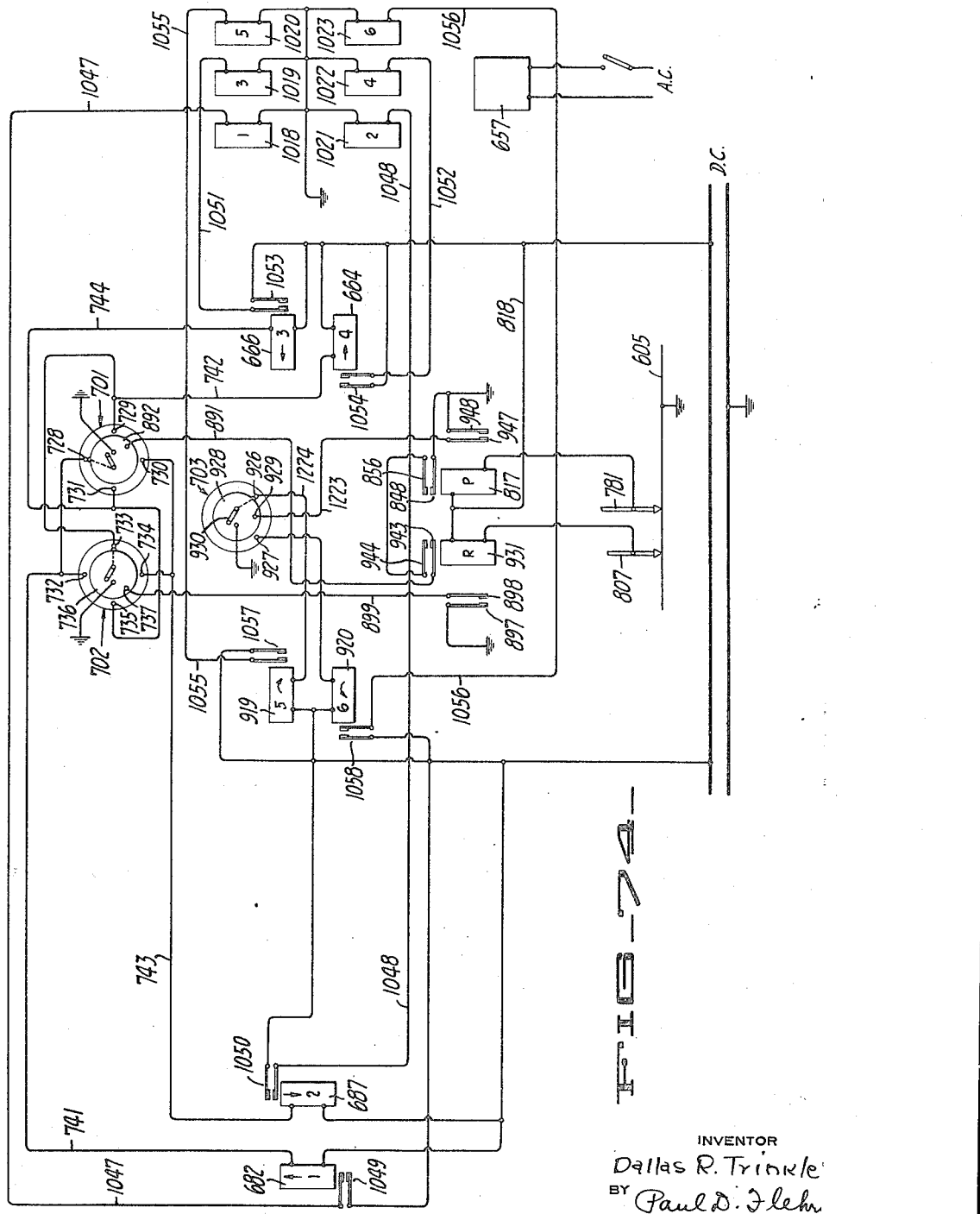

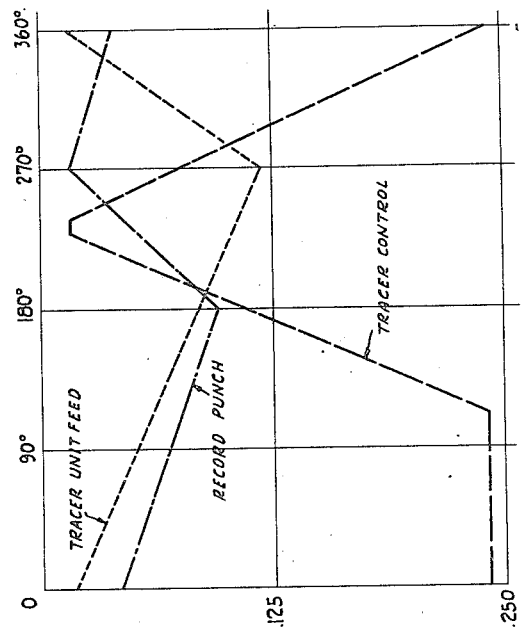
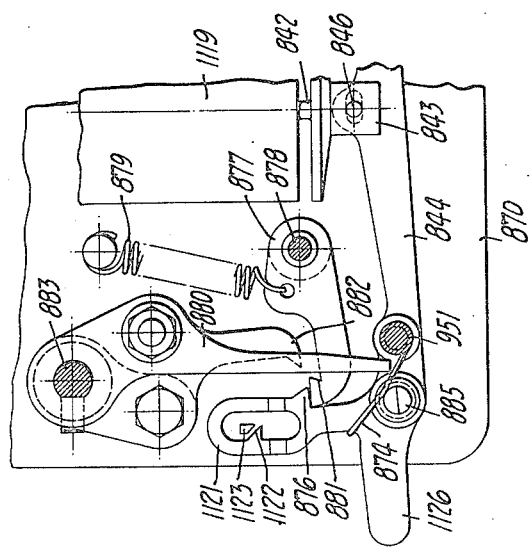

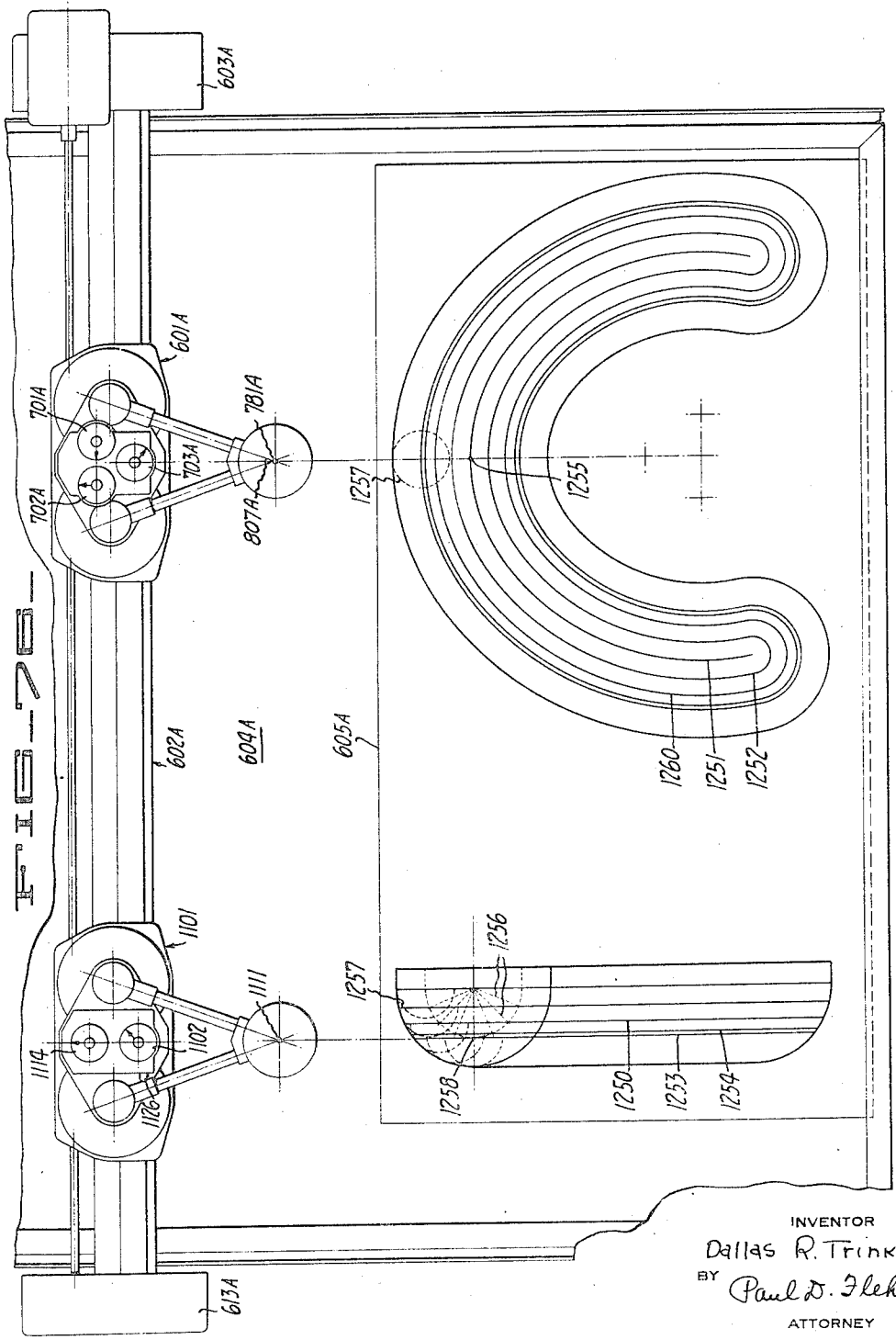

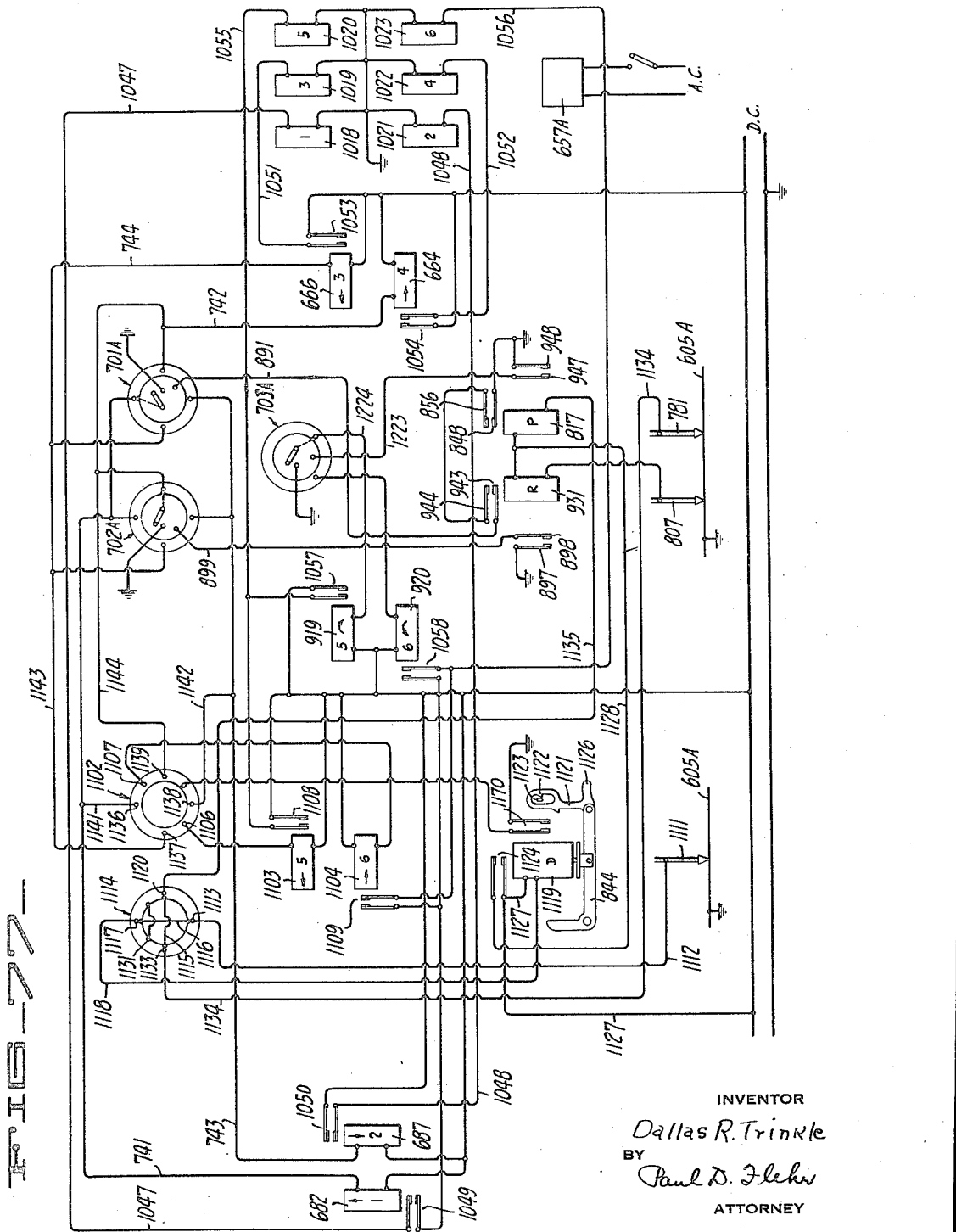

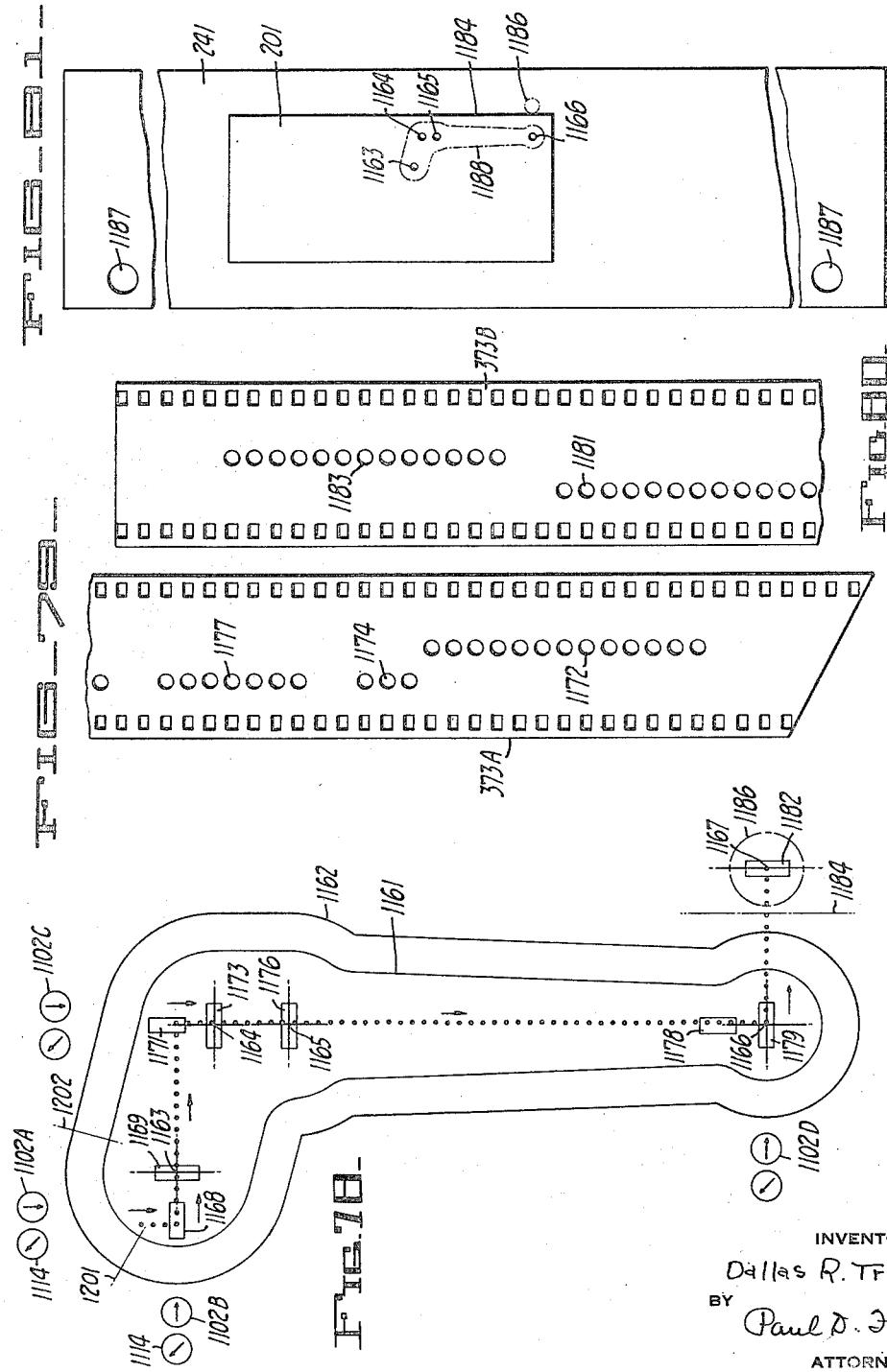

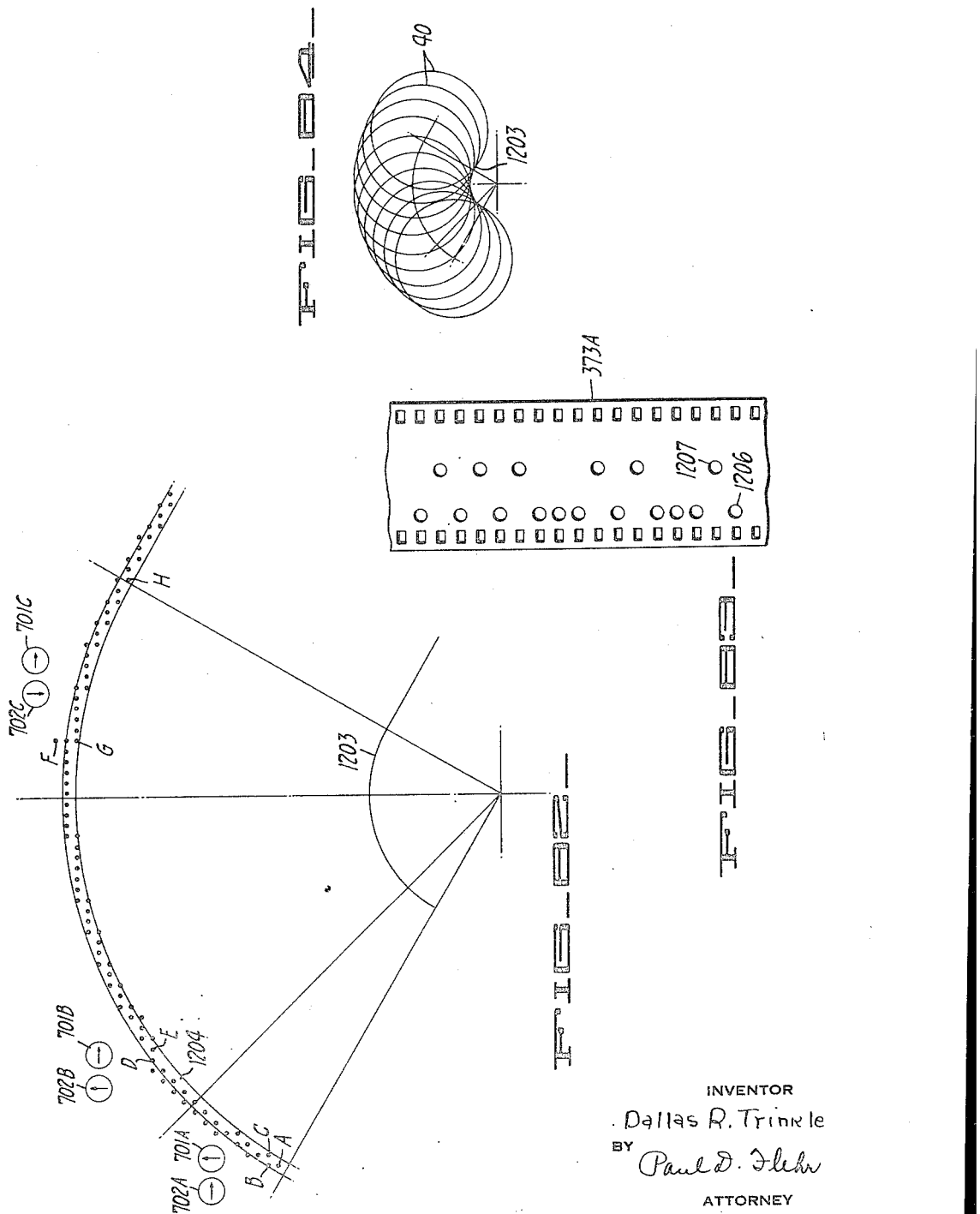

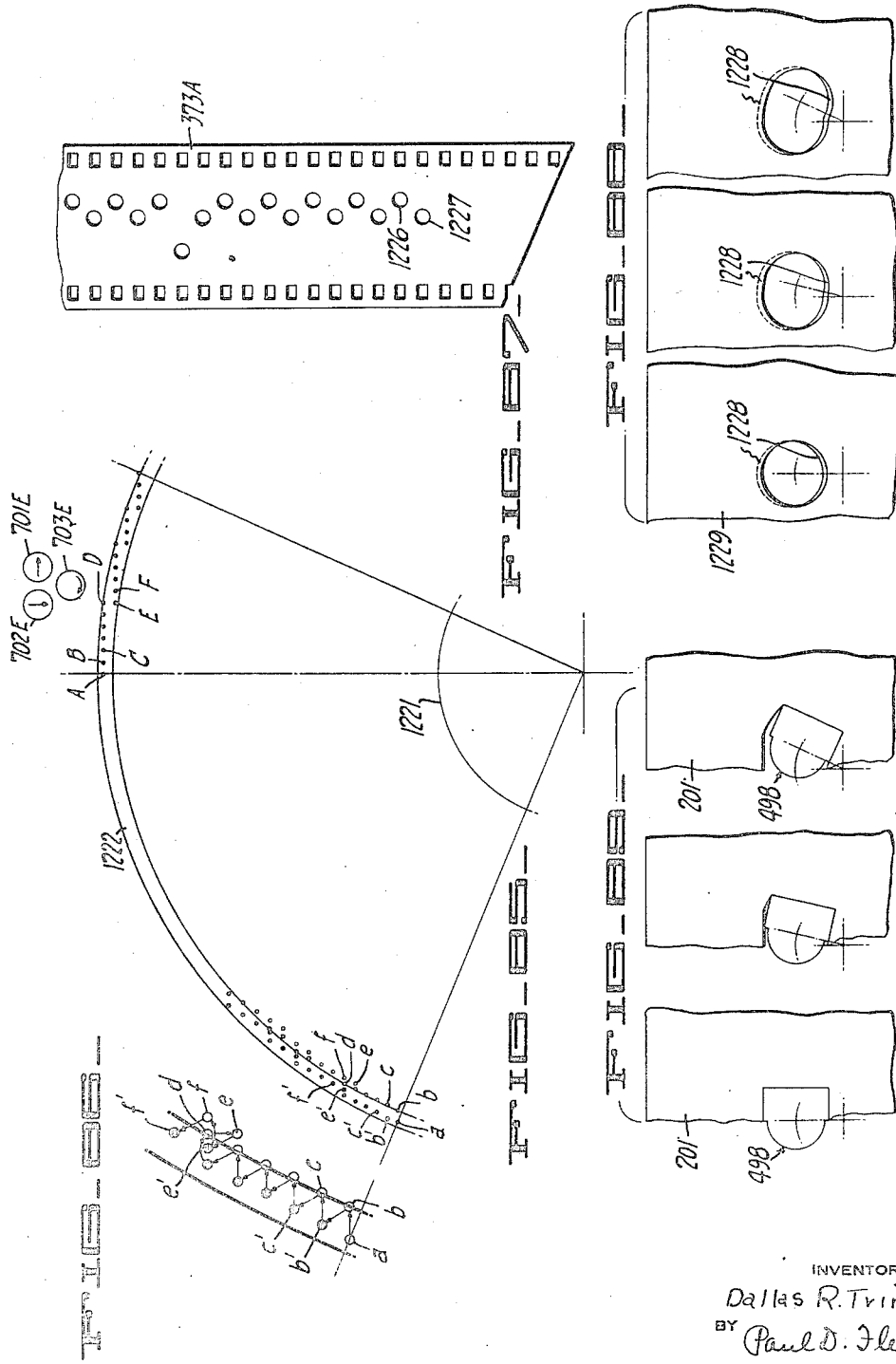

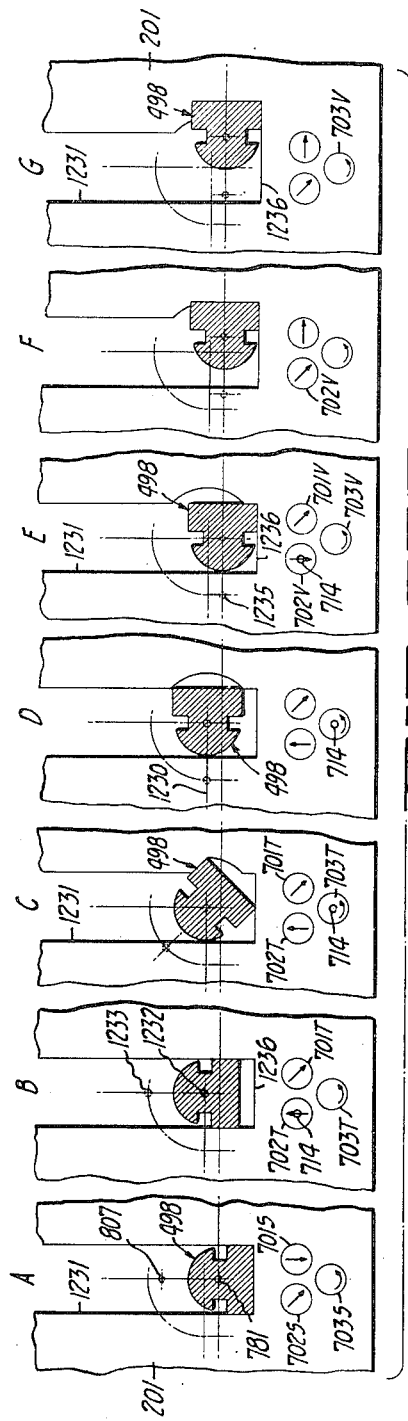
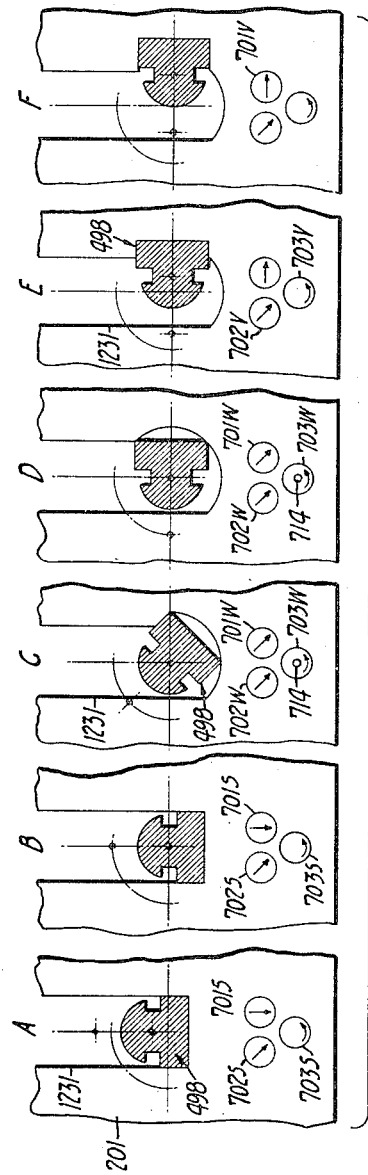

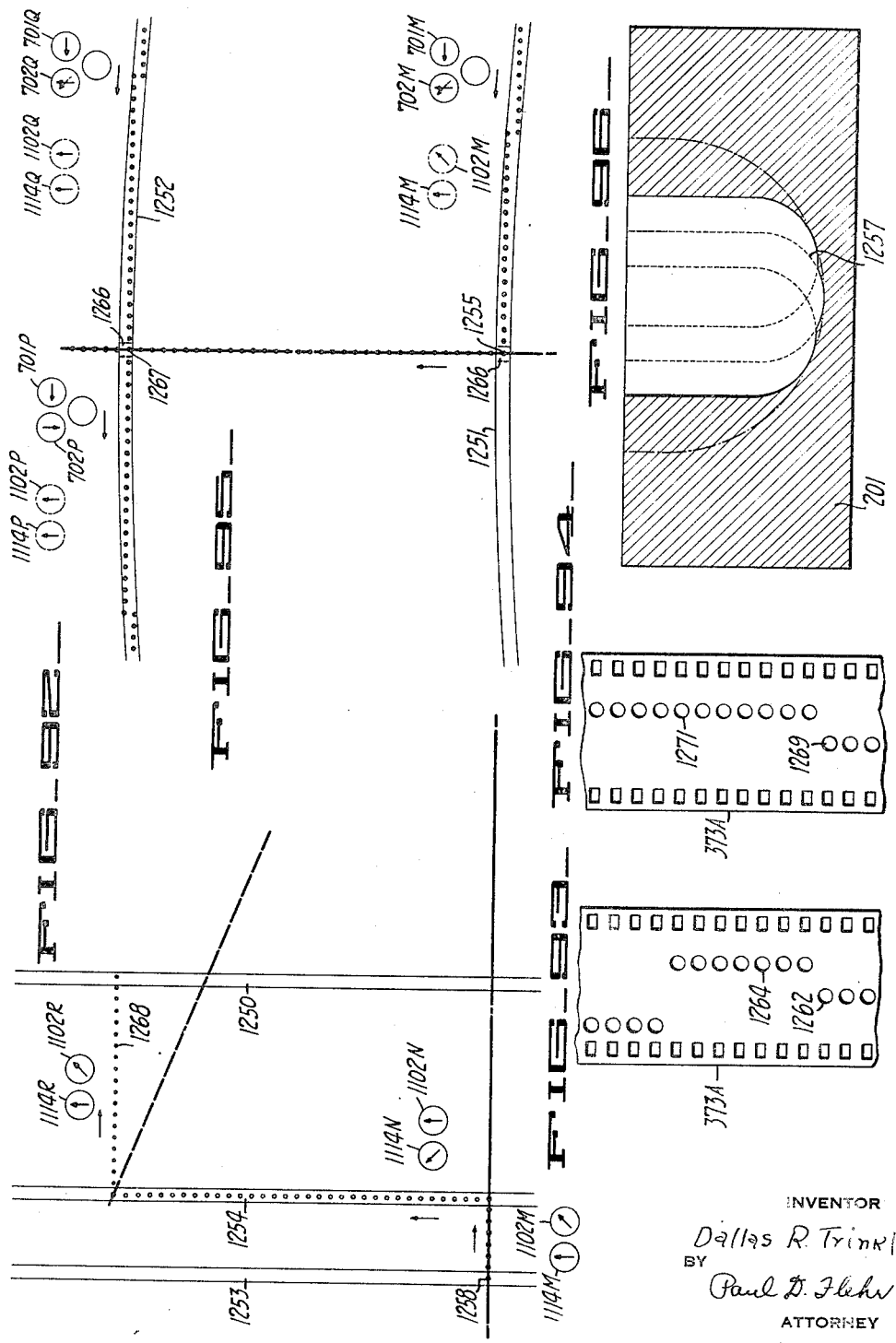

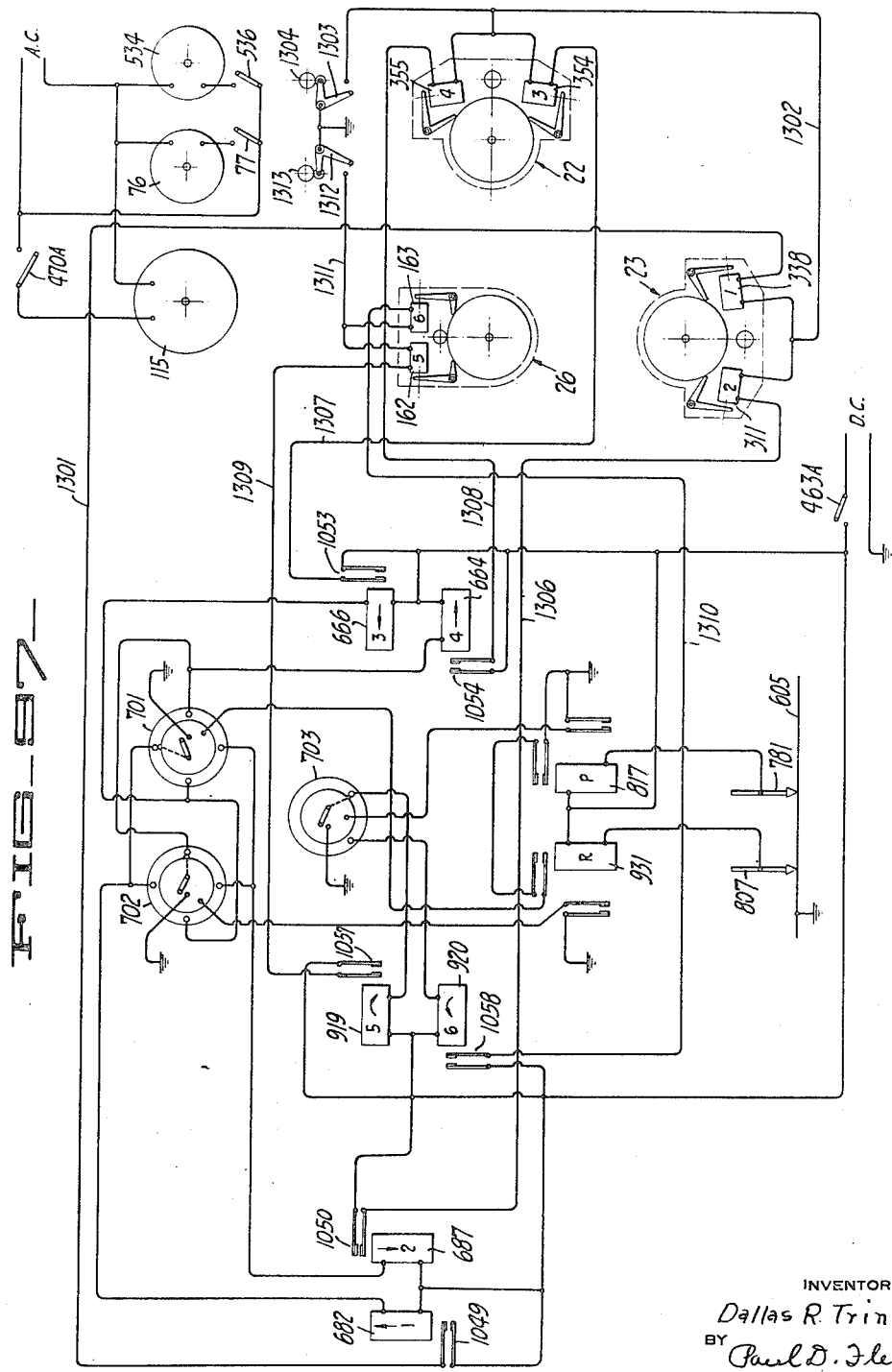

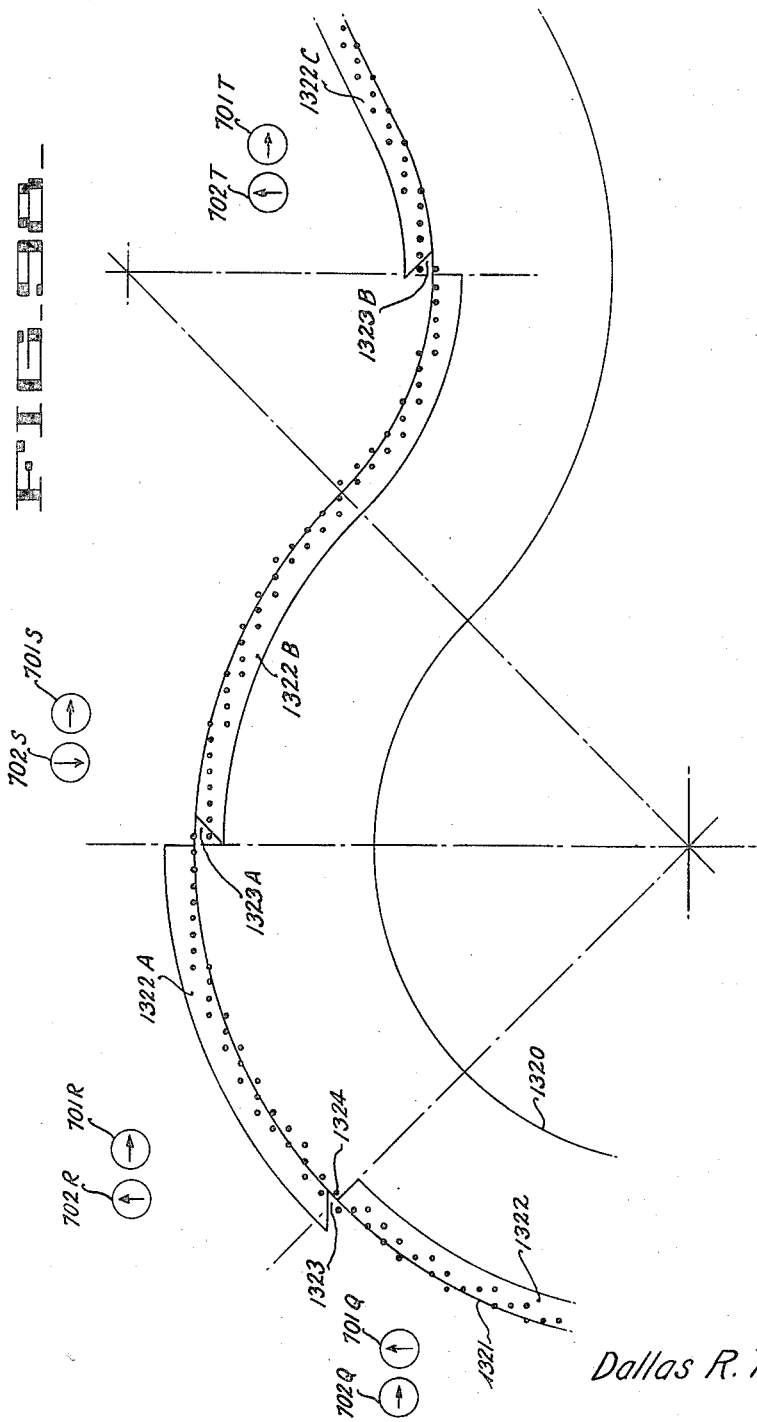

Patented Dec. 19, 1944

2,365,365

UNITED STATES PATENT OFFICE 2,365,365

CONTOURING MACHINE AND METHOD

Dallas R. Trinkle, Oakland, Calif., assignor to Merco-Trinkle Machine Co., San Francisco, Calif., a corporation of California Application August 20, 1941, Serial No. 407,670

14 Claims. (Cl. 90—13.5)

My invention relates primarily to the art of metal working and is concerned more particularly with the provision of improved methods and means for effecting automatic precision contouring or die sinking operations in accordance with a given outline or shape to be produced.

Generally my invention contemplates the use of an enlarged lay-out of the contour or shape to be produced, either two-dimensional or three-dimensional, tracing the lay-out by minute precise increments of movement, making a record of the successive increments of movement, and utilizing the record to control precise increments of relative movement on a reduced scale between the tool and the work during the actual cutting operation.

The invention provides many advantageous and novel features which contribute to extremely accurate operation, which is almost entirely automatic so that possible errors from operator-controlled operations are reduced to a minimum. One feature lies in the precise control of the feeding movements of the various operating parts both in tracing and machining. Another is found in the rapid intermittent cutting operation with the work rigidly held during engagement of the tool therewith but free for feeding movement when the tool is retracted, whereby a tool such as end mill, broach or boring bar by rapidly taking repeated minute cuts can remove considerably more material in a given unit of time than can be done with conventional methods. As a result, the cost of the die work and experimental work is substantially reduced.

Another feature lies in providing optimum working conditions for the cutter by continuously flushing away chips and lubricating the cutter so that its cutting edges are clean at all times, while the quantity of oil is such that cutter is kept cool and will be at no more than room temperature after hours of operation. Also the cutter employed may be exceptionally small, for example a $\frac{1}{16}''$ diameter end mill can be used in cutting through steel from $\frac{1}{2}''$ to $1''$ thick without noticeable deflection. In addition, the invention provides for a selection of the degree of accuracy by control of the ratio of the tracing increments to the work feeding increments.

The objects and advantages of the invention outlined above, and other objects and advantages will be apparent from the following detailed description made with reference to the accompanying drawings.

Description of figures

Figs. 1-44 relate to the metal cutting machine.

Fig. 1 is a front elevation of a metal cutting machine embodying my invention.

Fig. 2 is a side elevation of the machine.

Fig. 3 is a vertical longitudinal sectional view through the upper part of the machine, the view being indicated by the line 3—3 of Fig. 1.

Fig. 4 is a vertical transverse sectional view through the upper part of the machine, the view being taken in the plane of the line 4—4 in Fig. 3.

Fig. 5 is a horizontal sectional view taken in the plane indicated by the line 5—5 in Fig. 4.

Fig. 6 is a fragmentary horizontal section taken in the plane indicated by the line 6—6 in Fig. 4.

Fig. 7 is a bottom plan view of the cutting head, being taken as indicated by the line 7—7 of Fig. 4.

Fig. 8 is a sectional elevation of the tool drive mechanism as indicated by the line 8—8 in Fig. 2.

Fig. 9 is a fragmentary front elevational view of a part of the tool drive mechanism.

Fig. 10 is a fragmentary sectional view similar to the section in Fig. 3 and illustrating the mounting of the bottom center drill attachment for the machine.

Fig. 11 is a horizontal sectional view as indicated by the line 11—11 in Fig. 10.

Fig. 12 is a sectional elevation of a portion of the table feed mechanism as indicated by the line 12—12 shown in both Figs. 2 and 13.

Fig. 13 is a vertical sectional view taken in the plane of the line 13—13 in Fig. 12.

Fig. 14 is a transverse sectional view taken as indicated by the line 14—14 in Fig. 13.

Fig. 15 is a fragmentary sectional view taken in the plane of the line 15—15 in Fig. 13.

Fig. 16 is a detailed section of the work holding means, the view being taken as indicated by the line 16—16 in Fig. 1.

Fig. 17 is a fragmentary detailed section of another part of the work holding means, the plane of the view being indicated by the line 17—17 in Fig. 2.

Fig. 18 is a horizontal sectional view of a portion of the drive for the work table, the view being indicated by the line 18—18 in Figs. 2 and 22.

Fig. 19 is a detailed sectional view of the drive cam roller for the tool.

Fig. 20 is an enlarged detailed sectional view of the table feed adjusting means taken in the plane of the line 20—20 in Fig. 12.

Fig. 21 is an enlarged view of an actuating pawl for the table feed showing the pawl in operative position.

Fig. 22 is a sectional elevation of the record feeding and sensing means, the view being indicated by the line 22—22 in Figs. 2 and 25.

Fig. 23 is a plan view of a portion of the record guide means also shown in Fig. 22.

Fig. 24 is a sectional detail taken in a plane indicated by the line 24—24 in Fig. 22.

Fig. 25 is a sectional view taken in a plane indicated by the line 25—25 in Fig. 22.

Fig. 26 is an elevational view of the record feeding means taken as indicated by the line 26—26 in Fig. 25.

Fig. 27 is a detailed sectional view taken in the plane of the line 27—27 in Fig. 26.

Fig. 28 is a horizontal sectional view of the sensing means taken as indicated by the line 28—28 in Fig. 22.

Fig. 29 is an elevational view of the mechanism shown in Fig. 28, with a portion shown in section to illustrate certain details of constructions.

Fig. 30 is a detailed sectional view taken in the plane indicated by the line 30—30 in Fig. 28.

Fig. 31 is a vertical sectional view through the cutter mounting showing a broach in assembled position.

Fig. 32 is a sectional view taken in the plane of the line 32—32 in Fig. 31 and showing the drive for the broach shown in Fig. 31.

Fig. 33 is a schematic view illustrating an attachment for use in making cuts of less extent than the thickness of the work.

Fig. 34 is an enlarged view of the lower portion of Fig. 4.

Fig. 35 is a sectional view generally similar to Fig. 4 showing the construction and mounting of a piloted end mill.

Fig. 36 is a sectional view of the piloted end mill as indicated by the line 36—36 in Fig. 35.

Fig. 37 is a sectional view similar to Fig. 35 showing the construction and mounting of a piloted broach.

Fig. 38 is a horizontal sectional view taken in a plane indicated by the line 38—38 in Fig. 37.

Fig. 39 is a horizontal sectional view taken in a plane indicated by the line 39—39 in Fig. 37.

Fig. 40 is a fragmentary sectional view illustrating the mounting of a top center drill.

Fig. 41 is a fragmentary view showing the mounting of a boring bar.

Fig. 42 is similar to Fig. 41, but shows a piloted boring bar.

Fig. 43 is a timing diagram of the machine and the electrical circuit therefor.

Fig. 44 is a circuit diagram of the control for the metal cutting machine.

Figs. 45–77 illustrate the tracing and recording apparatus.

Fig. 45 is a plan view of the tracing apparatus equipped with a single tracing head.

Fig. 46 is a sectional view of one of the control knobs taken in a plane indicated by the lines 46—46 in Fig. 45.

Fig. 47 is an elevational view of the tracer unit carriage taken as indicated by the line 47—47 in Fig. 45.

Fig. 48 is a sectional elevation of a portion of the feed mechanism taken in a plane indicated in the line 48—48 in Fig. 45.

Fig. 49 is a sectional elevational view of the feed mechanism taken in the plane indicated by the line 49—49 in Fig. 48.

Fig. 50 is a general sectional view taken in planes indicated by the line 50—50 in Fig. 45.

Fig. 51 is a rear elevational view of the tracing unit.

Fig. 52 is a detailed sectional view of a circuit breaker as indicated by the line 52—52 in Fig. 51.

Fig. 53 is a sectional view of a solenoid and its mounting as indicated by the line 53—53 in Fig. 63.

Fig. 54 is an enlarged detailed section of one portion of Fig. 53.

Fig. 55 is a sectional plan view of a portion of the tracing carriage taken in a plane indicated by the line 55—55 in Fig. 50.

Fig. 56 is a sectional plan view of a part of the tracing cam control means as indicated by the line 56—56 in Fig. 50.

Fig. 57 is a sectional plan view of a portion of the tracing apparatus taken in planes indicated by the line 57—57 in Figs. 50 and 51, with the two portions of the line shown at 57a and 57b in Fig. 50.

Fig. 58 is a view similar to the left portion of Fig. 57 but showing the parts in a different operative position.

Fig. 59 is a sectional view of the tracer head as indicated by the line 59—59 in Fig. 50.

Fig. 60 is an enlarged sectional view of the tracing points taken in the same plane as the similar view in Fig. 50.

Fig. 61 is a front elevational view of the tracer unit control means.

Fig. 62 is a sectional view in line 62—62 of Fig. 61.

Fig. 63 is a sectional view in line 63—63 of Fig. 61.

Fig. 64 is a sectional view in line 64—64 of Fig. 61.

Fig. 65 is an enlarged portion of Fig. 63 with the parts shown in a different operative relation.

Fig. 66 is a fragmentary side elevation of the parts shown in Fig. 65.

Fig. 67 is a sectional elevation of the recording apparatus taken in a plane indicated by the line 67—67 in Fig. 68.

Fig. 68 is a sectional view of the recording apparatus taken in a plane indicated by the line 68—68 in Fig. 69.

Fig. 69 is an elevational view of the recording mechanism taken as indicated by the line 69—69 in Fig. 68.

Fig. 70 is a sectional view of the recording mechanism taken in a plane indicated by the line 70—70 in Fig. 67.

Fig. 71 is an enlarged view of a punching element similar to the view shown in Fig. 67, with the element in inoperative position.

Fig. 72 is a view similar to Fig. 71 but showing the punching element in an active position but not operated.

Fig. 73 is similar to Figs. 71 and 72 but shows the parts in operated position.

Fig. 74 is a circuit diagram for the tracing apparatus.

Fig. 75 is a timing diagram of the tracing apparatus.

Fig. 75A is a fragmentary detail of the stop control tracing apparatus.

Fig. 76 is a plan view of the three-dimensional tracing apparatus.

Fig. 77 is a wiring diagram of the three-dimensional tracing apparatus.

Figs. 78–96 are diagrammatic views illustrating the operation of the apparatus.

Fig. 78 illustrates center tracing.

Figs. 79 and 80 illustrate the record of center tracing.

Fig. 81 illustrates the center drilling operation.
Fig. 82 illustrates two-dimensional tracing.
Fig. 83 illustrates the record for two-dimensional tracing.
Fig. 84 illustrates end milling positions.
Fig. 85 illustrates rotational tracing.
Fig. 86 is an enlarged view of the intial part of the rotational tracing in Fig. 85.
Fig. 87 is a record of rotational tracing.
Fig. 88 illustrates angular clearance or draft cutting.
Fig. 89 illustrates rotational control of the broach.
Fig. 90 illustrates tracing and cutting on internal corner.
Fig. 91 illustrates tracing and cutting on external corner.
Fig. 92 illustrates stop line tracing for depth control enlarged from Fig. 76.
Figs. 93 and 94 show records of cutter depth control.
Fig. 95 shows another portion of depth tracing operation enlarged from Fig. 76.
Fig. 96 illustrates depth controlled machining.
Fig. 97 is a circuit diagram of a modified form of the invention in which the tracing apparatus is connected to the contouring machine for direct control of the machine during the tracing operation.
Fig. 98 illustrates a modified method of tracing.

Description of cutting machine

The frame of the machine (Figs. 1 and 2) comprises a hollow upright base casting 10, having a flanged base 11 and provided with a machined pad 12 at its upper end. The pad 12 supports an elongated bed casting 13 which extends from the front to the rear of the machine (from left to right in Fig. 2) and serves to support the work table, and the feed mechanism therefor and a part of the record control mechanism. Upright standard or frame 16 is mounted on bed 13 and serves to support the tool and its drive and control mechanisms.

The work table 21 (Figs. 1 and 2) is mounted for movement to the right and left as viewed in Fig. 1, which will be termed the longitudinal feed, and for movement to the right and left in Fig. 2 which will be termed the transverse feed. The longitudinal feed is controlled by a feed mechanism indicated generally at 22 while the transverse feed is controlled by a feed mechanism indicated generally at 23.

It will be understood, therefore, that the work table is capable of movement back and forth in two directions at right angles to each other to definitely locate the work with reference to the tool, and this movement is effected in step-by-step fashion in small equal increments. The increment of movement can be selected so that the position of the work table with reference to the tool can always be precisely controlled.

The tool assembly is indicated generally at 26 and the tool itself is given both a vertical reciprocatory movement and a rotary movement as will be described later in detail in connection with the various types of tools which can be employed.

Both the feed for the table and the drive for the tool are positively timed with the record sensing and control mechanism indicated generally at 27, in Fig. 2, in a manner later described.

Tool and tool mounting

As previously stated the end milling tool disclosed in Fig. 4 is mounted for both rotation and for reciprocation. End mill 40 (Figs. 4 and 34) is provided with shank 41 of reduced diameter which has a ground and lapped fit within a bushing 42 whose lower end abuts the fluted portion 40 of the tool. The ground and lapped fit provides a clearance in the order of one hundred thousandths of an inch between the end mill shank and the bushing 42. In this way the tool is accurately centered in the bushing and substantially no side play is present. Bushing 42 is also provided with a ground and lapped fit within an outer guide collar 43 having an enlarged lower end 44 with a precision lapped fit in a seat 46 of a clamping sleeve 47. The upper end of collar 43 also is provided with a precision lapped fit within the sleeve 47.

Lubricating means are provided for insuring an adequate supply of lubricant to the bearing surfaces of the tool and its mounting means. Between bushing 42 and collar 43 an oil passage is provided at either side by means of vertical grooves 48 in bushing 42, communicating with annular grooves 49 in collar 43. From upper groove 49 a plurality of radial passages 50 lead from the upper ends of vertical passages 48 to an annular groove in bushing 42 about shank 41 to supply oil to the bearing surfaces thereof. The annular grooves 49 are fed through a plurality of openings 51 from an annular oil space 52 provided between collar 43 and clamping sleeve 47. Space 52 in turn is fed through radial passages 53 from annular groove 54 on the outer surface of clamping sleeve 47, which communicates with vertical passage 56 in bearing sleeve 57 press fitted in arm 58 of frame 16. The oil is supplied through lead pipe 59 (Fig. 4) in a manner later described, so that the bearing surfaces between bushing 42, collar 43, sleeve 47 and shank 41 are all continuously supplied with lubricant.

The normal position of end mill 40 with respect to bushing 42 is shown in Figs. 4 and 34, where the bushing 42 is against the shoulder provided at the upper end of the fluted portion where it is maintained by spring 61 (Figs. 4 and 34) compressed between bushing 42 and the hub 62 forming part of a universal joint 63. The upper side of universal joint 63 is connected to tubular rod 64 which is connected at its upper end by universal joint 66 with a tubular shaft 67. Shaft 67 (Fig. 9) is provided with a suitable flat engaged by a set screw 68 threaded in a sleeve 69. Sleeve 69 is journalled by a bearing 71 in slide 72 (Figs. 4 and 9). At its upper end sleeve 69 carries pulleys 73 which are driven through belt 74 (Fig. 3) from a suitable pulley 75 connected to the shaft of motor 76.

By loosening set screw 68 (Fig. 9) the tool assembly including shaft 67 and associated parts can be withdrawn through the sleeve 69.

The motor 76 which is controlled by switch 77 (Fig. 2), serves to rotate the end mill through the drive connections described and usually the rate of rotation is in the order of 1500 to 2500 revolutions per minute.

Slide 72 (Fig. 9) is mounted for vertical sliding movement by means of apertured bosses 81 which are slidably engaged with respective vertical rods 82 extending upwardly from plate 83 (Figs. 4 and 9). Plate 83 is secured by suitable bolts at the flanged upper end of boss 84 (Figs. 3 and 9) of arm 86 of the frame 16.

The entire tool assembly is spring urged downwardly and its vertical movement is controlled through power driven cam means as will now be described. As seen in Figs. 3, 4 and 9, rods 82 are provided with recessed collars 91 to receive springs 92 also seated in plate 93 which is apertured to slidably engage rods 82. Plate 93 is connected by rods 94 with slide 72, so that the slide and the entire tool assembly are spring urged downwardly by means of the springs 92.

To provide the cam drive for controlling reciprocation of the tool assembly, slide 72 (Figs. 3, 9 and 19) is provided with roller 95 comprising flanged sleeve 96, outer casing 97 and oil-proof, rubber core 98 inserted therebetween. The sleeve 96 is secured by a suitable cap screw and washer to a journal 99 on slide 72.

Roller 95 (Figs. 3 and 9) is engageable with cam 102 secured at the end of shaft 103 which is journalled in bearings 104 and 106 suitably mounted on the top surface of arm 86 of the frame 16. Within casing 111 on frame 16, shaft 103 carries pulley 112 (Figs. 3 and 8) which is driven through belt 113 from a suitable pulley 114 on the shaft of motor 115 suitably bolted on pad 116 (Fig. 8) of frame 16.

Motor 115 is the main driving motor of the machine and as will be explained hereinafter all the timed movements of the machine are driven from this motor.

From the foregoing description it will be seen that the tool assembly is reciprocated once during each cycle of operation of the machine and the contour of the cam 102 is such that the tool has a working stroke of approximately 180°, a return stroke of approximately 90° and a dwell at its high position of about 90° to enable feeding of the work. The roller 95 is spring urged downward to follow the cam 102 during the working stroke of the tool and is positively retracted by the cam. For this reason if the tool should jam or be unable to remove the stock no damage can be done to the cutter.

*Depth adjustment.*—Because the tool is spring urged downwardly during its operating stroke the depth of cut can be controlled by means of an adjustable stop which may be adjusted either manually or automatically from the work record as will be later described.

For this purpose the plate 93 (Fig. 4) is provided with an insert 121 of non-metallic material such as fiber for engagement with the flanged upper end 122 of a threaded sleeve 123 having threaded engagement with a collar 124 threadedly mounted within the plate 83. By turning sleeve 123 it will be moved up or down in accordance with the direction of turning to enable the adjustment of its upper end 122 with respect to the insert 121.

To provide for automatic depth adjustment of the tool, the sleeve 123 has associated therewith a reversible actuating mechanism which may be automatically controlled to rotate the sleeve in a step-by-step fashion in timed relation to the vertical reciprocations of the tool so that a movement of the sleeve can occur only when the tool is withdrawn from the work as shown in Fig. 4. The sleeve 123 is provided at its lower end with a collar 126 (Figs. 3 and 4) which has opposite split extensions 127 engaged with complemental slots 128 milled in the upper end of clamping sleeve 47. The splitting of extensions 127 provides a spring-pressed connection with sleeve 47 to prevent back-lash occasioned by wear due to relative sliding motion therebetween.

The sleeve 47 (Figs. 4 and 5) is provided with a pair of vertically spaced apart oppositely disposed ratchet wheels 131 and 132 which are separated by an interposed collar 133 and held against a shoulder of the sleeve 47 by a clamping collar 134 having threaded engagement with sleeve 47.

Above and below the respective ratchet wheels 131 and 132 (Figs. 3 and 4) a pair of opposite plates 135 are secured in spaced apart relation by studs 136. The upper plate 135 has a lapped running fit with a seat in clamping collar 134, while the lower plate 135 has a similar fit about the sleeve 47. Lower plate 135 is spaced from the ratchet wheel 131 by a suitable spacing collar. The respective plates 135 are restrained against rotation by means of slide 141 (Figs. 3 and 5) which is mounted on arm 58 of frame 16 for endwise movement of studs 142 engaging longitudinal slots in the slide. Slide 141 (Fig. 5) enters a recessed portion of the plates 135 and is engaged by rollers 144 journalled on upper plate 135 by suitable studs mounted eccentrically in upper plate 135 to provide for adjustment of the rollers relative to the slide.

As seen in Fig. 5, upper ratchet wheel 132 has its teeth disposed for rotation or actuation in a counter-clockwise direction while lower ratchet wheel 131 has its teeth disposed for actuation in a clockwise direction. To effect actuation of the ratchet wheels similar pawls 146 and 147 are pivoted by respective studs 148 on bellcranks 151, 152 and are spring-urged toward eccentrically adjustable stops 149 in a manner later described. Stops 149 are similar to the stop shown in detail in Fig. 21. Bellcranks 151 and 152 are pivoted on studs 153 between plates 135, bellcrank 151 being urged in a counterclockwise direction and bellcrank 152 being urged in a clockwise direction, by respective springs 154 which are indicated diagrammatically. In practice the springs are of the double construction shown at 324 in Fig. 12. Springs 154 (Fig. 5) are disposed about stop rods 155 pivoted at one end to respective bellcranks 151, 152 and passing through vertical studs 136 at their opposite ends. Stop rods 155 are provided with adjustable nuts 156 which limit the feed stroke of bellcranks 151, 152 in following slide 141.

The adjacent ends of bellcranks 151 and 152 (Fig. 5) are offset vertically and are provided with respective rollers 157 engaging the end of slide 141 under the influence of respective springs 154. The reciprocation of slide 141 in a manner later described serves to oscillate the bellcranks 151 and 152 in opposite directions and to effect a movement of the pawls 146 and 147 with respect to their respective ratchet wheels 131 and 132. Actuating movement of the pawls is effected by their springs 154, and they are restored by slide 141. However such movement is normally inoperative with respect to the ratchet wheels and is only made operative under control of the record which is controlling the machine operation.

To enable this record control, each bellcrank 151, 152, (Fig. 5) is provided with an arm 161 on which solenoids 162 and 163 are secured by means of clamps 164, so that each solenoid moves as a unit with the respective bellcrank on which it is mounted. The respective solenoids 162, 163 are provided with armatures 166, 167 which are connected by similar armature arms 168 with respective actuating pawls 146, 147. Each arm 168 is pivoted about a pin 148 and has an adjustable bolt and slot connection 169 with the associated pawl. Each connection 169 is similar to the one shown in detail in Fig. 21, and arms 168 are spring-urged similarly to the armature arm shown in Fig. 21.

Whenever one of the solenoids is energized by completion of its electrical circuit, its associated pawl will drop into engagement with the associated ratchet wheel; so that the subsequent movement of the associated bellcrank upon rearward movement of slide 141 will cause a one step movement of the ratchet wheel and thus lower or raise stop sleeve 123.

In order to prevent overthrow of a ratchet wheel and confine its movement to a precise increment, brake means are associated with the actuated assembly in the form of opposed brake shoes 171 at the similar ends of levers 172 pivoted on a pair of studs 136. The adjacent ends of the levers 172 are connected by an adjusting link 173 so that the pressure of the shoes 171 on the collar 133 (Figs. 3 and 4) can be adjusted.

The record control of the solenoids 162 and 163 is described hereinafter and it is sufficient for the present to understand that when one of the solenoids is energized (at the time slide 141 is stationary in its forward position) a one step movement of the ratchet wheel and the adjusting screws 123 will be effected in either an upward or a downward direction in accordance with which of the solenoids 162 and 163 is energized.

Because the pawls 146 and 147 (Fig. 5) are normally out of engagement with the ratchet wheels, the depth adjustment can be varied manually at any time.

To provide for the timed reciprocation of slide 141, the slide (Fig. 3) is spring-urged to the left by means of spring 176 surrounding rod 177 which is guided in an adjustable sleeve 178, threaded in a wall of frame 16 so that the tension of the spring 176 can be adjusted. Also sleeve 178 can be removed to enable disengagement of slide 141 from the plates 135 so that they can be swung freely for inspection or repair. Slide 141 is provided with a shoulder 179 engaged by a suitable roller at the lower end of a bellcrank 181 pivoted at 182 on arm 86 of the frame 16. The upper horizontal arm of bellcrank 181 overlies a pin 183 (Figs. 3 and 8) carried in a recessed bracket 184 which is adjustably secured on spaced rods 186 depending from a cam follower 187. Roller 188 is journalled in follower 187 for engagement with cam 189 carried on shaft 103. As seen in Fig. 8 cam 189 is provided with a low radial dwell for approximately 90° when the slide 141 is advanced so that one of the solenoids 162, 163 can be energized to engage a pawl with its corresponding ratchet wheel to determine an incremental adjustment of the depth of the cut.

From the above description it is seen that through the cam follower assembly 188, 187, 186, 184, and bellcrank 181, slide 141 will be reciprocated once during each cycle of operation of the machine. And the relation of cams 189 and 102 is such that the active stroke of the reciprocation of the slide 141 occurs during the time when cam 102 is active to raise the tool assembly out of engagement with the work. Thus any change in the depth adjustment for the tool occurs while the tool is inactive, and insert 121 is held above end 122 of screw 123 as shown in Figs. 3 and 4.

*Work clamping mechanism.*—A work clamping mechanism is provided which operates to positively hold the work against movement during the cutting stroke of the tool and its withdrawal and to release the work while the tool is out of engagement therewith to permit the step-by-step movement of the work in a manner later described.

Referring to Figs. 1 and 4, it will be noted that the work 201 is positioned between the work clamping sleeve 47 and flange 202 of the work supporting collar 203. Collar 203 has a lapped precision fit within bushing 206 which is pressed in boss 207 of arm 208 of the frame 16. The arrangement is such that the work is clamped between guide collar 43 in clamping sleeve 47 and work supporting collar 203 and the part of the work being cut by the tool is always supported by the collar flange 202, rather than by the work table, which merely serves to locate the work. In order to provide for the actual clamping of the work by guide collar 43, its lower end surface (Fig. 34) projects slightly beyond the end surface of sleeve 47.

The work clamping means operates in a timed relation to the reciprocating drive for the tool, and to provide for its clamping movement the sleeve 47 (Figs. 4 and 6) carries a threaded collar 211 adjustably mounted thereon and held in place by lock nut 212. Collar 211 is provided with annular groove 213 which is engaged by opposite spring-urged retaining pins 214. Pins 214 are slidably carried by respective sleeves 216 mounted in a pair of opposite clamping levers 217 pivoted at 218 (Fig. 3) in arm 86 of frame 16. Levers 217 are pivotally connected at their rearward ends to the lower ends of rods 186. Thus by the operation of cam 189 the levers 217 are oscillated, and through their engagement with the upper flanged face of collar 211 exert a downward thrust on sleeve 47 so that guide collar 43 is pressed against the work as shown in Fig. 4. Pins 214 serve to retain sleeve 47 in position when no work is in place and to lift the sleeve clear of the work during its removal and replacement. By virtue of the threaded connection between collar 211 and sleeve 47 an accurate adjustment can be made with respect to the levers 217 so that a firm holding pressure is obtained without placing undue strain on the mechanism.

As seen in Figs. 4 and 6 flats 219 of pins 214 permit their insertion in groove 213, and when flats 219 are at right angles to the groove pins 214 cannot enter it. This condition obtains during normal operation when collar 43 floats on the work when not clamped thereon to prevent chips entering between the surfaces of collar 43 and the work.

As seen in Fig. 8, the low dwell of cam 189 occupies approximately 90° during which the clamping means is released, and the high portion of the cam otherwise maintains the clamping action. The 90° dwell of cam 189 corresponds to the similar dwell of cam 102 for the tool.

*Lubricating and flushing system.*—Means are provided for circulating oil under pressure to the work to flush away and dispose of the chips which would otherwise interfere with the cutting operation, and to keep the cutter cool. As seen in Fig. 1, the lower end of casting 10 is formed as a sump 220 which provides a reserve supply of oil from which oil may be withdrawn through valve-controlled pipe 221 by gear pump 222 of conventional construction. Ordinarily, however, oil is withdrawn through flexible hose 223 from tank 224 to which it is also returned as later described. Pump 223 is driven through chain and sprocket means 225 from shaft 346 referred to hereinafter. From pump 222 the oil is forced through filter 226 and pressure gauge 227 (Figs. 1 and 2) is provided in the line. From filter 226 an oil line 228 leads upwardly through the castings 10, 13, and 16 (Fig. 3) to a pair of outlets 229 and 231. Outlet 231 connects with pipe 59 (Figs. 1 and 4) while outlet 229 connects with a pipe referred to hereinafter.

Referring to Figs. 4 and 34 it will be seen that oil under pressure is forced from pipe 69 through space 56 (Fig. 4) and passage-53 into oil space 52. At the lower end of space 52 (Fig. 34) an annular groove 232 in shoulder 44 is provided from which a plurality of downwardly converging passages 233 (Figs. 4, 7 and 34) lead to the lower surface of collar 43, with their lower ends converging sharply to direct the oil against the cutter. As seen in Fig. 7 certain of the passages 233 are always open to spray directly against the tool. In addition radial grooves 234 at the lower end of each passage 233 provide for feeding of oil to the tool even when the direct spray is prevented by the work, and the tool is withdrawn immediately above the work. Thus the cutting edges of the tool are always cleaned of chips and a low cutting temperature is maintained.

The chipladen oil falls through strainer 230 to which it feeds either directly or from similar oil troughs 235 on the sides of arm 208 of standard 16. Strainer 230 retains the major portion of the chips. From screen 230 the partially strained oil flows down suitable oil channels in the table 253 (referred to hereinafter) to the tank 224.

The above described flushing system provides for adequate chip disposal when the cutter is cutting entirely through the work. To facilitate chip disposal when the cut does not extend through the work and no bottom opening is available for discharge, special means is provided for attachment to the work clamping sleeve to provide for clamping of the work while also providing an outlet for the chipladen oil over the top of the work. Referring to Fig. 33, work 201 is shown having a cut 238 which does not extend entirely therethrough. Collar 239 fits closely over the lower end of sleeve 47 and has a spring-grip fit therewith. Collar 239 has a plurality of thrust transmitting ribs 240 extending radially outward from the central aperture therein, so that a plurality of oil discharge passages are provided between the ribs. In this way the oil can flow upwardly out of the cut 238 and over the top of the work.

Work table and table feed

*Work holding means.*—As previously described the work is releasably clamped or held upon a table which is mounted for feeding movement in two directions. Referring to Fig. 1, the work 201 is suitably fastened upon a plate 241 as by clamping, dowelling, cementing, soldering or other suitable means, and the ends of the work support 241 are positioned and clamped upon similar brackets 242 (Figs. 1 and 16) by means of clamping bars 243.

To provide for clamping of the work each bracket 242 is provided with a bolt 244 (Fig. 16) which is held in place with respect to bracket 242 by a suitable clamping nut and is cut away at one side to provide a flat engaged by pin 245 which prevents turning of the bolt with respect to the bracket 242. The upper end of each bolt 244 is also threaded to receive a clamping nut 246, having a turning handle 247 slidably received therein.

In order to position the work accurately to provide for relocation thereof if removed for inspection or other purposes, suitable holes may be drilled in the work support 241 for engagement by a dowel pin 248 (Fig. 17) carried by worm 249 mounted for vertical sliding movement in bracket 242. Worm 249 is engaged by worm wheel 250 on shaft 251 suitably journalled in bracket 242 and having operating handle 252 by means of which the dowel can be projected and retracted. In this manner the work can be positioned accurately on the brackets and can be clamped in place securely.

Each bracket 242 is slidably mounted on table 253 by means of T-shaped lugs 254 (Fig. 13) engaging respective T-shaped slots 255 formed in table 253. Suitable keys may also be provided on brackets 242 to engage the slots 255. In this way the brackets 242 can be adjusted toward and from each other in accordance with the size of the work.

*Longitudinal feed mechanism.*—Table 253 provides the longitudinal feed for the work and for this purpose is slidably mounted upon a cross-slide referred to hereinafter under control of step-by-step screw feed means as will now be described.

Table 253 (Figs. 13 and 15) is formed similarly at either side with a depending flange 256 which carries a wedged shaped slide block 257 adjustably secured to a bottom face of table 253 by means of bolts 258. It will be noted that the hole in slide block 257 for each bolt 258 is larger than the bolt to provide for relative lateral movement for a purpose later described. The slide block 257 at each side of the carriage 253 has a precision lapped fit with a similar wedged shaped groove in a guide block or way 261 carried by cross-slide 262. The way 261 may be formed of two separate pieces if desired to facilitate machining and grinding of the face of the way. Usually the upper part will be similar to block 257 and the lower part a rectangular plate.

One slide block 257 (not shown) is rigidly secured to the table 253 while the other block 257 is adjustably secured thereto to provide for an adjustable take-up for the way. Flange 256 (Figs. 13 and 15) at one side of table 253 receives threaded sleeve 263 through which bolt 264 extends to have threaded engagement with the associated slide block 257.

The head of bolt 264 is provided with a socket to receive a wrench. In this way the adjustable slide block 257 can be moved into close-fitting engagement with the associated guide block 261, this movement being permitted by the play between bolts 258 and slide block 257. The interengaging surfaces of the two blocks are ground and lapped to provide an exact fit with a minimum clearance so that the table 253 is positively held against sidewise movement with respect to the cross-slide 262.

To enable the step-by-step movement thereof, table 253 carries a screw shaft 271 (Figs. 13 and 15) which is mounted thereon in a manner later described and which is engaged with a nut 272 secured on cross-slide 262 between guide blocks 261 by suitable dowel and bolt means 273. It will be seen that upon turning movement of the shaft 271, the shaft and the table 253 will be moved in either direction in accordance with the direction of turning movement of the shaft.

In order to prevent back lash and to positively limit the movement of the table to the precise increment determined by the step-by-step movement of the screw shaft 271, nut 272 has associated therewith an anti-backlash nut 274 which has a free sliding engagement with studs 276 secured in nut 272. Anti-backlash nut 274 is urged away from the nut 272 by compression springs 277 surrounding the studs 276 and seated in suitable recesses in the nut 274. By virtue of the spring pressure urging the nuts 272 and 274 apart, the movement of the screw shaft 271 is definitely limited to the extent determined by its feed and backlash both radially and axially is prevented in either direction of movement thereof.

*Transverse feed mechanism.*—Cross-slide 262 is mounted similarly to table 253 but for movement in a direction at right angles thereto. The cross-slide 262 (Figs. 12, 13 and 15) is provided with opposite depending flanges 281 which carry slide blocks 282 similar to blocks 257 and similarly mounted. The slide blocks 282 are engaged with respective guide blocks or ways 283 suitably secured upon the upper face of casting 13.

To provide for feeding movement thereof cross-slide 262 (Fig. 13) is provided with an anti-backlash nut assembly 284 similar in all respects to the assembly indicated at 272 and 274 in Fig. 15. The nut assembly 284 (Fig. 13) is cooperatively engaged with screw shaft 286 which extends longitudinally of the casting 13. At its front end shaft 286 has reduced portion 287 which is journalled in bearings 288 supported by a bearing cage 289 threaded in a feed housing casting 291, which is suitably secured to the casting 13. To secure the shaft 286 against end thrust the inner races of the bearings 288 are secured between a shoulder of the shaft and a clamping nut 292 on the threaded end 293 of shaft 286. The other end of shaft 286 may be journalled by similar bearings on the casting 13.

It will be understood that the mounting and operation of screw shafts 271 and 286 are similar in all respects except that shaft 286 is mounted on casting 13 while shaft 271 is mounted on the table 253. Similar step-by-step feed mechanisms are provided for controlling the step-by-step movement of the table and the cross-slide by transmitting rotational increments of movement to respective shafts 271 and 286. Inasmuch as these mechanisms are identical in construction and operation only one will be described, and for purposes of illustration the drive for the shaft 286 has been selected.

The drive for the feed shaft 286 enables a step-by-step movement of the cross-slide with a control to determine a selected amount of movement in each step in accordance with the desired rate of feed of the work. Preferably the feed for the shaft is spring driven but is controlled to provide a timed relation to the other operations of the machine so that the feeding of the cross-slide can occur only when the tool is disengaged from the work.

The feed unit 23 as shown in Figs. 1, 2, 12 and 13, includes the housing 291 referred to heretofore and cover 296, which houses the feed mechanism proper. To provide for feed in opposite directions the threaded portion 293 of shaft 286 (Figs. 12 and 13) is keyed to receive a pair of ratchet wheels 297 and 298 which have their teeth facing in opposite directions. The wheels 297 and 298 are spaced apart by a suitable collar and are held between threaded clamping nut 299 and similar clamping nut 292.

Cyclically controlled actuating mechanism is provided for each of the ratchet wheels 297, 298, such mechanism having a constant cyclic movement but becoming active only under control of the record mechanism as described hereinafter. The actuating mechanism for each ratchet wheel is identical in construction and operation, so that only one such mechanism will be described in detail.

Ratchet wheel 297 (Figs. 12, 13 and 21) is provided with feed pawl 301 pivoted at 302 between a pair of cam follower levers 303 which are pivoted about a reduced portion of nut 299 (Fig. 13) and the adjacent spacing collar. A dual control of the positioning of pawl 301 is provided so that it has a cyclic oscillation with respect to the ratchet wheel 297. Normally the pawl 301 is in the position shown in Fig. 12 so that its cyclic oscillation does not cause actuation of the ratchet wheel, and magnetic means are provided for bringing the pawl into operative relation with the ratchet wheel to provide for positive actuation thereof without overthrow.

For this purpose bellcrank 306 (Figs. 12 and 21) is also pivoted on stud 302 and is adjustably clamped to the slotted rearward end of pawl 301 by clamping bolt 307, so that pawl 301 and bellcrank 306 move as a unit. The other arm of bellcrank 306 is pivoted at 308 to armature 309 of a solenoid 311 which is mounted by suitable bracket and bolt means 312 on cam follower levers 303 (Fig. 12). The slotted adjustment at the clamping bolt 307 provides for accurate positioning of pawl 301 relative to the ratchet wheel 297 when the armature 309 is in its active position as shown in Fig. 21. Armature 309 is urged outwardly by spring 313 seated in the recessed core of the solenoid and thereby urges pawl 301 against eccentrically adjustable stop 314 in its inactive position.

From the above description it will be seen that when the solenoid 311 is energized (as later described) pawl 301 will be moved into engagement with ratchet wheel 297 as shown in Fig. 21 when the next oscillation of the pawl will advance the ratchet wheel for an amount determined by the oscillation of the cam follower lever. The pawl 301 remains in engagement with the ratchet wheel until after the end of its stroke to prevent overthrow.

As previously stated the movement of pawl 301 is controlled and this control is exercised by determining the extent of engagement of the cam follower levers 303 with the associated cam. As shown in Fig. 12 cam follower levers 303 carry roller 316 which is journalled on pin 317 also engaging the apertured yoke 318 of a spring-urged rod 319. Rod 319 extends outwardly through apertured threaded sleeve 321 secured in a suitable boss of the casting 291 and is slidably received in an apertured feed selecting nut 322 threaded in sleeve 321. At its end rod 319 is provided with stop 323 which engages a corresponding seat in the selecting nut 322. Rod 319 is urged inwardly by dual spring means 324 so that the extreme position of roller 316, cam follower 303 and pawl 301 are definitely controlled by the setting of the feed selecting nut 322. Roller 316 is adapted for cooperation with a cam 326 secured on stub shaft 327 (Figs. 12 and 13) journalled in bearing 328 mounted by cage 329 in casting 291 and in bearing 331 carried by T-shaped bracket 332 (Figs. 12 and 13). Bracket 332 is supported by suitable spacers and bolts 333 on casting 291. To provide for the initial setting of roller 316 with respect to cam 326, rod 319 is threaded into yoke 318 and has its selected adjustment maintained by a suitable lock nut.

It will be seen that the adjustment of feed selecting nut 322 varies the extent to which the roller 316 engages the cam 326, and therefore the extent of oscillation of cam follower 303 and pawl 301. Referring to Fig. 20 it will be seen that selecting nut 322 carries a spring-urged ball 334 for cooperation with a seating groove 335 in sleeve 321. Ratchet wheel 297 and selecting nut 322 are so related that one turn of the nut, will effect a one-tooth difference in the feed of the ratchet wheel. As shown the increment of feeding can be varied from one to ten teeth, which corresponds to a cross-slide travel of from .00025 to .0025 inch.

Ratchet wheel 298 (Figs. 12 and 13) which controls movement of shaft 286 in the opposite direction is similarly equipped with actuating pawl 336 mounted on cam follower 337 having spring urged rod 341 and feed selecting nut 342 associated therewith. Solenoid 338 is provided for controlling pawl 336. Cam 339 is provided on shaft 327 for operating cam follower 337.

As seen in Fig. 12 the followers of both cams 326 and 339 start down the descending portion of the cams at the same time, and means is provided to prevent any snapping of a roller over the associated cam and to prevent any possible over-drive of a cam follower with respect to the associated cam. For this purpose shaft 327 (Figs. 13 and 14) is provided with a cam 343 having a spring urged cam follower 344 associated therewith. The cam 343 is complementary with respect to cams 326 and 339 so that shaft 327 is subjected to a substantially even and uniform load, and there is no tendency for sudden or quick movement of the shaft which would cause overthrow.

Shaft 327 is driven in exact timed relation with respect to the reciprocation of the tool by means of a pinned connection with a shaft 346 (Figs. 13 and 25) and which comprises the lower main drive shaft of the machine. Shaft 346 (Fig. 25) carries sprocket 347 which is driven through chain 348 (Figs. 3 and 25) from upper main drive shaft 103.

Feed mechanism 22 (Figs. 1 and 2) for table 253 is similar in all respects to feed mechanism 23 for cross-slide 262, and is provided with respective feed selecting nuts 349 and 350, which control the position of cam followers 351, 352 indicated schematically in Fig. 44. Cam followers 351, 352 are associated with ratchet wheel mechanism 353 having controlling solenoids 354, 355.

Feed mechanism 22 is driven from shaft 356 (Fig. 18) having a bevel gear connection 357 with stub shaft 358 suitably journalled in housing 359 secured on the feed unit 22. Shaft 358 has universal connection 360 with a telescopic shaft 361 (Figs. 1, 2 and 18) having a universal connection 362 with stub shaft 363 suitably journalled in housing 364 mounted on the record sensing unit 27. Shaft 363 (Fig. 18) carries sprocket wheel 365 which is driven through chain 366 (Figs. 18 and 25) from the lower main drive shaft 346.

The telescopic universal drive connection for the feed mechanism 22 provides for its movement back and forth with the cross-slide 262 whereby the drive is always available for the feed mechanism in any position of the cross-slide.

It will be noted that shafts 286 and 271 (Figs. 1 and 2) project outwardly from the respective feed units 23 and 22 and are provided with squared ends whereby they may be turned to adjust the positions of the table and cross-slide independently of the power drive therefor.

Record sensing and control mechanism

From the foregoing description of the tool and the work table, it will be recalled that in each instance an increment of feeding movement occurred in a cyclic timed relation. In the embodiment shown such increments are controlled by electrical impulses to solenoids, which electrical impulses therefore would necessarily require a timed relation to the cam mechanism providing the cyclic actuation of the various parts.

As previously explained the record in the instant embodiment may comprise a tape or strip having a plurality of columns representing the different types of actuation of both the tool and the work.

Generally the sensing control mechanism includes a record mounting and feeding means, and means for sensing the record as it is fed in step-by-step fashion, each step corresponding to one cycle of operation of the machine. From the sensing mechanism controls are transmitted to the various solenoids previously described.

Generally the record mounting means comprises a pair of reels 371 and 372 (Fig. 22) upon which a record 373 is wound. Reel 371 which is demountably secured on rotatable shaft 374 is the reel upon which the record is wound for installation in the sensing mechanism.

As the record 373 is unwound from reel 371 it is fed by means of a sprocket 376 which has two sets of teeth to engage the two columns of perforation at the two edges of the record and then it is wound onto a power driven reel 372. As the record descends from reel 371, it is engaged by spring urged anti-overthrow roller 377 and is guided onto a record guiding track 378 which as seen in Fig. 25, is recessed adjacent the sprocket 376 to receive the two sets of teeth thereof. Sprocket 376 is secured on shaft 381 having handle 382 for manual turning. Shaft 381 is suitably journalled in plates 383 and 384 and at its forward end (to the right as viewed in Fig. 25) carries a pulley wheel 386 which is connected by spring belt 387 with a pulley wheel 388 on shaft 389 which carries driving reel 372. Spring belt 387 can slip on either of its pulleys to accommodate the increasing diameter of the record wound onto reel 372.

To drive sprocket wheel 376 and reel 372 and to thereby advance the record in step-by-step fashion, ratchet 391 (Figs. 25-27) is connected by a pair of gear and bolt assemblies 392 with spur gear 393 secured on shaft 381. By turning the assemblies 392 the position of the ratchet 391 with respect to its shaft can be readily changed within close limits to provide accurate positioning of the record with respect to the sensing mechanism. Referring to Fig. 26 it will be noted that the ratchet wheel 391 has opposite spring urged centralizers 394 associated therewith to centralize and to prevent overthrow.

To advance the feed sprocket 391 in step-by-step fashion, an actuating pawl 396 (Fig. 26) is pivoted at 397 between the ends of a slotted cam follower yoke 398 (Figs. 25 and 26) having a roller 399 journalled therein. Roller 399 engages an eccentric cam portion 401 of stub shaft 402 secured in the recessed end of lower main drive shaft 346. Pawl 396 (Fig. 26) is urged into engagement with ratchet wheel 391 by means of spring 403 so that for each revolution of shafts 402 and 346, that is during each cycle of the machine, the ratchet wheel 391 and sprocket 376 connected thereto will be advanced one step so that a one step movement of the record will also occur.

*Record sensing mechanism.*—The record sensing means includes a record engaging block 411 (Figs. 22 and 23) having a transversely aligned series of apertures 412. Block 411 is supported by studs 413 having an adjustable connection with mounting bracket 414. Block 411 is adjustably clamped with respect to bracket 414 by means of flatted adjusting stud 416 and set screw 417 associated therewith. The bracket 414 is securely mounted between vertically disposed brackets 383 and 384.

Referring to Figs. 22, 25, 28 and 29, it will be seen that a series of sensing fingers 421 are positioned in transverse array below and in alignment with the apertures 412 of block 411. The fingers 421 are supported by a series of sensing arms 422 and 427 inclusive (Figs. 25 and 28) which are similar in all respects except that arms 422, 424 and 426 extend to the right of the series of sensing fingers 421 as viewed in Fig. 29, while the corresponding arms 423, 425 and 427 extend to the left thereof.

The sensing arms are spring urged to sensing position and are allowed to move toward such position cyclically under the control of cam means associated therewith. The respective sensing arms 422 to 427 are held in accurately aligned positions by guide plates 428 of insulating material secured on transverse rods 429 between brackets 383 and 384. Each arm has associated therewith a torsion spring 430, and the respective springs serve to move arms 422, 424, and 426, in a clockwise direction and to move arms 423, 425 and 427 in a counter-clockwise direction. This movement is restrained by the engagement of insulating rollers 431 of the respective arms with the associated cams 432, secured in spaced apart relation on threaded portion of shaft 402 by means of clamping nut 433. Also associated with shaft 402 is a circuit control cam 434 having arm 436 associated therewith and forming a part of the armature 437 of circuit control solenoid 438 having spring contacts 439 associated therewith. The adjacent one of contacts 439 operates through a pin 440 which urges arm 436 toward cam 434. Contacts 439 enable and disable the main drive and control circuits as described hereinafter.

The respective sensing arms are provided with an insulated pivotal mounting and for this purpose are pivoted on insulating collars 441 (Fig. 28) which are spaced apart by spacing washers 442 having their central portions formed of insulating material. The entire group of collars 441 and washers 442 are mounted on an insulating sleeve 443 supported on transverse rod 444 between nuts 445 and insulating washers 446. Rod 444 is adjustably mounted in brackets 383 and 384 and for this purpose is provided with reduced ends carried in concentric holes in threaded bushings 447 (Figs. 28 and 30) having eccentric shoulders engaging suitable vertical slots in the brackets.

Each of the arms 422 to 427 inclusive are connected by lead wires comprising springs 430 to terminal posts 452 from which lead wires 453—458, respectively (Fig. 44) extend to the various solenoids 311, 338, 354, 355, and 162, 163 respectively. Also each sensing arm carries a depending spring contact 459 (Figs. 22 and 29) for engagement with ground contact 460 if the arm moves sufficiently to close the gap. Such movement can only occur when the associated sensing pin 421 enters an aligned aperture in the record 373, otherwise the record forms a stop for the pin 421, so that it moves only to the position shown at the left in Fig. 29. If the pin 421 passes through the record, movement of the associated contact 459 to the position shown to the right in Fig. 29 occurs to close the ground contact. When the sensing arms are retracted by engagement of their rollers with the high portions of the cams, sensing pins 421 are spaced below the record as shown in Fig. 22 to permit free feeding thereof.

From the above description it will be apparent that sensing of the record occurs cyclically between each step of movement of the record, and when an aperture in the record is presented to an aligned pin 421, a contact is established through the associated sensing arm so that a control impulse will be sent to the corresponding solenoid to determine a step movement of the associated actuating mechanism.

Circuit control mechanism means are provided for insuring operation as long as successive sensing impulses are determined by the sensing arms 422 to 427, and to prevent operation of the machine if a sensing impulse is not established, i. e. if no perforation is aligned with the sensing pins. Preferably the control means is incorporated in the circuit.

Referring to Fig. 44, respective lines 461 and 462 are provided from a suitable source of D. C. current, line 461 leading through a suitable fuse to make and break switch 463, which may be of the mercury bulb type and which is open when the machine is idle and closed when the machine is running. Switch 463 is connected through normally closed push-button switch 464 to ground. Thus, if both switches 463 and 464 are not closed no control circuit can be established. Switch 464 is an emergency stop switch. Line 462 is connected to control solenoid 438 from which lead 465 extends to one side of the respective actuation control solenoids 162, 163, 311, 338, 353 and 354, the other sides of which are connected to ground as previously described.

When energized, control solenoid 438 maintains contacts 439 closed i. e. when cam 434 is in the position shown in Fig. 29 and arm 436 is opposite the low portion of cam 434. One contact 439 (Fig. 44) is connected to ground and the other contact 439 is connected by lead 467 to a second control solenoid 468 also connected to lead 462 of the line. Solenoid 468 has unbalanced rocker armature 469 carrying mercury switch 463 for the control circuit and similar switch 470 for the circuit of main line motor 115. The unbalance of rocker armature 469 moves the armature to circuit opening position. After armature 469 is moved to circuit closing position by manual operation of knob 471 (Fig. 2) it is held there until the perforated portion of the record is fed into the sensing mechanism. At this time automatic operation of the machine will begin continuously energizing solenoid 468 to maintain switches 463 and 470 closed.

*Piloted end mill*

Referring to Figs. 35 and 36, a piloted end mill construction is shown in which the end mill is positively guided and supported both above and below the work. The tool includes shank 476 (Fig. 35) which is secured by set screws 477 in hub 62 of a universal joint similar to the construction shown in Fig. 4. The shank 476 is guided in the sleeve 42 in the same manner as in the previously described end mill and is provided with a fluted portion 478 and a lower pilot 479. The fluted portion 478 is shown in Fig. 35 in a position raised above the work, in which position the lower pilot 479 is still slidably engaged with a die 480 with which it has a ground and lapped fit. The die 480 has a ground and lapped fit within the collar 203 which is similar to that shown and described in connection with Fig. 10. As shown the fluted portion 478 is provided between machined annular grooves, and provides end cutting edges at its lower end and a shouldered stop for spring urged bushing 42 at its upper end.

Because both the shank and the pilot have ground and lapped fits with their respective guides, namely bushing 42 and die 480, the end mill fluted portion 478 is rigidly supported against side-wise thrust and can be employed for cutting greater depths without side deflection.

*Broach.*—If desired, the machine may be equipped with a broach of special construction, in which event the depth adjustment control for the end mill as described is changed to become a control for rotative positioning of the broach as will now be described. The broach will be described later.

To change the machine for use with a broach the plate 83 shown in Fig. 4 and the parts supported thereby are removed, such parts including the entire tool assembly shown in Fig. 4. Also the tapered plug 484 (Fig. 9) is removed from T-slot 486 of cam 102. A broach drive assembly comprising a tapered block 485 (Figs. 31 and 32) is mounted in T-slot 486 of the cam 102 and is drawn into place by fastening screw 487. The block 485 carries a ball bearing 489 from which a pitman 491 depends. The stroke of bearing 489 and pitman 491 may be changed by turning block 485 at right angles to engage side 492 of block 485 with screw 487. At its lower end the pitman 491 is pivoted at 493 to a ram 494 which is guided in sleeve 495 in boss 84 and in sleeve 496 mounted in the sleeve 47. At its lower end, ram 494 carries a retaining nut 497 within which a broach 498 is mounted for free rotation but against endwise movement.

At its upper end broach 498 (Figs. 37 and 39) has an annular groove engaged by a split collar 499 held in closely spaced relationship between nut 497 and the end of ram 494. The operating position of nut 497 is maintained by spring urged locking pin 500.

Referring to Figs. 37 to 39, the broach 498 comprises a shank having cutting section 501 and lower pilot portion 502 of the shank. It will be noted that the successively acting lips of the cutting section 501 are made up of a plurality of cutting teeth 503 which are staggered from one cutting lip to the next to reduce contact with the work and also to provide oil passages as will presently be described.

To provide for mounting of the broach for endwise sliding movement but to prevent rotation other than the record-controlled positioning thereof, the broach is provided with opposite longitudinal key-ways 506 (Figs. 37-39) which are slidably engaged by opposite keys 507 of respective upper and lower die assemblies 508, 509 which are identical in construction. Keys 507 have lapped fits in the keyways. Each die assembly includes split die segments 511 between which the keys 507 are held and about which clamping ring 512 engages. The die assembly is constructed as follows: the keys 507 are placed in position between the die segments 511 inside the ring 512, which is shrunk onto the inner assembly and thereafter ground with respect to the center of the keys to provide an accurate lapped fit within the sleeve 47 and the collar 203, respectively.

As seen in Fig. 38 the cutting portion 501 has a close clearance with respect to the associated die segments, while the opposite rounded portion has substantial clearance providing an oil passage entirely around the broach while it is within the die. To supply oil to the lower die assembly to flush and clear the broach, the die segments 511 and ring 512 are provided with aligned radial passages 516, which communicate with annular passage 517, having a series of passages 518 communicating therewith from an annular passage 519 in collar 203 which is supplied with lubricant under pressure from the pipe 520 (Fig. 1) leading from connection 229 (Fig. 3).

The upper die assembly is provided with oil through the same channels as the end mill and the oil is continuously forced out through the die assembly around the broach by the pump pressure, and additional pressure is provided by the ram 494 upon its downward movement when the broach starts cutting.

To provide for rotative adjustment of the broach, upper die assembly 508 is connected by by dowel pin 521 to sleeve 47, and other clamping screws may also be provided to engage the top groove wall of the die, see Fig. 4. Thus the broach can be rotatively adjusted in the manner previously described for the depth adjustment for the end mill. Because of the keyed connections from each of the die assemblies to the broach, the lower die assembly rotates freely in collar 203 simultaneously with the rotative adjustment of the broach and the upper die assembly. Lower die assembly 509 projects slightly above the collar 203 to secure the clamping thrust from sleeve 47 through the upper die assembly 508.

To provide for accurate angular location of the initial or starting position of the broach for its rotative movement, ratchet wheel 132 (Figs. 3 and 5) is provided with a suitable aperture which may be vertically aligned with a corresponding aperture in upper plate 135 which can be brought into alignment to receive pin 524, when the leading cutting face of the broach is forward.

To provide for initial adjustment of the vertical position of the broach, pitman 491 (Fig. 31) is made up of sections 513, 514 having threaded engagement and held in adjustment by lock nut 522 and set screw 523 having a dowel point engaging a key-way in section 514 to definitely locate the ram angularly with respect to the pitman.

To remove the broach, screw 487 (Figs. 31 and 32) is loosened so that tapered block 489 can be unwedged and removed from the cam 102 and the broach assembly withdrawn from the sleeve 47.

*Bottom center drill.*—If desired, the machine may be equipped with a center drill for locating the centers of the holes in the lower surface of work which is being fed in accordance with a record made of the desired directions and extent of the feed from a given starting point. For this purpose the sleeves 525 (Fig. 10) below the collar 203 is mounted for endwise movement as later described, and carries a rotatable sleeve 527 which is journalled therein by spaced bearings 528. Bearings 528 may be pre-loaded by means of screw retainers 529 which may be locked in adjusted position in the same manner as retaining nut 497 (Fig. 37). Shaft 526 extends through sleeve 527 in which a suitable center drill 530 may be removably mounted. A special screw-connected extension 526A (Fig. 10) may be employed for installing and removing drill shaft 526. Shaft 526 has a ground and lapped fit within collar 203 and projects upwardly into a die 531 (Figs. 10 and 11) having radial passages 533 for supplying oil to the drill. Although the main motor is idle during drilling, oil under pressure is available because of back pressure in the line which is closed in moving from one hole location to another. At its lower end the sleeve 527 carries pulley 532 in which shaft 526 also has a ground and lapped fit and which is driven though belt 535 (Figs. 2 and 10) from motor 534. Motor 534 is controlled by switch 536 (Fig. 2). Pulley 532 may be connected to shaft 526 by a suitable set screw which holds the drill assembly in place.

To provide for vertical adjustment of the center drill the sleeve 525 may be provided with a rack 537 (Fig. 10) engaged by pinion 538 carried by a shaft 539. Shaft 539 is journalled in boss 207 and has a suitable hand wheel 540 for manual raising and lowering of the drill.

The work is automatically positioned with respect to the center drill by the feed mechanisms under a record control as will be described.

Top center drill

If desired, a top center drill 551 (Fig. 40) may be mounted in bushing 552 (Fig. 40) by a set screw 553. Bushing 552 is guided similarly to bushing 42 and at its upper end is connected to universal joint 63 (Fig. 4) in the same manner as end mill 40. The vertical movement of center drill 551 is manually controlled by means of hand wheel 554 (Figs. 1 and 8) on the shaft of motor 115 after automatic positioning of the work with respect thereto.

Boring bar

The machine may be equipped with a boring bar as illustrated in Fig. 41. The boring bar includes shank 556 and enlarged head 557 having a cutting tool 558 extending transversely therethrough and held in position by set screw 559. The boring bar is mounted and controlled similarly to end mill 40.

Piloted boring bar

Fig. 42 illustrates a piloted boring bar including upper shank 566, lower shank 567 and enlarged central portion 568 for carrying tool 558. The lower shank 567 is hollow to receive fastening screw 569. The piloted boring bar is mounted in the same manner as the piloted end mill shown in Fig. 35.

Angular clearance attachment

In order to provide for an adjustable angular clearance in cutting, blanking and punching dies or to provide draft for other dies, patterns, or molds, a special guide collar 43A (Fig. 34) is provided having its outer surface and ends identical with the standard collar 43 but having the axis of its central bore extending from a position concentric with the lower end to an eccentric position at the upper end. The resulting angular positioning or misalignment of the tool shank is accommodated by the universal joints in its drive connection. Collar 43A is connected to sleeve 47 by set screw 521, and its initial or starting position for purposes of controlling the angular clearance or draft is determined by pin 524 (Fig. 5) in the same manner described in connection with the broach.

If the misaligned axis of the tool lies in a plane parallel to a straight surface being cut or parallel to a plane tangent to the adjacent curved contour to be cut, then a perpendicular wall on the work will result, while if the tool axis is turned in one direction angular clearance will be provided, and if turned in the other direction draft will be provided. Obviously, the amount of draft or angular clearance will be at a maximum when the misaligned tool axis lies in a plane perpendicular to the adjacent contour to be cut, and the amount of draft or angular clearance can be adjusted between the limits mentioned by providing an initial adjustment of the angular position of the misaligned axis before automatic contouring of the part.

When the direction of the contour line changes a record controlled rotation of the misaligned axis is made through sleeve 47 to maintain the initially set relation between the axis and the work.

Tracing and recording apparatus

Generally the tracing and recording apparatus of my invention includes means for tracing a line either straight or curved by causing minute precise increments of movement of a tracer in the selected directions necessary to follow the line and making a record of the successive increments of movement of the tracer. To effect such tracing the desired contour layout of the part is reproduced on a selected enlarged scale. The scale is selected in accordance with the desired accuracy of contour and the desired smoothness of finish. In addition to the contour layout of the part a second contour line is drawn at a distance from the original contour line corresponding to the radius of the cutter to be employed times the scale of magnification to locate the path of travel of the center of the cutter. The cutter path is inside the lay-out for internal cutting and is outside thereof for external cutting.

The enlarged layout is preferably made upon material providing a distinct electrical characteristic for the cutter path from the electrical characteristic of the remainder of the sheet upon which the path is drawn. Preferably in the instant invention the line which represents the cutter path is made electrically conducting whereas the remainder of the sheet is non-conducting. This may be effected by employing a metallic sheet which is coated with a non-conducting material, such as shellac, lacquer or the like, through which the line is scribed.

The tracing apparatus to make a record for use with an end mill where no rotational positioning is required will be discussed first.

The tracing unit includes a tracer point for sensing conducting or non-conducting properties and is mounted for movement in two directions at right angles to each other, to correspond to the two directions of feed on the machine. Generally one direction of movement is selected as predominant and the other as alternative, and control means is provided whereby the tracer moves in a step-by-step fashion in the predominant direction so long as contact is made (i. e. as long as the tracer point is on the scribed line), but when a contact is not maintained because the tracer is moved off the line by the predominant feed, then, automatically, one step of movement in the alternative direction will be made. If this alternative step does not again cause the tracer to make contact with the line, then the tracing mechanism automatically stops. This condition occurs when a change in the predominant or alternative directions of feed is necessary.

As each step of movement of the tracer is made, a hole is punched in a record strip in the column corresponding to the direction of the step made by the tracing point and preferably only one hole in the record strip is made for each step movement. Because of the timed relation existing and the exact increments of movement of the tracer in making the record, accurate timing and accurate increments of movement will be made in the machine when the record is later used as will be described.

The tracing and recording apparatus (Fig. 45) comprises generally a tracing unit 601 which is movable longitudinally on a travelling carriage 602 which also carries the recording mechanism 603. The travelling carriage 602 is movable transversely on the table 604 on which the layout sheet 605 to be traced is releasably clamped. The directions of feed of the tracing unit correspond to the directions of feed of the work table of the metal cutting machine.

The table 604 (Figs. 45, 47 and 50) is provided at either side with tracks 606 on carriage 602 and the opposite sides of each track 606 are engaged by rollers 607, one of which is flanged. Along each rail 606 the table 604 is provided with a rack 608 for engagement with respective pinions 609 (Fig. 50) carried at each end of a transverse shaft 611 journalled by suitable bearings 671 (Fig. 49) in feed housing 613 and bearing 612 in recording mechanism housing 614 (Fig. 70) which are secured at the ends of the carriage 602. The step-by-step drive for shaft 611 is described hereinafter. If desired an endless covering strip 616 (Fig. 45) may be provided to cover the parts of the racks 608 which are not covered by carriage 602.

Referring to Figs. 45 and 50 the carriage 602 is provided with a horizontal track 621 mounted on a rack 622 supported by the carriage frame. The track 621 is engaged by opposite flanged rollers 623 depending from the bottom frame plate 624 of the tracing unit 601. Thus the tracing unit 601 is mounted for movement back and forth on the carriage 602 in a longitudinal direction, while the carriage 602 is mounted for a movement back and forth in a transverse direction so that in effect the tracing unit can be moved in either direction. The controls for such movement in a step-by-step manner will now be described.

*Longitudinal feed.*—Referring first to the movement of the tracer unit 601 on the carriage 602 which corresponds to the longitudinal motion of the work on the machine, the rack 622 (Fig. 55) is engaged by a pinion 626 on a shaft 627 depending from base plate 624 of the tracer carrier. Shaft 627 (Figs. 55 and 57) is journalled in spaced-apart frame plates 628 and 629 mounted on the base plate 624 by suitable spacing studs 631. Between plates 628 and 629, shaft 627 carries gear 632 which meshes with pinion 633 on upright shaft 634 also mounted between plates 628 and 629. At its ends pinion 633 carries respective ratchet wheels 636 and 637 having their teeth facing in opposite directions. The ratchet wheel and pinion assembly 633, 636, and 637 referred to is identical with that shown at 914, 915, and 916 in Fig. 50.

Means are provided for actuating the ratchet wheels selectively in either direction in accordance with the control therefor as referred to hereinafter. Ratchet wheel 636 (Fig. 57) has associated therewith an actuating pawl 638 mounted at the end of an arm 639 which is pivoted by stud 641 below plate 629 (Figs. 51 and 57). Arm 639 also carries stop arm 642 and cam follower 643 for movement as a unit therewith and the entire assembly is urged in a clockwise direction as viewed in Fig. 57 by spring 644 so that roller 646 on arm 643 is urged toward cam 647 on upright shaft 648.

A cyclic timed drive is provided for shaft 648 and for this purpose the shaft extends downwardly through base plate 624 (Fig. 51) and is provided with bevel gear connection 649 with sleeve 651. Sleeve 651 is provided with suitable keys engaged with longitudinal opposite key ways in shaft 652 which is journalled at its ends in respective housings 613 and 614. As seen in Fig. 68 shaft 652 is keyed to driving sleeve 653 carrying gear 654 which is driven from drive gear 656 (Fig. 69) of motor 657.

As will be described later motor 657 drives all of the operating parts of the apparatus in a synchronized relation so that each of the operations bears a timed relation to the others.

Referring again to Fig. 57 it will be noted that the feed pawl assembly 643, 642, and 639 is urged in a clockwise direction toward ratchet wheel 636 by spring 644 but the engagement of feed pawl 638 with ratchet wheel 636 is normally prevented by the engagement of latch 661 pivoted at 662 on plate 628. Latch 661 is also pivotally and slidably connected to armature 663 of solenoid 664. Thus the movement of feed pawl 638 under the control of cam 647 and spring 644 is inactive except when the latch 661 is moved to releasing position out of the path of stop arm 642 by the solenoid 664. Cam 647 oscillates the feed pawl assembly during each cycle an amount sufficient to lift stop arm 642 out of the path of latch 661, as shown in Fig. 58, so that the latch can be moved from its non-feed position shown at the right of Fig. 57 to its feed position corresponding to the position shown to the left of the figure where the pawl 918 is in its full-stroke position.

Also it will be noted that with parts positioned as at the right of Fig. 57, energization of solenoid 664 is ineffective to move the armature, and such movement can be effected only when cam 647 lifts stop arm 642 out of the path of latch 661.

The upper ratchet wheel 637 has associated therewith a feed pawl assembly 665 (Fig. 51) controlled by solenoid 666 and cam 667 on shaft 648. This mechanism is identical to that described above.

It will be understood, therefore, that the tracing unit 601 can be moved in either direction on carriage 602 in precise increments of movement by the one tooth advance of a selected ratchet wheel. As shown, each increment is .005 inch. To prevent overthrow of ratchet wheels 636 and 637 and to maintain a centralized position of tracer unit 601 on its track, ratchet wheel 636 (Fig. 57) has associated therewith a centralizing and overthrow preventing lever 670 pivoted at 668 and influenced by the spring 644 referred to above. Lever 670 may be provided with release button 669 (Figs. 45 and 57) to enable release of the tracer unit 601 for free manual setting on its track.

*Transverse feed.*—Similar feed mechanism to that described above is provided for controlling the movement of the carriage 602 (Fig. 45) on the tracks 606, and this motion corresponds to the transverse motion of the work table of the metal cutting machine. As previously described the shaft 611 extends across the table and is provided with the gears 609 to engage the respective racks 608. The left end of shaft 611 (Fig. 49) is supported by bearings 671 in spaced frame plates 672 mounted in feed housing 613. Between the plates 672 the shaft 611 carries a sleeve 673 on which a spur gear 674 is mounted similar to the gear 632 described in connection with Fig. 57. Gear 674 (Figs. 48 and 49) meshes with pinion 676 carried on shaft 677 and having oppositely disposed ratchet wheels 678 and 679. The operation of ratchet wheels 678 and 679 is controlled by means similar to that described above including pawl arm 681, solenoid 682 and cam 683 on an extension of shaft 652 which is supported by bearings 684 in plates 672. The lower ratchet wheel 679 is similarly controlled by pawl arm 686, solenoid 687 and cam 688 on shaft 652. Cams 683 and 688 are formed on a sleeve 689 which is clamped between a shoulder of shaft 652 and clamping nut 690. The other similar cam assemblies are constructed and mounted in the same manner on shafts 648 (Fig. 57).

The above mechanism is identical in construction and operation to that shown and described in connection with Figs. 51 and 57 so that further detailed description thereof is not believed necessary. It will be understood that by selective operation of the ratchet wheels 678 and 679 that the shaft 611 and therefore the gears 609 can be given one step of movement in either direction and cause a corresponding movement of the carriage 602. The step of movement in the embodiment shown is in the order of .005 inch.

By operation of the above feed mechanisms the tracing head 601 (Fig. 45) can be moved back and forth in both the transverse and longitudinal directions of movement, and as previously stated the movement is controlled in accordance with the setting of certain control dials of such unit to govern the predominant and alternative directions of movement. And any given direction can be set as the predominant or as the alternative, so that the machine will operate correctly in following all types of lines either straight or curved regardless of the predominant trend or direction of the line.

The control for determining the predominant and alternative directions of movement will now be described.

*Tracer head control*

Referring to Figs. 45 and 61 it will be noted that three control dials, 701, 702, and 703 are provided for the predominant, alternative and rotational controls, respectively. Inasmuch as these control dials are similar in construction and operation only one will be described in detail.

Referring to Fig. 46 control dial 703 has cast therein an insert sleeve 704 and is secured by a suitable screw on the commutator shaft 706, having a commutator 707 thereon which is received within a recess in insulating block 708 which is suitably mounted by insulating plate 709 on metallic frame plate 711. Sleeve 704 is spaced by collar 712 from the upper surface of block 708 to hold the dial 703 in place and to hold commutator 707 in the position shown. Extending through sleeve 706 is a contact rod 713 having an insulating button 714 which is engaged by a suitable spring to urge the rod upwardly and maintain contact 716 thereon normally spaced from the cooperating contact 717 on plate 711.

The rotation of the dial serves to selectively close certain contacts and thereby control the direction of movement as will be fully described hereinafter. One terminal comprising spring-urged plunger 721 which is in contacting relation with the upper face of an annular flange 722 of commutator 707 and is mounted in terminal 723 which is connected with lead wire 724, by virtue of the contact of plunger 721 with annular flange 722, this contact is maintained in any rotatively adjusted position of the dial 703.

To provide for change of contacts in accordance with the directional control, commutator 707 is recessed radially to mount a spring-urged ball 726 which can be moved into contact with any one of a plurality of terminals 727 having recessed heads whereby the dial is releasably retained in an adjusted position.

Control dial 701 has four terminals, 728, 729, 730 and 731 (Fig. 74), and dial 702 has similar terminals 732—735 which are electrically connected to the respective solenoids 664, 666 (Fig. 51) and 682 and 687 (Fig. 49). Thus by adjusting dials 701 and 702 the solenoids can be associated with any of the four directions of movements of the tracer head.

As seen in Fig. 74 terminals 728 and 732 are connected through lead line 741 with solenoid 682. Terminals 730 and 734 are connected through lead line 743 with solenoid 687. Terminals 729 and 733 are connected through lead line 742 with solenoid 664. Terminals 731 and 735 are connected through lead line 744 with solenoid 666. It is seen therefore that the four selectively enabled terminals of each control dial 701 and 702 are permanently connected to the four solenoids controlling the four directional feeds of the tracing unit, the directions being indicated by the arrows applied to the solenoids in Fig. 74. The setting of a dial is indicated by the direction of the arrow thereon (Fig. 45).

*Tracer point construction*

Referring to Figs. 45 and 50 it will be noted that housing 751 of the tracer unit carries a pair of smaller housings 752 suitably bolted thereon and having laterally extending apertured bosses 753. The respective bosses 753 have tubes 754 and 756 suitably secured therein and the outer ends of the tubes similarly engage respective bosses 757 of upper housing 758 of the tracer head. Upper housing 758 is secured by suitable bolts to lower housing 759 whose bottom opening is closed by plug 761 of insulating material with plate 762 interposed. Plate 762 is provided with extension 763 (Fig. 50) which carries threaded sleeve 764 of a supporting caster assembly 766 having adjusting screw 767 whereby the tracing head may be supported on the tracing table 604.

Plug 761 (Fig. 50) is apertured to seat the upper reduced end of sleeve 768 whose lower reduced end 769 is received in plug 771 for a housing 772.

The lower end of housing 772 (Fig. 50) is provided with a concentric aperture to receive sleeve 773 which is secured with respect thereto by screw 774 and has its upper end received in the lower end of sleeve 769. Sleeve 773 is of special construction as shown in Fig. 60 and has a reduced inner portion 776 to receive a headed sleeve 777 of insulating material which in turn on its reduced end receives conducting sleeve 778.

The sleeve assembly 778 (Figs. 50 and 60) serves to mount the main tracing point of the tracer head which comprises spring-urged plunger 781 (Fig. 60) slidably mounted within sleeve portion 776 and retained therein by split retainer 782. Tracer point 781 is urged downwardly by spring 783 which also seats against the reduced end 784 of an apertured shaft 786 which extends upwardly through housings 758 and 759 (Fig. 50). Adjacent its upper end shaft 786 carries knurled head 787 and within the housing is provided with collar 788 having a pin engaging a slot in a sleeve 789. Sleeve 789 is journalled in the upper housing 758 by a bushing 791 seated within insulating sleeve 792. Sleeve 789 is also journalled in lower housing 759 by insulated bushing 793. Sleeve 789 carries mitre gear 794 on which contact disc 796 is mounted for engagement with spring-urged plunger 797 of a terminal 798 having an insulated mounting in upper housing 758. Mitre gear 794 meshes with mitre gear 799 journalled in and insulated from upper housing 758.

From the above description it will be seen that a closed circuit is maintained from tracing point 781 through shaft 786 to gear 794 and disc 796 which is connected by plunger 797 with terminal 798, and this circuit is insulated from the remainder of the metallic parts of the tracer head assembly.

An electrical by-pass circuit is provided for the tracer point 781 so that its control can be operated independently of the tracer point. Referring to Fig. 50 sleeve 791 is threaded to receive split nut 801 which may be threaded downwardly to engage upper housing 758 to close the by-pass circuit to the frame of the machine.

The housing 772 (Figs. 50 and 60) is provided with a second eccentric aperture 806 in which a second eccentric tracing point 807 is slidably received and retained by a split retainer 782. Tracer point 807 is spring-urged downwardly by spring 808 seating against ball 809 in housing 772. Tracer point 807 and housing 772 are insulated from the main tracer point 781 and within housing 772 a terminal 811 is provided from which a suitable wire (not shown) may extend through the housing 772 and up through passage 812 in sleeve 758 to within the housing assembly 758, 759. The lead wire and also a lead wire from the terminal 798 lead outwardly through the tube 756 (Fig. 45) to certain solenoids as described hereinafter.

*Directional tracing control*

The lead wire from the main tracer point 781 extends to terminal 816 (Fig. 51) from which a lead wire extends to one connection of solenoid 817 (Figs. 61 and 63). The other lead from solenoid 817 extends to the line by means of lead 818 as shown in Fig. 74.

*Solenoid construction.*—The construction of solenoid 817 is typical of those found throughout the apparatus and it will now be described with reference to Figs. 53 and 54. Solenoid 817 comprises a cylindrical casing 821, a cylindrical core 822 and a winding 823 therebetween. The winding is insulated from the core 822 by means of an insulating sleeve 824 and is held between a pair of insulating plates 826 and 827. The insulating plate 826 is engaged by the head 828 of core 823 and the core 823 is internally threaded to receive apertured fastening screw 829 engaging a recessed portion of mounting block 831, so that the solenoid is securely clamped to the block which has a wall portion interposed between the head of the screw and the apertured end of cylindrical casing 821.

The wire of the coil 823 in this type of solenoid is very fine and hence readily subject to breakage and special means are provided for preventing any stress occurring on this fine wire because of its lead connection. As seen in Fig. 54 the annular insulating plate 827 is apertured to receive a headed fastening stud 832 pressed therein and spaced from core 823 by insulating washer 833 and passes through magnetic gap washer 834 seated against the end wall of casing 821. Lead wire 836 of the coil 823 extends into fastening element 832 and may be soldered or otherwise secured therein. The aperture in fastening element 832 is substantially the size of the lead wire 837 which may be soldered therein to provide a good contact and extends outwardly through an insulating sleeve 838 fitted over the end of the fastening element 832 and extending through a suitable aperture in the block 831.

The armature for the solenoid includes plate 841 having rod 842 secured thereto and extending through the solenoid being guided in the core 822 and screw 829. Plate 841 is provided with a split annular extension 843 in which bellcrank 844 (Figs. 61 and 63) has a pivotal and slidable connection by means of pin 846.

As shown in Fig. 63 the end of rod 842 engages an insulating button 847 on contact 848 pivoted by U-pin 849 (Figs. 51, 62 and 63) in U-shaped bracket 851 mounted on block 831. Contact arm 848 is urged in a clockwise direction as viewed in Fig. 63 by spring 852 (Fig. 51) having one end connected to the contact arm and the other secured in mounting post 854 along with the end of U-shaped pivot pin 849, and the lead wire for the control. The wire and pin are clamped in the post 854 by a suitable screw, while the end of the spring 852 engages an outer annular groove in the post.

To provide a circuit breaker, the contact arm 848 (Fig. 63) cooperates with a similar but shorter contact arm 856 similarly mounted on the block 831 and also spring-urged in a clockwise direction as viewed in Fig. 63. The arm 856 carries an adjustable stop screw 857 which is engageable in the normal position of the parts with an insulating stop 858 mounted on the block 831.

The outer end of arm 856, carries a contact of special construction which will now be described with reference to Fig. 52. The arm 856 is apertured adjacent its end and the aperture is defined by a spherical seat 859 engageable with an apertured ball 861. Initially the aperture is drilled, the ball installed and the edges of the aperture swedged over to retain the ball. Ball 861 is held between flanged end 862 of rod 863 and a flanged collar 864 engaged about the rod 863 and urged against the ball by a spring 866 seating against a similar collar 864 pinned on the rod 863. By virtue of the limited universal mounting of the rod 863 upon the ball 861 the contact carried by the head aligns itself with the contact on the arm 848 irrespective of any irregularities or differences in the mounting thereof, so that upon engagement the flat contact faces are self-aligning and a full faced contact is maintained during the relative wiping action of the contact faces. Also, the contact faces will break parallel and remain in position for parallel wiping engagement and operation.

As previously explained the contacts 856 and 848 (Fig. 63) are engaged by the rod 842 when the solenoid 817 is energized and bellcrank 844 is drawn inwardly by the armature to close the circuit breaker as shown in Fig. 63 to determine an increment of movement in the predominant direction. However, such closing can occur only at a properly timed portion in the cycle of the machine and special means is provided for effecting this control.

As seen in Figs. 61 and 63, the bellcrank 844 is pivoted at 868 on top frame plate 869. Plate 869 is connected by suitable spacing studs with adjacent plate 870 which is similarly connected to bottom plate 871 on casting 751. Bellcrank 844 has its short arm positioned for engagement with an adjustable eccentric stop 872 under the urgency of the spring pressure of the contact arm 848. At its outer end bellcrank 844 (Figs. 63 and 65) has hook 873 pivoted thereon and urged in a clockwise direction as viewed in Fig. 65 by spring 874. The hook 873 is provided with a step or face 876 engageable with the end of latch 877 pivoted on stud 878 and urged in a clockwise direction by spring 879. Latch 877 is provided with a shoulder 881 for cooperation with the end of a pawl 882 adjustably mounted on a suitable hubbed plate carried on a vertically extending shaft 883. Pawl 882 has an interlock arm 880 adjustably mounted thereon for cooperation with the flat face of stud 885 carried by bellcrank 844.

Shaft 883 extends downwardly and adjacent its lower end (Fig. 56) is provided with an arm 884 having a roller for engagement with a cam 886 carried by cyclically operable shaft 648 heretofore described. As seen in Fig. 62 shaft 883 carries an arm 887 which is influenced by a spring 888 so as to urge shaft 883 in a clockwise direction and therefore urge the arm 884 (Fig. 56) toward the cam 886. Thus the shaft 883 and pawl 882 (Fig. 65) will have a complete cyclic oscillation each cycle of the machine unless otherwise prevented. The timing of each oscillation is shown in Fig. 75.

If the shaft 883 is allowed an unrestricted oscillation, an alternative increment of feed will be instituted as later described. However, the oscillation is restricted when a predominant increment of feed is instituted or when no feed is to be instituted.

During approximately 70° of the highest portion of cam 886, pawl 882 and arm 880 are moving from the positions thereof shown in Fig. 63 to those shown in Fig. 65 and back, the positions shown in Fig. 65 being their extreme positions where cam 886 has a small dwell of approximately 10° as shown in Fig. 75. During this period armature arm 844 is free to move under the magnetic influence of solenoid 817 if energized because stop arm 880 is out of the path of stud 885, and also arm 844 can move away from the pole face of solenoid 817 under the spring influence of the circuit breaker 848, 856.

If the solenoid 817 is energized during the above 70° portion of the cycle and bellcrank 844 is in the position shown in Fig. 63, a predominant increment of movement is instituted. Referring to Fig. 74, it will be seen that when circuit breaker 848 is closed a circuit is established from ground through the circuit breaker 848, 856 and a second circuit breaker 943, 944 (referred to hereinafter) and lead 891 to commutator 892 and the selected terminal of the predominant control dial 701.

When shaft 883 (Figs. 62, 63 and 65) is allowed to oscillate without restriction it controls the closing of the alternative directional circuit.

Referring to Fig. 62, shaft 883 carries arm 887 which at its forward end has an adjusting stop screw 896 extending through a clearance hold in contact arm 897 and engaging a suitable insulating button on contact arm 898. The position of shaft 883 is the same in both Figs. 62 and 63. Each time that arm 887 is rocked in a counterclockwise direction as viewed in Fig. 62 it opens the circuit breaker 897, 898, and if it cannot return for its full stroke in a clockwise direction, that is, if pawl 882 is held by latch 877 as shown in Fig. 63, the contact 898 will be spaced from the contact 897, so that no current can flow through the alternative control mechanism. However it will be seen that each time the predominant circuit is interrupted because the tracer point 781 does not complete the circuit for solenoid 817, arm 887 has one full unrestricted oscillation under control of its cam 886. Thus a circuit will be established through contacts 897, 898 (Fig. 74) and lead 899, to terminal 737, to commutator 736 and thence to the selected terminal of the alternative control with which the commutator 736 is connected.

If an alternative increment of movement does not restore tracer point 781 into contacting relation with the line being traced, then the tracing apparatus automatically stops because no control circuit is completed. During the unrestricted oscillation of shaft 883 (Fig. 65) which accompanies and determines an alternative increment, the parts are conditioned to prevent a succeeding alternative increment so that no motion occurs if a predominant increment is not determined. Referring to Fig. 65, continued movement of pawl 882 in a clockwise direction from the position shown will cause the pawl to engage rounded extension 901 of hook 873 and move the hook to release the latch 877. The latch 877, therefore, is free to move into the path of pawl 882 during the next oscillation thereof, and stop clockwise oscillation of shaft 883 before pin 896 allows circuit breaker of the alternative control to close.

*Rotational tracing control mechanism*

As previously described the eccentric tracing point 807 is adapted to be adjusted rotatably to follow the line being traced and for this purpose the entire casing 772 (Fig. 50) is rotatable about the sleeve 768. This rotation is effected through the sleeve 773 and shaft 786. From shaft 786 the drive is received through the collar 788 and sleeve 789 on which gear 794 is mounted. Gear 794 meshes with a second bevel gear 799 which is mounted by insulating bushing and collar means 907 on shaft 908 which extends through tubing 754 to the left-hand housing 752. Within housing 752, shaft 908 is connected by bevel gearing 909 with a vertical shaft 911 secured in sleeve 912 supported by suitable bearings in plates 628 and 629. Sleeve 912 carries spur gear 913 meshing with pinion 914 having respective ratchet wheels 915 and 916 associated therewith. The ratchet wheels 915 and 916 are operated by pawl mechanisms 917 and 918, respectively, (Figs. 50 and 57) similar in all respects to the pawl mechanisms shown at the right of Fig. 57. The pawl mechanisms are controlled by respective solenoids 919, 920 (Fig. 50) and similar cams 921 on vertical shaft 648.

By selective actuation of ratchet wheels 916 and 917 in accordance with the selected circuit control of the rotational dial 703 an increment of rotational movement will be given through the shafts 911, 908 and 786 to rotate the eccentric tracing point 807 for one increment in either direction. This increment or chordal movement is preferably slightly greater than .005 inch.

As shown in Fig. 74, the rotational control dial 703 has a pair of terminals 926 and 927, with which the commutator 928 can be associated and is also provided with the constantly enabled terminal 929. Also manually operable contact 930 is provided.

Control means are provided whereby the rotational control can be selectively enabled for use and the control mechanism is similar in all respects to the control mechanism described in connection with the alternative directional control.

Referring to Figs. 61 and 64, a solenoid 931 is provided which is mounted on block 831 in the same manner as solenoid 817 and has similar mechanism associated therewith. Such mechanism includes armature 932 (Fig. 64) and armature bellcrank 933 associated therewith and having hook 934 pivoted at its outer end for cooperation with latch 936 and pawl 937 on vertical shaft 938. Shaft 938 is oscillated during each cycle through arm 939 (Fig. 56) which has a roller operatively related to cam 941 on shaft 648. The solenoid 931 (Fig. 64) has rod 942 extending therethrough and operatively related to normally closed circuit breaker 943, 944.

In order to disable the solenoid 931 during operation involving no rotational tracing, the bellcrank 933 can be locked in closed position as shown in Fig. 64 by means of manually adjustable lock pin 946 (Figs. 61 and 64) having an annular locking groove 945 in the enlarged portion thereof. The pin 946 can be moved upwardly from the position shown in Fig. 61, to align groove 945 with bellcrank 933 to prevent its outward movement, and so that bellcrank 933 latches the pin in raised locking position. When the pin 946 is in the position shown in Fig. 61 the rotational control is set for operation.

A circuit breaker control is also provided for the rotational control mechanism (Fig. 62) comprising contact arms 947 and 948. Arm 947 is oscillated by arm 949 secured at the upper end of shaft 938. Whenever the rotational tracer 807 is on the line being traced, the oscillation of arm 949 is stopped, solenoid 931 is energized and latch 936 is allowed to remain in the path of pawl 937 on shaft 938.

Whenever the rotational tracer 807 is moved off of the line being traced and the main tracer 781 is still on the line, a rotational control impulse will be transmitted to the rotational feed mechanism and the tracer 807 will be moved its incremental chordal distance. This will occur because the shaft 938 and arm 949 will have unrestricted oscillation to close circuit breaker 947, 948.

Means are provided for preventing operation of the rotational control unless the main tracing point 781 is making contact. It will be recalled that when the solenoid 817 is energized, tracer 781 is making contact and the armature bellcrank 844 is in the position shown in Fig. 63. Bellcrank 844 carries pin 951 (Figs. 61, 62, 63 and 65) which projects upwardly through plate 869 and engages the slotted end of interlocking arm 952 pivoted at 953 on the plate. At its other end arm 952 carries a hook which is adapted for disposition in front of the end of arm 949 to prevent an extent of movement of this arm which will permit the contact arm 947 to move into engagement with its opposed contact arm 948. The spacing of the hooked end of interlock 952 with respect to arm 949 as shown in Fig. 62 and with pawl 937 in the position shown in Fig. 64 allows free relative movement of interlock 952. Thus unless the arm 952 is positioned as shown in Fig. 62 the de-energizing of rotational solenoid 931 cannot cause closing of the associated circuit breaker 947, 948.

As seen in Fig. 74, circuit breaker 943, 944 is electrically in series with circuit breaker 848, 856 associated with the directional solenoid 817 so that when the rotational tracer 807 is on the line, a predominant feed can occur and not otherwise. Correspondingly, if main tracer 781 is not on the line causing solenoid 817 to be de-energized, a rotational feed cannot occur. Thus, following a predominant feed which moves tracer 781 off the line, an alternative feed will always occur prior to a rotational feed because of interlock 952. If the alternative feed fails to move rotational tracer 807 back onto the line, then a rotational feed will occur before the next predominant feed. This will be understood from the fact that both tracer points must be on the line so that both the circuit breakers operated by solenoids 817 and 931 will be closed.

*Record punching mechanism*

As previously stated the various movements of the tracing unit and the rotational tracing point are each recorded in a separate cycle or step of movement of the record of the contour which is being traced and recorded. For this purpose the various solenoids which are energized by both the directional and rotative controls have associated therewith corresponding elements in the punching mechanism which are related to the respective columns in the record. The record itself is fed past the punching means in step-by-step fashion.

The record may be a tape of material such as a metal, paper or cellulose and may be mounted upon a reel 956 (Figs. 67 and 68). The reel 956 is mounted upon stub shaft 957 journalled in vertical plate 958 which is suitably mounted on the housing 614. Shaft 957 carries a pulley in ball bearing housing 959 which is connected by a spring belt 961 with pulley 962 (Fig. 69) on shaft 963. Shaft 963 is mounted in suitable bushings in plate 958 and plate 964 and may be provided with hand wheel 965 (Fig. 68) for manual turning. Between plates 958 and 964, shaft 963 carries sprocket wheel 966 whose active teeth extend upwardly past the record supporting and piercing die 977. As shown in Fig. 67 the record 373 travels from a suitable supply reel (not shown) and travels over die 977 and sprocket wheel 966, being guided by spring-urged roller 978 which prevents overfeeding of the record. From sprocket wheel 966, the record is wound onto reel 956.

Above the piercing die 977 (Figs. 67 and 68) a punch block plate 981 is suitably secured between plates 958 and 964 and has mounted therein a block carrying a series of punches 982, one for each column in the record. These punches and their operation will be referred to hereinafter.

To provide a step-by-step drive for the sprocket wheel in feeding the record, the pulley 962 (Figs. 68 and 69) carries a ratchet wheel 986 having opposite spring-urged centralizing arms 987 associated therewith. Associated with the ratchet wheel 986 is a spring-urged one-way acting pawl 988 mounted on a slide 989, which is guided for vertical movement by pin 991 engaging a slot therein. The upper end of slide 989 has a pivoted adjustable connection to feed arm 993 pivoted at 994 and having a stop arm 995 engaging an eccentric stop 996. Arm 993 also carries pin 997 which has a pivotal and sliding connection with spaced cam follower links 998 having a roller 999 journalled therebetween for operative engagement with return cam 1001 on shaft 652. As seen in Fig. 69, cam follower links 998 have arm 1002 pivoted therebetween and carrying a torsion spring 1003 at its outward end. The ends of spring 1003 engage below the grooved ends of pin 997 so that the cam follower links 998 are yieldably connected to feed arm 993 for downward movement therewith, and correspondingly feed arm 993 has a resilient lift.

The arrangement is such that for each revolution of the shaft 652 the actuating pawl 988 moves the ratchet wheel 986 of the associated sprocket feed for the record if a record punching operation has occurred. The timing is such that the movement of the record is alternative with the punching.

Referring to Figs. 67, 68, and 70, each punch 982 is guided in an apertured punch block 1006 immediately above the record and can be projected into similar aligned apertures 1007 in the record piercing die 977. Each punch 982 is pivotally connected to a vertically reciprocating link 1008 (Fig. 67) which has as its upper stop a transverse rod 1009 extending between plates 958 and 964. The slotted portion of each link 1008 is also engaged by a transverse bolt-supported sleeve 1010 which extends through all of the punch actuating links 1008 and is carried by respective arms 1011, pivoted on shaft 994. Thus, if a punch link 1008 is depressed to perform a punching operation as later described, arms 1011 and shaft 994 will be oscillated in a clockwise direction. Such oscillation is counterclockwise in Fig. 69 and operates to rock feed arm 993 tensioning spring 1003 so that roller 999 will follow cam 1001 closely, and so that feed pawl 988 moves downwardly past the cooperative tooth of ratchet wheel 986, the extent of movement being such as to provide an initial lost motion during the raising of pawl 988 for a purpose later referred to.

All of the punch actuating links 1008 are of similar construction and have a similar mode of operation, being normally in an inactive position and being moved to active position by a corresponding solenoid when energized from the controlling circuit breaker operated by the corresponding feed mechanism. Adjacent its upper end, each link 1008 is connected by spaced-apart pivoted links 1016 to the armature 1017 of the corresponding solenoid. The punch solenoids are numbered 1018 to 1023, respectively. Each link 1008 is normally maintained inactive by a spring 1024 which holds the armature of the solenoid in retracted position. With reference to Figs. 67 and 70, it will be noted that the alternate links 1008 are spring-urged in opposite directions, because the two groups of solenoids are mounted at opposite sides.

Power actuated mechanism is provided for operating the punch which is enabled by the energization of its corresponding solenoid. For this purpose, slotted actuating comb 1031 (Fig. 70) is provided between two arms 1032 (Figs. 67 and 70) pivoted at 1034 on the frame and spring-urged in a clockwise direction as viewed in Fig. 67 by a spring 1036. Each arm 1032 carries a roller 1037 which is cooperatively related with a corresponding cam 1038 (Fig. 68) on transverse cam shaft 1039, journalled in bearings 1041 in housing 614. Shaft 1039 is connected to driving sleeve 653 previously described so that the punch drive is timed with the feed and control mechanism drive of the tracer unit.

Fig. 71 shows a punch operating link 1008 in inoperative position when comb 1031 will reciprocate free of the ledge 1042 of the link, so that vertical reciprocation of the actuating comb 1031 will be ineffective with respect thereto. Fig. 72 shows the same link after it has been moved to operating position by actuation of its armature links 1016 so that ledge 1042 lies in the path of comb 1031, while Fig. 73 shows the link after it has been driven downwardly to pierce the record. The slugs pierced from the record fall on chute 1043 (Fig. 67) for discharge, so that they do not fall into the record as it is wound onto reel 956.

It will be noted that sleeve 1010 has clearance within link 1008 as shown in Figs. 71 and 72 so that it is free for magnetic or spring positioning when comb 1031 is raised.

As previously stated the feeding of the record is alternate with the punching thereof, the lost motion or lead referred to between pawl 988 and the tooth which is to be advanced providing for complete withdrawal or stripping of the active punch before feeding movement of the record.

As stated the punch selecting solenoids 1018—1023 are controlled by circuit breakers operated by the feed mechanism of the tracer unit. Referring to Fig. 74 it will be seen that the solenoids 1018 and 1021, respectively, are connected by leads 1047, 1048 to respective circuit breakers 1049 and 1050; solenoids 1019 and 1022 are connected by leads 1051, 1052, respectively, to circuit breakers 1053, 1054; and solenoids 1020 and 1023 are connected by leads 1055, 1056 to circuit breakers 1057 and 1058, respectively. Thus each of the feed control solenoids of the tracer unit exert an electrical control over a corresponding punch selecting solenoid so that for each increment of feed a corresponding perforation is made in the record. For each active cycle of the tracing unit a one-step movement of the record is effected.

*Three dimensional tracing unit*

Fig. 76 illustrates schematically a modified form of tracing mechanism which embodies two tracing units. One of the tracing units is for tracing contour lines in the same manner as heretofore described, while the other tracing unit provides a control for tracing and indicating the depth in making three dimensional tracings. The apparatus includes a tracing unit 601A similar to that shown in Fig. 45 which is mounted for movement in the same manner on a carriage 602A which is similarly mounted on the tracing table 604A. Table 604A has contour layout plate 605A mounted thereon.

Also mounted on the carriage 602A is a depth tracer unit 1101 which is mounted for movement along the carriage in the same manner as the tracer unit 601A, and of course moves with the carriage 602A under the control of the tracer unit 601A. The unit 1101 includes control dial 1102 which controls the direction of feeding movement along the carriage 602A by mechanism similar to that disclosed in connection with the tracing unit 601 for the same purpose. Referring to Fig. 77 such mechanism comprises briefly solenoids 1103 and 1104 which are controlled through suitable leads from the terminals 1106 and 1107 of commutator 1102. The solenoids 1103 and 1104 are connected by circuit breakers 1108 and 1109 to punching solenoids 1020 and 1023 which are associated with the fifth and sixth columns of the record, respectively, as previously described. In this manner the record also indicates the movements of the depth tracing unit as well as the contour tracing unit in three dimensional tracing operations.

The depth tracer unit 1101 (Fig. 77) includes a tracer point 1111 which is electrically connected by lead 1112 with the terminal 1113 of a selector control dial 1114. Dial 1114 is a selector dial to set the machine for tracing in three dimensions or for an optional line stopping control of tracing as will be described later.

From terminal 1113 of dial 1114 the circuit is established through commutator contact 1116 to terminal 1117 from which lead 1118 extends to control solenoid 1119 for depth tracing. The other lead 1127 from solenoid 1119 extends to the line. Dial 1114 also has commutator contact 1115 to connect between terminal 1133 connected by lead 1134 to tracer point 781 and terminal 1120 connected by lead 1135 to control solenoid 817. As shown, therefore, tracer point 1111 is operatively connected to tracer unit 1101 and tracer point 781 is operatively connected to tracer unit 601A.

The solenoid 1119 is similar to the solenoid 817 shown in Figs. 63 and 65 and has substantially similar control mechanism associated therewith. As seen in Fig. 75A armature arm 844 carries hook 1121 which replaces hook 873 shown in Fig. 65, and is mounted in the same manner on the armature arm 844. Hook 1121 (Fig. 75A) is provided with internal latching tooth 1122 for engagement with stud 1123 mounted on the plate 870 and such latching is effected by the energization of solenoid 1119 to pull its associated armature against its pole face. When the hook is engaged with the latching stud the rod 842 holds the circuit breaker 1124 closed. Circuit breaker 1124 differs from that associated with the solenoid 817 in that it is normally open to prevent operation of the tracing unit 601A during the time tracing unit 1101 is in operation. The hook 1121 is provided with a handle 1126 by means of which it can be manually moved to and from operative position.

The tracer unit 1101 differs from unit 601A in that it is operative to cause movement in accordance with the setting of control dial 1102 as long as the tracer point 1111 is not making contact with a line. Consequently during this period the solenoid 1119 is not energized and the circuit breaker 1124 is open. The circuit breaker 1124 is made a part of the main lead from the line for the other tracer unit 601A so that it cannot operate when the circuit breaker 1124 is open. Likewise when the depth tracer unit 1101 is disabled, that is when solenoid 1119 is energized or when hook 1121 is positioned to engage tooth 1122 with stud 1123, the tracer unit 601A is enabled by the closing of the circuit breaker 1124. As shown the circuit breaker 1124 is connected with the line by lead 1127 and is connected electrically with the circuit of tracer unit 601A by lead 1128.

Referring to Fig. 75A it will be apparent that the oscillatory movement of pawl 882 is inoperative to disengage the hook 1121 from the latch 877, so that the hook remains engaged at all times.

From the above description it will be seen that as long as the armature arm 844 is in its outward position, the shaft 883 can have its full unrestricted oscillation each time, so that for each cycle of the machine a step of movement in the direction determined by the control dial 1102 will occur, and such movement will continue until the tracer point 1111 moves into contact with a line so that the circuit is established to the solenoid 1119 and the armature arm 844 is moved inwardly to stop the movement of the tracer unit 1101, or until the armature arm 844 is manually operated to accomplish the same result. In each instance arm 844 is latched by hook 1121 so that it must be manually released for subsequent operation.

*Automatic line stopping control.*—Means is provided whereby the tracer point 1111 of the tracer unit 1101 can be disabled and its controls connected to contouring tracer point 781, whose contouring controls are also disabled in this way. The feed mechanism of the tracer unit 601A will operate under automatic line stopping control. To accomplish this result the control dial 1114 (Fig. 77) is turned for one-eighth of a turn in a counterclockwise direction, as viewed in Fig. 77 so that the commutator contact 1131 is connected between terminal 1117 which is connected by lead 1118 to solenoid 1119 and terminal 1133, which is connected by lead 1134 to main tracing point 781 of the tracer unit 601A. This in effect transfers the controls of the tracer point 1111 to the tracer point 781 so that movement will be determined so long as the tracer point is not making contact and movement will stop when the tracer point 781 encounters a conducting line. At the same time the one-eighth turn of dial 1114 moves commutator contacts 1115 and 1116 to break the normal control circuits established thereby.

In order to control the four directions of feed of tracer unit 601A and to select the direction of movement, the dial 1102 (Fig. 77) is provided with four terminals 1136 to 1139, respectively. The terminals 1136 and 1138 are electrically connected by leads 1141 and 1142 to respective leads 741 and 743 for solenoids 682 and 687 which control the movement of the tracer unit 601A in its transverse direction. Similarly, terminals 1137 and 1139 are connected by leads 1143 and 1144, respectively, to leads 744 and 742 associated with the solenoids 666 and 664 which control the longitudinal feed of tracer unit 601A.

The optional automatic line stopping control for tracer 781 is useful in moving from one contour line to another in three-dimensional tracing operations, and also in tracing for recording center locations.

Description of operation

*Hole center location.*—Fig. 78 shows at line 1161 a five to one layout of a part to be formed in which the scribed line is made in an insulating coating covering the underlying sheet which is of conducting material. The outer line 1162 represents the path of the center of a one-eighth inch diameter cutter in cutting a part from metal, as will be later described.

Within the contour line 1161 a diagrammatic indication of the path of the tracer point in locating the hole centers is shown, and for convenience this portion of the view is made twenty times the actual size. In other words, the increment of movement as shown by the dots is one hundred times the corresponding increment of movement of the work in being positioned relative to the center drill when the holes are actually located in the metal.

As shown, the piece to be made will have four hole centers indicated at 1163 to 1166, respectively, and in addition an outside center 1167 is located for the initial hole in which the cutter starts its work in contouring. From the description of the auxiliary tracing unit 1101 it will be recalled that this unit is so constructed that the feed mechanism will stop when the tracer point encounters a conducting line. To enable use of this mechanism a hole center, for example 1163, is represented by two scribed lines 1168 and 1169 at right angles to each other but not intersecting, so that the actual hole center 1163 is represented as the central part of the intersection of 1168 with 1169. The scribed lines are represented by rectangles, and it will be understood that the area within a rectangle is all conducting material while that outside the rectangle is non-conducting.

It will be seen that the other hole centers are similarly located by a pair of rectangular contacting areas or by a single contacting area with the hole center lying on a straight line from a previously located center. With the above description of the actual making of the layout on which the tracing is to be done the actual opertaion of the tracing unit will now be described.

To adjust the tracing apparatus for this tracing operation, the control dial 1114 (Fig. 77) is rotated so that the commutator contact 1131 extends between terminals 1117 and 1133 which places the control solenoid 1119 in control of the operation of the tracing point 781. With this setting, the control dial 1102 is set with arrow pointing downwardly so that the connection to terminal 1138 is made to determine feeding in the downward direction. This setting of the control dials 1102 and 1114 is also indicated in Fig. 78.

After the dials are set, the tracer unit is released from the carriage by operation of knob 669 (Fig. 45) and is moved until the tracer point 781 is opposite the line 1168, that is approximately in the position of the initial dot in the line.

With the tracer unit positioned as described, both the D. C. and A. C. circuits are connected, so that energy is available for the motor 657 and for the solenoid control circuit. Then the hook 1121 (Figs. 75 and 77) is moved from disabled position by means of the handle 1126 and operation of the tracing unit will begin in the direction indicated by the arrow at 1102A in Fig. 78. Each dot represents one increment of movement of the tracer unit. The increments of movement referred to in an actual machine are in the order of five thousandths of an inch and in practice the speed of operation is governed to obtain from twenty to thirty such movements per second, this being at the rate of six to nine inches per minute of travel. During each step of movement, the solenoid 687 is energized and moves its associated pawl mechanism 686 into operative relation with ratchet 679 so that an increment of movement is transmitted to gear 676, drive gear 674, and shaft 611 which carries pinions 609 engaging racks 608. Solenoid 687 also closes the circuit breaker 1050 (Fig. 74) so that punch selecting solenoid 1021 is also energized. The energization of solenoid 1021 (Figs. 67 and 71-73) through link 1016 moves punch link 1008 so that its ledge 1042 is in operative relation with comb 1031 so that punch 982 is operated and a perforation is made in the record for each increment of movement.

This movement continues until the tracing point 781 moves onto line 1168 when the solenoid 1119 (Fig. 77) will be energized and the operation of the feed will be stopped. This will occur because the latch 877 (Fig. 75) engages the pawl 882 and restricts the oscillation of the shaft 883 so that the circuit breaker 1170 is not closed and no further feed increments will be taken. Also when armature arm 844 is moved inwardly, the latch tooth 1122 will engage over the stud 1123 and latch the armature so that the mechanism is disabled until it is again manually enabled by releasing the hook 1121 through the handle 1126.

The operator then changes the setting of control dial 1102 as indicated at 1102—B in Fig. 78 to change the direction of feed as indicated. This, however, is ineffective to start operation of the machine, and the operator must manually move the armature 844 to the inactive position shown in Fig. 77, and hold it there until he no longer feels the pull of the solenoid on the arm. At this time the tracing point will have moved off of the line 1168. It will be understood of course that in the horizontal line of feed between lines 1168 and 1169, in actual practice a much greater distance comparatively will be available so that a considerable number of steps would be made in moving from one line to the other. During movement of the tracer point from line 1168 to 1169 the solenoid 664 is energized during each cycle or step to operate its connected feed mechanism and to close the circuit breaker 1034 and correspondingly energize the punch selecting solenoid 1022. The solenoid 1022 correspondingly operates the punch in column four of the record and also the record feed mechanism. This operation occurs for each step of movement from the line 1168 to the line 1169 when the tracer unit will again stop as previously described. When the tracing unit stops upon engagement with line 1169, the operator knows that the hole center 1163 has been located.

The tracing operation to engage the main tracing point 781 with the scribed line 1169 merely locates the starting point of the actual tracing operation, and usually this portion of the record is cut off and the actual record for use in the metal cutting machine starts with the tracing from the center 1163 on the line 1169.

To start tracing from the center 1163 the operator holds the armature 844 outwardly by handle 1126 until the magnetic pull thereon ceases when the tracing point 781 will have moved off of the line 1169 and will continue tracing to the right as indicated by the setting of control dial 1102-B until it stops on the line 1171. This requires thirteen steps of movement as diagrammatically represented in Fig. 78. Referring to Fig. 79, it will be noted that the record 373-A which is cut diagonally at the starting end, is provided with thirteen perforations 1172 in column four which provides a record of the thirteen steps of movement in moving from the line 1169 to the line 1171.

When the tracing point is on the line 1171, the tracing apparatus stops as previously described, and the operator re-sets the control dial 1102 to the setting indicated at 1102-C, corresponding to the original setting 1102-A. Handle 1126 is again operated to cause movement of the tracing point 781 off of the line 1171, and the automatic tracing operation continues until point 781 moves onto the line 1173, where the tracer unit will again stop. This movement requires three increments of movement from line 1171 which are indicated on the record by the three perforations 1174 in column two.

When the tracing point 781 stops on the line 1173 this indicates the second hole center 1164 and the operator manually spaces the record ahead in the punching mechanism by turning knob 965 (Fig. 68) to provide a blank space in the record. The blank space following the perforations 1174 is shown as being only two steps or two machine orders in length, but in practice this distance would probably be five to six such orders. The blank space is used to automatically stop the machine at the center location 1164 for the actual drilling operation as later described.

After the blank space has been inserted the operator again manipulates the handle 1126 without changing the setting of the control dial 1102 to cause movement of the tracing point 781 off the line 1173 so that it moves downwardly and onto the line 1176 where the hole center 1165 is located. This movement is represented by the perforations 1177 on the record 373-A and then another blank space is provided in the record as described, after which the handle 1126 is again operated to cause a further tracing until the tracing point 781 encounters the line 1178. The line 1178 may be omitted if desired, but is usually provided as a check to make certain that the layout is in true vertical alignment with the path of the tracing unit.

When the tracing unit stops because the tracing point is on the line 1178, the operator merely holds the handle 1126 until it moves off the line 1178 and will move to the line 1179. Fig. 80 shows the end of the record having perforations 1181 representing the last portion of the tracing to the line 1178 and to the line 1179. When the tracing unit stops because the point is on line 1179, another blank space is inserted and the control dial 1102 is set as indicated at 102-D in Fig. 78, and the handle 1126 manually operated again to cause movement of the tracing point off the line 1179. The tracing unit will move as indicated in Fig. 78 until the point 781 moves onto the line 1182. This movement is indicated by the perforations 1183 in Fig. 80. The line 1184 in Fig. 78 represents the approximate closeness with which the edge of the metal could be placed with respect to the adjacent contour line although if desired the contour may be located farther from the edge of the metal, in which event a hole would be drilled as indicated at 1186, from which hole the actual contour cutting operation would start as will now be described.

Referring to Fig. 81, the work holder 241 referred to in the description of the machine is shown with the work 201 mounted thereon. It will be recalled that the work holder 241 is provided with two apertures such as indicated at 1187 for engagement by the dowels 248 as shown in Fig. 17. The dotted line 1188 in Fig. 81 shows the outline of the piece to be cut while the holes to be center drilled are shown at 1163, 1164, 1165, and 1166.

It will be recalled that the record 373-A shown in Fig. 79 begins with the position indicated by the hole 1163. The first step in starting the machining operation, therefore, is to locate the hole 1163 in the work 201 manually, so that ample clearance is provided toward each adjacent side of the work piece for the contour 1188 of the part. When the work is located, the next step is to adjust the clamping sleeve 47 to accommodate the combined thickness of the work and the work holder. Sleeve 47 is adjusted vertically with respect to the clamping arms 217 by threading collar 211 upwardly or downwardly until the clamping sleeve engages the work tightly when down and is just free of the work when up. The adjustment is secured by lock nut 212.

The next operation in adjusting the machine is to set the scale adjusting means for the transverse and longitudinal feeds, namely screws 322, 342, 349 and 350 (Figs. 1 and 2), so that the increment of feed for each perforation of the record corresponds to and is proportionate to the magnification of the layout from which the record is made. Thus, if the layout from which the record was made was on a five to one scale and the increment of movement of the tracing unit in making the record was .005", the increment of feed on the machine itself would be set to one-thousandth of an inch. Likewise if the layout is twenty to one in making the record then the increment of feed for the machine is at .00025".

When the above adjustments have been made and the proper tool installed for use, which in this instance is the center drill such as 552 (Fig. 40), the depth control screw 123 (Fig. 4) is adjusted so that the center drill will penetrate to the desired depth and no further. It will be understood of course that either the top or bottom center drill can be used, or possibly both, where it is desired to have absolutely concentric hole locations on either side of the metal.

Assuming the top center drill is to be used, motor 76 is enabled by switch 77 to rotate the center drill during the time of a center drilling operation, and the center drill is reciprocated manually by turning hand wheel 554 on the shaft of main motor 115.

After the first hole 1163 (Fig. 81) is center drilled, the reciprocation of the tool assembly is disabled by inserting a stop pin in each of the apertures 90 (Fig. 4) in rods 82. In this way roller 95 is maintained in raised position and will not follow cam 102.

In order to feed the work to locate the center of the next hole, the record is installed in reel 371 with the diagonally cut end first as shown in Fig. 79 and with the leading point of the diagonal end towards the front of the machine. The record is threaded under the roller 371 (Fig. 22) through the sprocket 376 and onto the reel 372. It will be understood that additional length of blank record is provided over that shown in Fig. 79, to enable the threading of the record into its holding and feeding mechanism.

The operator rocks the switch knob 471 (Fig. 2) to turn unbalanced arm 469 (Fig. 44) so that the switches 463 and 470 are moved to circuit closing position to energize motor 115 and enable the source of D. C. current with respect to the control circuit. The knob 471 is held in circuit closing position until such time as the first perforation 1172 comes opposite the sensing fingers when automatic operation of the feed mechanism will start under the control of the record. When automatic operation starts, switch knob 471 can be released because solenoid 468 is energized and will hold arm 469 (Fig. 44) in position to keep switches 463 and 470 closed.

From inspection of the record in Fig. 79 it will be seen that thirteen steps or increments of movement will occur in one direction, and then three steps in another direction when the blank space in the record stops operation of the machine, because none of the contacts 459, 460 are closed, the sensing fingers 421 all being stopped by the record. As will be recalled when no finger 421 senses a perforation, the solenoid 438 (Figs. 22 and 44) which is in series with each of the contacts 459, 460, is not energized, and the control contacts 439 are allowed to open, since at one interval (see 1211 in Fig. 43) during the sensing period the end of armature arm 436 can follow the low portion of cam 434 under the influence of the spring pressure of contact 439 if not magnetically restrained. Thus, circuit breaker 439 remains open for a period controlled by the low portion of the cam.

As seen in Fig. 44, the solenoid 438 and circuit breaker 439 control the solenoid 468 which normally holds the switches 463 and 470 closed, so that solenoid 468 will also be deenergized for such period. It will be recalled that the weight distribution of armature arm 469 for solenoid 468 is such that it will move to switch opening position unless constantly held by the solenoid 468, which does have sufficient magnetic pull to influence arm 469 after it moves away from the pole face of the solenoid. Thus, when solenoid 468 is de-energized, even if momentarily, the switches 463 and 470 are opened, and must be manually returned to circuit closing positions before the power and control circuits can again be enabled.

The stopping of the machine indicates that the position for the hole 1164 has been located. It will be understood that the blank space in the record extends through sufficient machine operating orders or cycles on the record to prevent a subsequent perforation being moved past the sensing fingers because of coasting of the machine or manual turning over thereof during drilling.

To center drill the hole, center drill motor 76 is energized during the period of drilling and the machine turned over manually to lower the center drill into the metal to a depth determined by the stop screw 123. Back pressure in the oil feed line will provide sufficient lubrication of the center drill, the valve-controlled connection 231 having been closed during feeding.

If desired at this time the work can be removed from the machine and the hole drilled to slightly less than its finished diameter after which the work can be replaced on the machine, being accurately located by use of the dowel holes 1187 and the corresponding dowels, and one of the boring bars 556 or 566 (Figs. 41 and 42) of appropriate size may be used to bore the hole to finished size or to reaming size. In this way the work is accurately located both for center drilling and for boring, and the boring operation locates the axis of the hole perpendicular to the face of the work and on the located center.

After the hole 1164 is completed, the record control of the machine is again started to locate the center for the hole 1165, where the operations described are repeated. The same sequence of operations are performed in locating the center for the hole 1166 and any other hole centers recorded.

If desired, a record could be made of an endless path by tracing from the center 1166 back to the center 1163, so that the record would travel from center to center and back to the starting point. In this way, the work could be performed by center drilling all the holes progressively, after which the work would be removed and the holes would be drilled approximatley to size while the machine is moving back to the starting position. The metal is then replaced in the machine and the record re-run when the boring bar could be employed at the various hole centers.

*Contour tracing and machining.*—Figs. 82 and 84 illustrate a typical tracing operation such as that which might be encountered for example between lines 1201 and 1202 in Fig. 78. In Fig. 82 line 1203 represents a portion of an enlarged contour line of a part, while the broad line 1204 represents the path of the center of a cutter and is scribed to a width which is enlarged in the figure approximately twenty times the actual width it would have on a layout.

The tracing apparatus for tracing such contours is illustrated in Fig. 45 and the tracer unit is adjusted with the control 946 (Fig. 61) in its raised position to disable the rotational armature arm 933 and to correspondingly disable the rotational tracing point 807.

To condition the tracing unit, the predominant control dial 701 is set as indicated at 701-A in Fig. 82 and the alternative control dial 702 is set as indicated at 702-A, so that tne alternative feed is to the right and the predominant feed is up as indicated in the figure. The power for the driving motor 657 is turned on as well as the power for the control circuit, and the tracing point 781 is either placed on the line 1204 by manual manipulation of the tracing unit or if desired, it can be placed to the left of the line as shown in Fig. 82 and the button 712 of the alternative control dial depressed so that the tracing unit will move in the alternative direction until tracer point 781 makes contact with the line when a movement in the predominant direction will automatically occur and the button 714 is released by the operator.

In any event the tracing point 781 is positioned as indicated by the dot A, in Fig. 82. In this position the tracer point 781 makes contact, and a circuit is established from tracer point 781 (Fig. 74) to solenoid 817 and line 818 to the other side of the line to energize solenoid 817.

The energization of solenoid 817 closes circuit breaker 848, 856 from which a circuit is established to normally closed circuit breaker 943, 944 and line 891 to the commutator terminal 721. The commutator is set for contact with terminal 728 so that the circuit is established through line 741 to solenoid 682. Solenoid 682 causes operation of its corresponding feed mechanism and also closes the circuit breaker 1049. The circuit breaker 1049 is connected to the line and through lead 1047 with the punch selecting solenoid 1018, so that the punch for column one of the record as viewed in Fig. 83, is enabled and perforation 1206 is made.

As described, the perforation 1206 on the record in Fig. 83 corresponds to the movement of the tracing point 781 from location A to location B in Fig. 82. At point B, the tracer point 781 no longer makes contact so that an alternative increment of movement is automatically effected to cause movement of the tracer point from location B to location C. This corresponds to the perforation 1207 in the record in Fig. 83. As described in connection with the description of the tracing unit, the alternative step of movement occurs because the latch 877 is held up by the hook 873 as shown in Fig. 65, so that pawl 882 and shaft 883 can have unrestricted oscillation to close circuit breaker 897, 898 (Fig. 62). Shown in Fig. 74, the circuit breaker 897, 898 is connected by lead 899 with terminal 736 of the commutator which is adjusted for contact with terminal 733, so that a circuit is established through line 742 to solenoid 664 which causes feeding of the tracing unit 601 to the right on the carriage 602. At the same time, the circuit breaker 1054 is closed to establish a circuit through lead 1052 for punch selecting solenoid 1022. Solenoid 1022 when energized causes the perforation 1207 to be made in the fourth column of the record as shown in Fig. 83.

Referring again to Fig. 82 the sequential movement of the tracing unit 601 in predominant and alternative directions is indicated by the location of the dots, and proceeds as described until the location D when an alternative step has failed to restore the tracing point 781 to the contacting area of the cutter path. This serves as an indication to the operator that the tracing unit has arrived at a point in the curve when a revised setting of the control dials is necessary, and as indicated at 701B and 702B the predominant direction is set to go to the right while the alternative direction is set upwardly, the exact reverse of the setting at 701-A and 702-A.

After resetting the dials as shown as 701-B and 702-B the operator manually depresses the button 714 of the predominant control dial 701, so that a one-step movement is made to the point E which as shown is on the cutter path, so that automatic operation again follows. The operation from that point on will continue as indicated until an alternative step of movement causes the tracer point 781 to move to location F which is not on the cutter path. This again indicates that a resetting of the control dials is necessary and in this instance it is merely a change in the direction of the alternative feed as indicated at 702-C.

If the operator is actually watching the tracing operation and sees the tracer unit approaching a change from one quadrant to another where a change in the setting of the alternative control dial is necessary, this change may be made while the point is moving in a predominant direction without affecting the operation of the machine, so that actually no movement off the line to the point F would occur nor would the tracing stop. At the end of the series of predominant steps preceding the location F the step downward in the alternative direction would be taken automatically to the point G and automatic operation continue. It is possible to change the setting of both dials 701 and 702 at any time without stopping the operation of the machine, whenever the operator can see from the trend of the curve its change from one quadrant to another, or its change from one portion of a quadrant to another.

Beginning with location H of the tracer point as shown in Fig. 82, a typical sample of straight line tracing is shown.

To perform the machining operation of the record shown in Fig. 83, which corresponds to the tracing operation shown in Fig. 82, the machine is set up with an end mill 40 as illustrated in Fig. 4. The end mill is located for external cutting by having the end mill positioned within a specially drilled hole or positioned exteriorly of the metal itself.

To start the machining operation, the record is installed as previously described and the oil line is enabled at valve 231 so that a free flow of oil will be provided to lubricate the cutter guide bearings and to maintain advantageous cutting conditions at the point of cutting as will be described. The machine is started as previously described, so that the record starts feeding and automatic operation will follow. Assuming that the hole 1206 is presented to the sensing mechanism, sensing pin 421 of arm 422 (Fig. 28) passes through the record and the arm closes its associated contacts 459, 460. The closing of the contacts 459, 460 as shown in Fig. 44 completes a circuit from ground through the arm 422 and lead 453 to solenoid 338 to cause a one increment movement of the ratchet wheel assembly 297, 296, as actuated by the pawl assembly 337.

As seen in Fig. 43, the solenoid 338 is energized or "on" at a time just before the feed pawl starts its active stroke as indicated by descending portion of the line 1208, and while the work is released by the clamp as shown by the clamp stroke line 1209. At this time also the cutter is raised completely clear of the work as indicated by its timing line 1210. At this time also the arm 436 (Fig. 29) is free to drop to circuit opening position with respect to the circuit breaker 439 because the low portion of cam 434 is opposite the arm. The solenoid 438 being energized at this time, however, the arm 436 is held in the position shown. This period when the cam 434 does not hold the circuit breaker 439 closed by pin 440 is indicated by the dark portion 1211 of the motor stop switching circuit line in Fig. 43.

The energization of the solenoid 338 occurs just before the roller 337 (Fig. 12) moves off the high part of the associated cam 359 so that the pawl is fully seated before its active stroke commences. The current for solenoid 338 is maintained until after the pawl completes its full stroke and the roller 337 is riding on a low dwell of the cam 339, see also Fig. 43. Approximately twenty degrees after the low dwell of the cam 339 becomes effective or is in its effective position, the associated cam 432 (Fig. 29) causes withdrawal of the sensing pin 421 and also opening of the contacts 459, 460. Excessive arcing is prevented when the contacts break by the condenser 1212 (Fig. 44) connected in parallel with the solenoid 338.

After the sensing pin 421 is withdrawn, pawl 396 (Fig. 26) becomes operative to feed the ratchet wheel 391 ahead for one tooth space, which, through the sprocket wheel 376, also advances the record so that the second perforation is aligned with the sensing pins and is sensed by a pin 421 preparatory to the following cycle. This initiates a second sequence of operations controlled by the lowest hole 1207 in column four, which is sensed by the pin 421 on sensing arm 425.

As seen in Fig. 44 when the arm 425 is moved upwardly and its associated contacts 459, 460, close, a circuit is completed through lead 456 to solenoid 355 having an actuating pawl mechanism 352 associated with the ratchet wheel assembly 353. This results in a one-step advance of the carriage towards the left of the machine as viewed from the front of the machine.

The successive perforations 1206 and 1207 in the record shown in Fig. 83 continue to control the respective feed mechanisms as described and between each step of movement of the work the end mill 40 reciprocates once. Fig. 84 shows the position of the end mill for every tenth increment of a record made from the layout in Fig. 82, the intermediate positions having been omitted for clarity in the view. It will be seen that the successive cutter positions are tangent to a curve corresponding to the line 1203 in Fig. 82 so that this line is reproduced on a reduced scale in the metal itself. With increments of from one quarter thousandths to two and one-half thousandths, it will be seen that very smooth, even and accurate surfaces will be cut by the end mill. In actual operations, generally it is possible to cut through metal of a thickness four times the shank diameter of the cutter with smooth perpendicular walls accurately located with respect to the contour traced. For example, a cutter having a shank diameter of one-eighth inch has been used to cut a one-half inch block of steel, with a rate of travel of from .060 to .600 inch per minute.

*Tracing and machining with rotational control.*—From the description of the machine it will be recalled that in using a broach, a rotational control of the angular position of the cutting face of the broach is provided in following a contour so that the cutting face is always leading. Also in machining operations involving an end mill where angular clearance or draft is provided, a similar rotational control of the misaligned axis is necessary to maintain the angularity constant with respect to the face of the work. The tracing operations for controlling the angular position of the broach and the angular position of the misaligned axis of the end mill are identical so they will be described together.

Referring to Fig. 85, line 1221 represents an enlarged layout of the part to be contoured while line 1222 represents the path of the axis of the tool, i. e. the line which is to be traced. To perform this tracing operation both tracing points 781 and 807 are used and as previously described the sequential control of the predominant, alternative and rotational increments of movement are such that both points follow the line 1222. It is assumed that tracing is started with the main tracing point 781 at the location A, the rotational tracing point 807 at location $a$, the predominant control dial 701E indicating feed to the right, the alternative control dial 702E indicating the feed down, and the rotational control dial 703E indicating rotational increments in a clockwise direction. Also the rotational control is enabled by moving the armature blocking stud 946 to the position shown in Fig. 61. The various motor circuits and control circuits are enabled. Inasmuch as both tracer points 781 and 807 are making contact on the line 1222 a predominant step of movement will follow.

The predominant step of movement which is controlled in the manner previously described moves the main tracer point 781 from the location A to the location B, while the rotational tracer point 807 is moved from the location $a$ to the location $b$, so that point 807 is moved out of contact with the line. Referring to Fig. 74, it will be noted that when point 807 is not making contact, the solenoid 931 is not energized so that the circuit breaker 943, 944 is open to disable the circuit operated by the solenoid 817 so that a predominant step of movement cannot occur even though solenoid 817 is energized.

Inasmuch as the solenoid 817 is energized even though the circuit controlled thereby is broken at the circuit breaker 943, 944, the armature arm 844 is in the position shown in Fig. 63, where pin 951 (Figs. 62 and 63) holds interlock arm 952 in inactive position. With this condition arm 949 and shaft 938 can have an unrestricted oscillation to close the circuit breaker 947, 948 (Fig. 74) so that a circuit will be established through the lead 1223 to terminal 929 of the rotational commutator which is connected with terminal 926 determining clockwise rotational increments, the circuit being completed through lead 1224 to solenoid 919.

The energization of solenoid 919 accomplishes two results. One result is a rotational increment in a clockwise direction because the solenoid 919 (Fig. 50) enables the operation of the pawl assembly 917 to rotate ratchet wheel 915, gear 913 etc., so that the tracing point 807 has one rotational increment in a clockwise direction. The other result is to close the circuit breaker 1057 (Fig. 74) so that the punch selecting solenoid 1020 is energized through the lead 1055. This results in the punching of the perforation 1226 in the record as shown in Fig. 87, 1227 representing the perforation previously made for the predominant step preceding the rotational step described.

Referring to Figs. 85 and 86, the rotational movement of the tracer point 807 is effected from the location $b$ to the location $b^1$. In Fig. 86 a position of the tracer point 807 resulting from a predominant or alternative feed is indicated by an open circle while a position resulting from its own rotational feed is indicated by a solid dot.

Inasmuch as the rotational increment of movement to position $b^1$ moved the contact point 807 onto the conducting line, solenoid 931 (Fig. 74) is energized and the circuit breaker 943, 944 is again enabled to enable the predominant control circuit. Because both of the tracer points are on the line, a predominant step of movement will follow moving the tracer points to locations C and $c$, respectively. This sequence of predominant and rotational increments continues until the predominant tracer 781 arrives at the location D where the rotational tracer 807 is at the corresponding position $d$. In this position point 781 moved off of the line and does not make contact, so that an alternative increment of movement or feed will occur even though the rotational tracer point 807 has also moved out of contact with the line 1222. This condition obtains because the solenoid 817 (Figs. 63 and 65) is de-energized and the armature arm 844 is in its outward position, and solenoid 931 (Fig. 64) is also de-energized so that its armature arm 933 is also in its outward position. Thus both hooks 873 and 934 are moved to draw respective latches 877 and 936 out of the path of respective pawls 882 and 937. This complete operation occurs at a time in the cycle while the rollers on arms 884 and 939 (Fig. 56) are approaching the high portions of respective cams 886 and 941. As the rollers on arms 884 and 939 start descending from the high position of their respective cams, levers 887 and 949 (Fig. 62) start moving outwardly. Interlock arm 952 is rocked in a counterclockwise direction by armature arm 844 from the position shown in Fig. 62 into the path of the lever 949 so that its oscillation is restricted before circuit breaker 947, 948 can be closed and a rotational increment cannot be had. At the same time, because the armature arm 844 is in the position shown in Fig. 65, the latch 877 is held inoperative by the hook 873 so that the pawl 882 and shaft 883 can have a full unrestricted movement to cause closing of the circuit breaker 897, 898, which as previously described determines a step of movement in the alternative direction.

As seen in Fig. 85 the alternative step of movement moves the main tracing point 781 from D to E and correspondingly the rotational tracing point 807 from $d$ to $e$. Thus, while the main tracing point 781 is restored to contact with line 1222 the rotational tracer point 807 remains off the line so that a step in the predominant direction cannot occur because the solenoid 931 is still de-energized and the circuit breaker 943, 944 which is in series in the predominant control circuit is open, which prevents feeding in the predominant direction. Immediately after the alternative feed, latch 877 (Fig. 63) moves into the path of pawl 882 so that the alternative feed cannot repeat. Also the interlock arm 952 is moved to the position shown in Fig. 62 and hook 934 is still holding latch 936 out of the path of pawl 937 so that shaft 938 can then have its unrestricted oscillation to close circuit breaker 947, 948 and thereby institute a rotational increment of tracer point 807.

This rotational increment moves the tracing point 807 from the position $e$ (Figs. 85 and 86) to the position $e^1$. In this position tracer point 807 is in contact with the line so that both the main tracer point 781 and the rotational tracing point 807 are making contact and both solenoids 817 and 931 are energized to cause a predominant step of movement. This moves the tracing point 781 from position E to position F and the rotational tracer 807 from position $e^1$ to position $f$, which is off the line. As previously explained, a rotational increment will follow moving the rotational tracing point 807 from position $f$ to position $f^1$ which is again on the line, so that a predominant feed will follow.

The above described operation gives typical operating conditions in tracing with the rotational tracer point enabled. It will be observed that certain conditions control the movement of the tracer points as follows: When both tracing points are making contact with the line, a predominant increment of feed will occur; when both tracing points are out of contact with the line, an alternative increment of feed will occur immediately following the predominant increment which moved both points off the line; if following an alternative step of movement with both tracer points off the line, the rotational tracer point is not restored a rotational increment will follow to restore this tracer point to the line before a subsequent predominant step of movement; if an alternative increment fails to restore the main tracer point 781 onto the conducting line, tracing will stop without the following rotational increment, and also if a rotational increment fails to restore the rotational tracing point 807 onto the conducting line, tracing will likewise be stopped. In any case when tracing stops, it indicates to the operator, either that the end of a line has been reached or that a resetting of one or more directional control dials is required for further automatic tracing.

The operation of machining angular clearance and draft with an end mill under control of a record having rotational control perforations in the fifth and sixth columns will be described first.

The machine is set up as described in connection with the usual end milling operation as previously described except that the guide collar 43A (Fig. 34) having the misaligned bore is installed (by temporarily removing collar 203 and raising sleeve 47 to its upper position) and connected by dowel-point set screw 521 with the clamping sleeve 47. Also, forked collar 126 is removed, so that rotation of clamping sleeve 47 no longer controls depth screw 132, which may be set and locked by suitable means to determine cutting to any predetermined depth.

To obtain an initial position of the misaligned axis, ratchet wheel 132 (Fig. 5) is rotated until its aperture can be engaged by pin 524 on upper plate 135. This initial position can be selected and fixed as desired, and as shown in Figs. 5 and 34, the misaligned axis is initially positioned in the plane of the line 4—4 in Fig. 3 so that no angular clearance or draft will be cut with longitudinal feed of the work, and a maximum angular clearance or draft will be cut in the transverse direction of feed.

Thus, the amount of angular clearance or draft can be selected by initial adjustment, either manually on the machine or by perforating a selected number of rotational increment perforations in the record. Thus, when the traced contour record assumes automatic control of the machine, the selected angular clearance or draft will be maintained throughout the machining operation. Also, if desired, the amount of angular clearance or draft can be varied for different portions of the contour by changing the initial adjustment either manually or by suitably perforating the record independently of its perforation under automatic tracing control.

To start the operation the record is installed and the machine enabled and started as previously described. Figure 88 represents diagrammatically three cuts which may be in actual practice the first, thousandth and two thousandth cuts, with the inclined cut surface 1228 of the work 1229 showing the draft which is cut. It will be obvious that with the intermediate cuts omitted from the view that a smooth and accurate surface will be obtained.

As the record progresses through the sensing mechanism, the perforations controlling the rectangular motion of the work cause the feeding mechanism to operate as previously described. When a rotational perforation is sensed, one of solenoids 162 or 163 (Fig. 5) is energized in properly timed relation as indicated by the bottom line of Fig. 43 showing the timing of the circuit control of the solenoids. The energized solenoid, 162 for example, enables its associated pawl mechanism 146 so that the ratchet wheel 131, sleeve 47 and guide collar 43A are turned for one increment to correspondingly rotate the misaligned axis of the end mill. Each increment of rotation on the tracing mechanism is represented by one tooth of the ratchet wheel so that when rotational tracer point 807 makes one revolution in tracing, the misaligned axis will also make one complete revolution in cutting.

For operation with a broach under rotational record control, the assembly is made as shown in Figs. 31, 32 and 37. This conditioning involves the removal of the die 531 (Fig. 10), guide collar 43 (Fig. 4), plate 83 and the assembly supported thereby, and plug 484 (Fig. 9) from the key slot of cam 102. These parts are replaced by lower die 509 (Fig. 37), upper die 508, and the broach assembly 501, 494, and pitman 513. To install the broach in its dies 508 and 509 care is taken to insure proper radial alignment of the cutting lips with the complemental openings in the dies. Upper die 508 is connected to sleeve 47 by screw 521 to receive rotational increments, which in turn are transmitted by the broach to lower die 509 through the double keys 507 (Figs. 37-39). Usually, an initial aperture is drilled to receive the broach.

Plug 485 is drawn into locking key slot 486 by retaining screw 487 which is engaged with the selected aperture of the plug 485 in accordance with the desired broach stroke. With stock from $\frac{1}{4}''$ to $1''$ in thickness a $1\frac{3}{4}''$ stroke is used. With stock under $\frac{1}{4}''$, a $1''$ stroke is used. The adjustable connection 513, 514 (Figs. 31 and 32) is adjusted to insure complete raising of the bottom cutting lip of the broach above the work at the beginning of the feeding portion of each machine cycle as shown in the timing chart (Fig. 43). This adjustment is locked by dowel-point set screw 523 (Fig. 32), which when engaged with its cooperating locking groove also insures parallel axial alignment of pin 493 and the roller stud on block 485.

The initial angular positioning of the front cutting face of the broach is adjusted by pin 524 (Fig. 5) to parallel relation with the longitudinal feed of the work as described in connection with the angular clearance operation. Also, the clamping sleeve 47 is adjusted to firmly grip the work as described in connection with the end milling operation.

To start the machine operation, the record is installed, the motor and control circuits are enabled, and the valved oil connections 229 and 231 (Fig. 3) are opened. The intermittent feeding of the work, the intermittent operation of clamping sleeve 47, and the rotative adjustment of the sleeve all operate as previously described.

In actual operation, the tooth construction of the broach provides a staggered relation of the teeth from cutting lip to cutting lip. As shown, the first two cutting lips to engage the work in effect perform the major part of the cutting, while the succeeding lips perform a finishing operation. However, the staggering can be varied if desired so that each cutting lip will remove a progressive amount of the material. If desired, various cross sectional broach contours may be employed for small filleted corners, special shapes and the like.

Several advantages are provided by the broach and die construction. This structure insures removal of the complete cut determined by the increment of feed because the work is clamped rigidly between the upper and lower dies, which through their lapped keyed connections with the broach accurately guide its stroke and prevent appreciable side and torsional deflection of the broach. It will be noted that the guiding keys for the broach are always as close together as the material thickness will permit. Also, the close clearance between the cutting teeth and the opposite die face serves to finish the cut cleanly by removing any burrs from the lower edge of the cut. It will be noted that because the cutting lips are positioned completely above the work when the clamp releases for a feeding operation that free and accurate positioning of the work can be effected. The cutting lips project sufficiently from the upper and lower shanks to allow ample clearance for the greatest increment of feed of the work.

As pointed out in the description of the mechanism, the broach is flooded with oil from above and below during operation, with an excessive pressure during cutting because of the downward movement of the ram 494. Because of the spaced relation of the cutting teeth of the broach, a generous supply of oil is available at each cutting edge to keep the tool cool, clean, and free of adhering chips. The chips are flushed out through the collar 203.

*Broach operation for angular corners.*—For machining square or other angular corners, both internal and external, a manual control of the tracing apparatus is performed by the operator in tracing to provide the necessary rotational and translational increments for the tool to cut the corner without cutting into the finished surfaces of the straight walls adjacent the corner.

Fig. 90 illustrates the tracing and broach operation in cutting a finished internal corner by successive typical steps A–G. Step A shows the broach 498 after it has taken the last feed increment in cutting one wall 1231 of the corner, the movement having been controlled by a record made with the tracing unit control dials 701S, 702S and 703S adjusted as indicated. The alternative feed is disabled because the line traced is assumed to be parallel to a direction of movement of the tracer point in making the record. Step A also indicates diagrammatically the positions of the tracer points 781 and 807 in making the record for the last position of the broach in cutting the corner.

Step B of Fig. 90 shows at 701T and 702T the resetting of the control dials for manual tracing under control of the alternative feed with the predominant feed disabled to retract the tracer points a sufficient amount so that rotational clearance will be provided for the corners of the broach. As shown, the feed backward for the respective tracer points 781 and 807 is to locations 1232 and 1233, respectively. From the position of step B, the tracing is controlled by manual operation of button 714 and of rotational control dial 703T which is set as shown for counterclockwise movement.

This rotational movement continues until the tracer point 807 arrives at the position shown in step D in contact with line 1230, when the operator releases the button 714.

To move from the position shown in step D to that shown in step E, the control dials are set as shown at 701V, 702V and 703V, and the button 714 of the alternative feed control is depressed until the tracer points 781 and 807 arrive at locations 1234 and 1235, corresponding to a position of the broach placing its front face for movement along the other wall 1236 of the corner. The tracing for straight line movement of the broach from its position in step E through steps F and G is determined by setting the control dials as indicated at 701V, 702V and 703V, respectively.

From the above description it will be seen that any type of internal angular corner can be traced by manual control to make a record for complete automatic control of the broach in cutting the corner. It will be noted that in rotational movement of the broach the cutting is performed by one of its side cutting faces.

Fig. 91 illustrates tracing and cutting of an external corner in steps A to F with manual control of button 714 of rotational control dial 703W in steps C and D, when dials 701W and 702W are set to disable their respective feeds. The operation is identical with that shown in Fig. 90 except for the steps B and E of Fig. 90 where special translational movement of the broach is required for the internal corner.

*Three dimensional tracing and machining.*— Fig. 76 shows a layout for three dimensional tracing on a layout sheet 605A in which the right hand layout of horseshoe shape is for contour tracing while the left hand layout is for depth tracing. The layout is of the character used for a molding cavity for a dental plate impression cup. In making the two layouts a series of contour paths are provided on the contour layout, each one of which corresponds to a depth path in the depth layout. For example, contour paths 1251 and 1252 correspond to depth paths 1253 and 1254. The depth layout is prepared first and the depth contour lines are selected by making equal angular spacings 1256 from a theoretical center of the cavity so that the ends of the lines intersect the path of travel of the theoretical center of the cutter in making a sectional contour cut.

Thus in Fig. 76 the cutter cross-sectional outline is indicated at 1257 and the path of the center of the cutter for depth is laid out at right angles to the center line of the cross sectional view. From the ends of the lines 1256 projections are made to the contour layout to locate the corresponding contour lines where they intersect the contour-line of the plan view.

It will be understood that the tracing unit 601A cooperates with the contour layout while the tracing unit 1101 cooperates with the depth layout. The two tracing units operate alternately to first locate the depth of cut to be made, and to thereafter trace a contour at such depth.

It will be understood that the tracer point 781 of unit 601A and tracer point 1111 of the unit 1101 are equidistant from the carriage 602A and that the lines of the layout are made parallel or perpendicular, as the case may be, to the directions of feed of the unit 601A. It will be recalled also that unit 1101 has travel on the carriage 602A but moves with the carriage under the control of the tracer unit 601A.

It will be assumed at the beginning of the tracing operation that the tracing point 781 is located at the point 1255 (Fig. 76) of the contour line 1251 and the tracer point 1111 of the tracer unit 1101 is located at 1258 on the depth line 1253.

The first operation is to start the tracing unit 601A following the contour line 1251 and it will be noted that it will have to move to each end of the line and back in order to return to its starting point. For example, it can start by tracing to the left end and back, and then to the right end and back, and its return path is indicated in Fig. 95. It will be noted from the setting of control dials in Fig. 95 that predominant control dial 701M is set for feeding to the left while alternative control dial 702-M is set for feeding upwardly. The rotational control is disabled and hence has no direction indicated in the view. The setting of control dial 1114-M indicates that the contour tracing point 781 is associated with the contour tracing control mechanism 601A and the depth tracing point 1111 is associated with the depth tracing control mechanism 1101. Dial 1102-M shows a setting of the depth control tracing feed mechanism for feeding to the right, that is, in the direction of feed from depth line 1253 to depth line 1254, which will subsequently be explained.

When the contour tracing point 781 arrives at the point 1255, that is, after having completed one entire contour line, tracing operation is stopped. The stopping may be done manually by the operator, or if desired the line may be insulated at that point as indicated by the dotted vertical lines so that when the point 781 approaches the area between these dotted lines the alternative control 702M will be disabled as shown in dotted lines to stop operation of the contour tracing mechanism automatically when the tracer point 781 moves onto the insulated area of the line 1251. Turning dial 702M to its dotted line position (or similar adjustment of the other feed control dials) moves its commutator to an inactive position between the associated terminals.

This operation brings the depth tracer point 1111 to the location 1258 and operation of the depth tracing mechanism is started by manipulating handle 1126 as previously described so that the depth tracing unit moves from the line 1253 until the tracing point 1111 engages the conducting line 1254 which stops the operation also as described.

The movement of the tracer point 781 at the end of its tracing on line 1251 is indicated by perforations 1262 in Fig. 93, while the subsequent movement of the depth tracing unit is indicated in column 5 by the perforations 1264.

At this time, it becomes necessary to move the main tracing point 781 from the contour line 1251 to the contour line 1252, and this can be done manually by pushing the button 714 of the alternative control dial until the tracer point reaches the line 1252 when a predominant feed will automatically start and button 714 is manually released.

The movement of the tracer point 781 from line 1251 to line 1252 may also be accomplished automatically under control of the machine by switching the tracing control means of the tracing unit 1101 to the tracer point 781, and disabling both tracer point 1111 and the tracing control means normally used for tracer point 781. This is effected by setting the control dial 1114-N as indicated in Fig. 92. In this position the commutator contact 1131 (Fig. 77) is associated with the terminals 1133 and 1117, thus connecting the tracing point 781 to the control means of unit 1101. This control causes the tracer unit to move in the direction selected by control dial 1102-N until the tracer point 781 again engages a contact line.

The actual operation is started by pulling the handle 1126 and the active tracing is indicated by the solid dotted line from lines 1251 to 1252 in Fig. 95. At this same time, the tracer point 1111 is following along the open circle line shown in line 1254, although the tracer point itself is inactive during such movement. When the tracing point 781 arrives at the line 1252, the insulated portion 1266 thereof between the dotted lines at right angles to the path has not as yet been placed in the path, so that tracer point 781 will make contact and the control mechanism of the tracing unit 1101 will automatically stop operation.

When the carriage 602A stops, the controls are reset as indicated at 701-P, 702-P, 1102-P and 1114-P, so that the controls are again set for contour tracing. Thus, the tracing point 781 is again in control of its unit 601A and the complete contour line 1252 (Fig. 75) will be traced. The latter portion of this tracing is indicated at the right of line 1252 in Fig. 95 where the control dials have been reset as indicated at 701-Q and 702-Q.

During the time that the tracing point 781 has been travelling around the line 1252, the operator places the insulating material at 1266 so that when the tracing point 781 is approaching the insulating material he can disable the alternative control dial 702-Q as indicated by a dotted arrow, so that no alternative feed will occur and the machine will stop at point 1267.

The next step is to move from the depth line 1254 to the depth line 1250 and for this purpose the control dials 1102 and 1114 are set as indicated at 1102-R and 1114-R in Fig. 92. With these settings made, the operation of the depth control tracer unit 1101 is started by manual operation of the handle 1126, so that it will trace as indicated by the dots 1268 from line 1254 to line 1250, with the operation stopping when it reaches the line 1250. The tracing along the contour line 1252 and along the line 1268 results in a record as indicated at 1269 and 1271 respectively in Fig. 94.

After the depth line 1250 is reached by the depth tracer point 1111, then the controls are again set as indicated at 1102-N and 1114-N to cause the tracer point 781 to move from the contour line 1252 to the contour line 1260. This sequence of operations in moving from depth to contour line and then to another depth is repeated alternately until the entire record for the cavity to be cut is made.

In practice, the smoothness and accuracy can be controlled by the scale of enlargement and by the number of depth and contour tracing paths.

To machine the work in accordance with a depth contour record, the machine is set as described for end milling operations except that an end mill of predetermined contour is used corresponding to the general shape of the cavity, for example, as indicated at 1257 in Figs. 76 and 96. To start the operation the depth control screw 123 is set to the proper adjustment to conform to the depth of the first contour line, and is thereafter adjusted automatically by the fifth and sixth columns of the record. The initial depth adjustment may be made manually or automatically from the record. Usually the greatest depth is cut first as indicated in the selected example, in which event a drilled hole to less than the full diameter and depth of the cut is provided for starting the cutting operation. By cutting the greatest depth first and moving outwardly with the contouring paths, a face of uncut metal is always available for engagement by the clamping sleeve.

As pointed out in discussing the end milling and broaching operation, the work is clamped rigidly between guide collar 43 and collar 203 while the cut is being made and the tool is being withdrawn and is thereafter free for accurate feeding movement by a precise increment prior to the next cutting stroke. Because the end mill is spring driven in its downward cutting movement, the tool will not be broken if presented to a greater thickness of metal than it can cut.

In depth contouring, it is usually desirable to employ the ribbed spacing collar 239 (Fig. 33) so that free oil passages are provided for chip disposal. The oil is available in quantity and at a pressure through apertures 233, as shown in Fig. 7, to provide converging streams of oil to cool the cutter and flush the cavity free of chips.

*Optional accuracy control.*—As previously stated, the accuracy of contouring and smoothness of machining can be controlled by the scale of enlargement for the tracing operation. Where greater accuracy or smoothness is desired for a particular section of the piece to be machined, separate layouts on different scales of enlargement may be provided to be traced sequentially. For example, if the contour line 1162 is to be traced and extreme accuracy is desired between lines 1201 and 1202, a layout of greater enlargement would be provided as in Fig. 82. In operation, the line 1162 would be traced to point 1201 when a blank space would be inserted manually in the record. Then the tracer unit would be manually moved onto line 1204 (Fig. 82) and tracing of this line would be performed, and another blank space placed in the record. Subsequent tracing would be begun at 1202 on line 1162 (Fig. 78) to complete the record.

In operation under control of the record, the increment of movement would be set first in accordance with the scale of reduction from line 1162 (Fig. 78) and contouring work would be done until the machine stopped because of the first blank space in the record. Then the feed selecting nuts 322, 342, 349 and 350 would be adjusted to the scale of reduction from layout line 1204 (Fig. 82) so that the contouring operation would proceed at that scale with correspondingly greater accuracy and smoothness of machining because of the smaller increments of feed. When the machine again stops because of the second blank space in the record, the feed selecting nuts are returned to their original adjustment and the operation finished.

In actual practice precision finishes have been obtained with, for example, a ¼" cutter working through 1" steel that compare favorably with precision ground surfaces.

*Simultaneous tracing and machining apparatus*

Figure 97 is a circuit diagram illustrating the direct connection of the tracing apparatus to the metal cutting machine so that no record is required. Similar parts are numbered similarly.

Generally the control dials 701, 702 and 703 (Fig. 97) are identical in construction and operation with the similarly numbered control dials of the foregoing description, and the operation is similarly controlled by directional solenoid 817, rotational solenoid 931, main tracing point 781, and rotational tracing point 807. The directional solenoids 664, 666, 682 and 687 and the rotational or depth solenoids 919 and 920 are constructed and controlled to operate in the same manner as in the previously described construction.

Referring to the circuit diagram, solenoids 162 and 163, which control the rotative adjustment of the sleeve 47, are similar in construction and operation to those previously described, as well as the solenoids 311 and 338 controlling the transverse feed, and the solenoids 354 and 355 controlling the longitudinal feed. The machine is also equipped with a main drive motor 115, and the auxiliary motors 76 and 534, as previously described, which are controlled by respective switches 470A, 77 and 536 which are manually adjustable. Drive motor 115 provides a timed mechanical drive for all cams of both the tracing mechanism and the cutting machine.

As seen in Fig. 97, energization of solenoid 682 closes circuit breaker 1049 which establishes a circuit from the line through the lead 1301 to solenoid 338 of the transverse feed. Solenoid 338 is connected by lead 1302 with intermittently operated bellcrank timing switch 1303 which is operated by cam 1304, driven by the motor 115. The bellcrank switch 1503 is connected to ground to complete the circuit. Cam 1304 is of suitable contour to provide for closing of the circuit with the timing shown in Fig. 43 for the "magnets operating circuit for table and cross-slide screws," so that bellcrank switch 1303 is closed during the time that circuit breaker 1049 may be closed by its controlling solenoid 682.

Solenoid 687 (Fig. 97) when energized closes circuit breaker 1050 which is connected to the line and by lead 1306 with solenoid 311 of the transverse feed which is also similarly grounded through the lead 1302 and bellcrank switch 1303 as described in connection with solenoid 338.

Solenoid 666 (Fig. 97) when energized, closes circuit breaker 1053 which is connected to the line and by lead 1307 to solenoid 354 which is also connected to ground through the lead 1302 and bellcrank switch 1303. Similarly solenoid 664 when energized closes circuit breaker 1054 which establishes a circuit from the line through the lead 1308 to solenoid 355 which has its other connection similarly grounded. Thus, the period for energization of each of solenoids 311, 338, 354 and 355 is timed under control of cam 1304 as described.

Solenoids 919 and 920 (Fig. 97) of the depth or rotative adjustment control close their respective circuit breakers 1057 and 1058 which are both connected to the line and are connected by respective leads 1309 and 1310 with the respective solenoids 162, 163 of the depth or rotative adjustment control of the machine. The other connections for solenoids 162, 163 extending through lead 1311 to a second bellcrank circuit breaker 1312 controlled by a cam 1313, are generally similar to that previously described. A contour of cam 1313 is provided to determine a period of closing for circuit breaker 1312 corresponding to that shown in Fig. 43 for the "magnets operating circuit for rotation and depth screw."

From the foregoing description it will be obvious that when the main tracing point 781 or the rotational tracing point 807 makes an incremental movement because of the energization of one of the feed solenoids therefor that a circuit is established directly to the controlling solenoid of the respective feed of the machine, so that the machining operation follows under direct control of the movement of the tracing unit. The motor 115 serves to drive all of the time-controlling shafts of both the tracing apparatus and the machine itself so that all the movements are in direct synchronism and no misoperation can occur.

It will be noted that during any machining operation the tool will reciprocate idly whenever tracing is stopped and movement of the work relative to the tool will begin whenever the tracing operation is again started. In locating and drilling hole centers, the circuit for main motor 115 is interrupted when the tracing point is stopped at an indicated hole location so that the hole can be drilled. The operation is otherwise similar to that described in connection with record type of tracing and machining and the various scales of enlargement and reduction can be similarly employed.

It will be understood that the apparatus illustrated in Fig. 97 can equally well be utilized with the depth layout tracing mechanism shown in Figs. 76 and 77.

Fig. 98 illustrates a modified method of tracing a contour line. In accordance with the modified tracing operation, tracing is always effected towards a theoretical line irrespective of what portion of the quadrant the tracer point is traversing.

As shown in Fig. 98, the tracing operation will start from the left with the predominant and alternative controls set as indicated at 701Q and 702Q. In the figure the line 1320 represents the desired contour line while line 1321 represents the theoretical line of travel of the cutter axis to which tracing is to be performed. During the first octant of the tracing operation the conducting portion of the layout 1322 is shown at the right of the line 1321. During the second octant a conducting portion 1322A is shown on the opposite side of the line from the portion 1322. As understood in connection with the other tracing operations described, in the embodiment shown herein the material surrounding the portions 1322 and 1322A is of non-conducting material to provide a different physical characteristic to be sensed by the tracer point 781.

Between the two octant portions 1322 and 1322A a break or non-conducting gap 1323 is provided so that the tracing operation will stop when tracing has proceeded to this point, for example at the incremental step represented at 1324. The operator then resets the predominant and alternative controls in the directions indicated at 701R and 702R so that during the second octant the tracing again will be towards the line 1321 although from the opposite side thereof.

At the end of the second octant a second break 1323A is provided and in making the layout the third conducting portion 1322B is on the opposite side of the line from the portion 1322A while the alternative feed is reset as indicated at 702S. The conducting portion 1322B continues through the fourth octant because the curvature changes as viewed from the bottom from an inside curve to an outside curve and no new setting on the predominant or alternative controls is required.

Toward the right hand side of the figure the curvature again changes where a break 1323B is provided, and a fourth conducting portion 1322C is placed on the opposite side of the line from the portion 1322B and the predominant and alternative controls are set as indicated at 701T and 702T.

The actual tracing operation and control of the tracing unit making the record is the same as previously described. However, by providing the conducting portions on opposite sides of the theoretical line the tracing operation is always performed with respect to the theoretical cutter path corresponding to the desired contour line whereby an improved accuracy is obtained. The tracing method as described is equally applicable to rotational tracing. If no rotational tracing is involved, the extent of a conducting portion 1322 from the line 1321 is not material and any desired width may be employed. Where rotational tracing is performed, the width of a conducting portion such as 1322A on the outside of a curve must be slightly more than the tracing increment employed, and less than the distance between the two tracer points. In rotational tracing, where a break such as 1323 occurs the rotational tracer must be manually rotated on its mounting to trace to the outside edge of the portion such as 1322A. At portion 1322B, the rotational tracer is re-adjusted manually to cooperate with the line 1321. Otherwise the rotational tracing operation would be performed as hereinabove described.

This application is a continuation-in-part of my co-pending application Serial No. 291,872, filed August 25, 1939, for Contouring machine and method, now Patent 2,283,240.

I claim:

1. In a tracing apparatus, an electrical contouring tracer unit having control means to follow a conducting lay-out line representing the contour of a part, said control means being responsive to conducting contact with said lay-out line to cause a tracing operation, a depth tracer unit having control means to trace from conducting depth line to conducting depth line of a depth lay-out, each of said depth lines corresponding to a contour lay-out line to represent the depth of cut to be made along the corresponding contour line, said depth tracer unit control means being responsive to conducting contact to terminate a tracing operation.

2. In a tracing apparatus, an electrical contouring tracer unit having control means and a tracer to follow a conducting lay-out line representing the contour of a part, said control means being responsive to conducting contact of said tracer with said lay-out line to cause a tracing operation, a second tracer unit having other control means and another tracer to trace from conducting line to conducting line of a lay-out, said second tracer unit control means being responsive to conducting contact of said second tracer to terminate a tracing operation, and manipulatable means for associating said first tracer with the control means of said second tracer unit.

3. In a tracing and record producing apparatus, a contouring tracer unit having means to follow a lay-out line representing the contour of a part, a depth tracer unit having means to trace from depth line to depth line of a depth lay-out of said part, each of said depth lines corresponding to a contour lay-out line to represent the depth of cut to be made along the corresponding contour line, selective control means associated with said tracer units for enabling alternate operation thereof, and recording means controlled by said tracer units.

4. In a tracing apparatus, a contouring tracer unit having means to follow a lay-out line representing the contour of a part, and a depth tracer unit having means to trace from depth line to depth line of a depth lay-out of said part, each of said depth lines corresponding to a contour lay-out line to represent the depth of cut to be made along the corresponding contour lines, said depth lay-out lying in the plane of said contour layout.

5. A tracing mechanism comprising a line sensing tracer, means for automatically moving the tracer step by step in accordance with a line sensed thereby, means for recording the successive movements of the tracer, an auxiliary line sensing tracer, means supporting said auxiliary tracer for movement in one direction with the first named tracer, means providing an independent direction of movement of the auxiliary tracer with respect to the first tracer, means for automatically moving the auxiliary tracer in such independent direction in accordance with a line sensed thereby and means for automatically recording the sequence of movements of the first tracer and auxiliary tracer.

6. A method of machining stationary work by means of a reciprocating cutter, which comprises preparing contour outlines of the piece to be formed both as to longitudinal and transverse directions and as to a vertical direction, tracing both the longitudinal, transverse and vertical contour lines, recording the successive movements made in tracing such contours, and utilizing the record to control the vertical extent of movement of the cutter and to control longitudinal or transverse movement of the work while the cutter is disengaged from the work during reciprocation of the cutter.

7. In a contouring apparatus, tracing mechanism including a tracer for sensing the respective physical characteristics of a layout line and the surrounding material, feed means for moving said tracer in a selected direction, and automatic control means for causing operation of said feed means until said tracer senses the characteristic of a line, whereby said tracer stops movement when in sensing relation with the line.

8. In a contouring apparatus, tracing mechanism including a tracer for sensing the respective physical characteristics of a layout line and the surrounding material, feed means for moving said tracer in a selected direction, automatic control means for causing operation of said feed means including a spring-driven cyclically operable control element, means for restraining said element, and means for rendering said restraining means ineffective while said tracer is in sensing relation with the material characteristic.

9. In a contouring apparatus, tracing mechanism including a tracer for sensing the respective physical characteristics of a layout line and the surrounding material, feed means for moving said tracer in a selected direction, and automatic control means for causing operation of said feed means including a spring-driven cyclically operable control element, means for restraining said element, means for rendering said restraining means ineffective while said tracer is in sensing relation with the material characteristic, and an automatic latch for holding said rendering means in an inactive position upon movement thereof to such position.

10. In a contouring apparatus, tracing mechanism including a tracer for sensing the respective physical characteristics of a layout line and the surrounding material, feed means for moving said tracer in a selected direction, automatic control means for causing operation of said feed means including a spring-driven cyclically operable control element, means for restraining said element, means for rendering said restraining means ineffective while said tracer is in sensing relation with the material characteristic, an automatic latch for holding said rendering means in an inactive position upon movement thereof to such position, and manual control means for said latch.

11. A tracing method for a contour which comprises effecting incremental tracing movement of a tracer with respect to a theoretical curved contour line to cause the tracer to follow the line by movement in selected predominant and alternative directions, and controlling said tracer to sense the line from opposite sides thereof in successive octant positions of the line where the change in curvature requires a change in said predominant and alternative directions.

12. A contour layout for incremental tracing operations, comprising a layout member having a desired contour line thereon, and a layout tracing path along said line having portions of the same physical characteristic offset with respect to each other along said line and lying at least partially at opposite sides of the line.

13. A tracing method for a contour which comprises preparing a contour layout on a sheet of material with the contour layout having a distinctive physical characteristic from the surrounding material and having a line corresponding to the desired contour, placing successive portions of the layout alternately at opposite sides of said line, with each alternation at a point along the line where the slope of the line reaches a predetermined limiting value in a predetermined slope range.

14. A method of tracing a contour which comprises preparing a contour layout of a distinctive physical characteristic differing from the surrounding material and having a line corresponding to the desired contour, placing successive portions of the layout alternately at opposite sides of said line, with each alternation at a point along the line where the slope of the line reaches a predetermined limiting value in a predetermined range of values, and causing a tracer to follow the line by sensing the different physical characteristics of the successive portions of the layout.

DALLAS R. TRINKLE.